US012462498B2

(12) United States Patent
Queen et al.

(10) Patent No.: US 12,462,498 B2
(45) Date of Patent: Nov. 4, 2025

(54) SYSTEMS, METHODS, AND GRAPHICAL USER INTERFACES FOR ADDING EFFECTS IN AUGMENTED REALITY ENVIRONMENTS

(71) Applicant: Apple Inc., Cupertino, CA (US)

(72) Inventors: James A. Queen, Santa Cruz, CA (US); Joseph-Alexander P. Weil, San Anselmo, CA (US); Joanna M. Newman, San Jose, CA (US); Ron A. Buencamino, San Jose, CA (US); Richard H. Salvador, Culver City, CA (US); Fernando Garcia, Redondo Beach, CA (US); Austin T. Tamaddon, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/412,251

(22) Filed: Jan. 12, 2024

(65) Prior Publication Data

US 2024/0153219 A1  May 9, 2024

Related U.S. Application Data

(63) Continuation of application No. 17/720,227, filed on Apr. 13, 2022, now Pat. No. 11,941,764.

(60) Provisional application No. 63/176,322, filed on Apr. 18, 2021.

(51) Int. Cl.
G06T 19/00 (2011.01)
G06T 15/00 (2011.01)

(52) U.S. Cl.
CPC ............ *G06T 19/006* (2013.01); *G06T 15/00* (2013.01); *G06T 2200/24* (2013.01)

(58) Field of Classification Search
None
See application file for complete search history.

(56) References Cited

U.S. PATENT DOCUMENTS 7,072,810 B2   7/2006  Ramanathan et al.
8,244,462 B1   8/2012  Zhu
(Continued)

FOREIGN PATENT DOCUMENTS

AU    2018101226 A4   9/2018
AU    2019100486 A4   6/2019
(Continued)

OTHER PUBLICATIONS

Aakash G Technical, "App Review #1 / Measure—Tango AR / How to Use", https://www.youtube.com/watch?v=fj2iiOg36KE, May 13, 2017, 2 pages.
(Continued)

*Primary Examiner* — Robert J Craddock
(74) *Attorney, Agent, or Firm* — Morgan, Lewis & Bockius LLP

(57) ABSTRACT

A computer system displays a representation of a field of view of the one or more cameras, including a representation of a portion of a three-dimensional physical environment that is in the field of view of the one or more cameras. The computer system receives a request to add a first virtual effect to the displayed representation of the field of view of the one or more cameras. In response to receiving the request to add the first virtual effect to the displayed representation of the field of view of the one or more cameras and in accordance with a determination that the first virtual effect requires a scan of the physical environment, the computer system initiates a scan of the physical environment to detect one or more features of the physical environment and displays a user interface that indicates a progress of the scan of the physical environment.

38 Claims, 52 Drawing Sheets

(56) References Cited

U.S. PATENT DOCUMENTS

| | | |
|---|---|---|
| 8,365,081 B1 | 1/2013 | Amacher et al. |
| 8,982,156 B2 | 3/2015 | Maggiore |
| 9,152,209 B2 | 10/2015 | Jeong et al. |
| 9,330,500 B2 | 5/2016 | Karsch et al. |
| 9,448,687 B1 | 9/2016 | McKenzie et al. |
| 9,495,794 B2 | 11/2016 | Masumoto |
| 9,661,308 B1 | 5/2017 | Wang et al. |
| 9,665,960 B1 | 5/2017 | Masters et al. |
| 9,678,651 B2 | 6/2017 | Moha et al. |
| 9,696,897 B2 | 7/2017 | Garcia |
| 9,767,606 B2 | 9/2017 | Kapinos et al. |
| 9,846,027 B2 | 12/2017 | Kimura et al. |
| 9,870,644 B2 | 1/2018 | Ha et al. |
| 9,953,434 B2 | 4/2018 | Natori et al. |
| 10,049,504 B2 | 8/2018 | Chen et al. |
| 10,074,179 B2 | 9/2018 | Arita et al. |
| 10,268,266 B2 | 4/2019 | Mathey-Owens et al. |
| 10,296,869 B2 | 5/2019 | Hulth |
| 10,347,033 B2 | 7/2019 | Masumoto |
| 10,445,867 B2 | 10/2019 | Glatfelter et al. |
| 10,540,699 B1 | 1/2020 | Prabhu et al. |
| 10,606,075 B2 | 3/2020 | Choi et al. |
| 10,606,609 B2 | 3/2020 | Energin et al. |
| 10,762,716 B1 | 9/2020 | Paul et al. |
| 10,861,241 B2 | 12/2020 | Ghaleb |
| 10,972,680 B2 | 4/2021 | Wigdor et al. |
| 10,999,629 B1 | 5/2021 | Cieslak et al. |
| 11,204,678 B1 | 12/2021 | Baker et al. |
| 11,523,063 B2 | 12/2022 | Ith et al. |
| 2008/0008361 A1 | 1/2008 | Nozaki et al. |
| 2008/0222233 A1 | 9/2008 | Shi et al. |
| 2008/0255961 A1 | 10/2008 | Livesey |
| 2009/0002719 A1 | 1/2009 | Chang et al. |
| 2010/0235726 A1 | 9/2010 | Ording |
| 2011/0022942 A1 | 1/2011 | Flemings et al. |
| 2011/0107270 A1 | 5/2011 | Wang et al. |
| 2011/0216167 A1 | 9/2011 | Katz et al. |
| 2011/0249117 A1 | 10/2011 | Yoshihama et al. |
| 2011/0252405 A1 | 10/2011 | Meirman et al. |
| 2011/0279381 A1 | 11/2011 | Tong et al. |
| 2011/0279445 A1 | 11/2011 | Murphy et al. |
| 2011/0304607 A1 | 12/2011 | Ito |
| 2012/0121134 A1 | 5/2012 | Yoshizumi |
| 2012/0194544 A1 | 8/2012 | Yokohata |
| 2012/0249741 A1 | 10/2012 | Maciocci et al. |
| 2013/0044128 A1 | 2/2013 | Liu et al. |
| 2013/0127895 A1 | 5/2013 | Miller et al. |
| 2013/0215230 A1 | 8/2013 | Miesnieks et al. |
| 2013/0332892 A1 | 12/2013 | Matsuki |
| 2014/0071130 A1 | 3/2014 | Piedmonte |
| 2014/0098191 A1 | 4/2014 | Rime et al. |
| 2014/0125668 A1 | 5/2014 | Steed et al. |
| 2015/0062120 A1 | 3/2015 | Reisner-Kollmann et al. |
| 2015/0062123 A1 | 3/2015 | Yuen |
| 2015/0067588 A1 | 3/2015 | Shim et al. |
| 2015/0074711 A1 | 3/2015 | Spitz et al. |
| 2015/0169525 A1 | 6/2015 | Palm et al. |
| 2015/0187119 A1 | 7/2015 | Masumoto |
| 2015/0193982 A1 | 7/2015 | Mihelich et al. |
| 2015/0221345 A1 | 8/2015 | Zhao et al. |
| 2015/0227645 A1 | 8/2015 | Childs et al. |
| 2016/0026253 A1 | 1/2016 | Bradski et al. |
| 2016/0040981 A1 | 2/2016 | Kang et al. |
| 2016/0049011 A1 | 2/2016 | Kasahara et al. |
| 2016/0063714 A1 | 3/2016 | Middleton et al. |
| 2016/0086322 A1 | 3/2016 | Arita et al. |
| 2016/0147408 A1 | 5/2016 | Bevis et al. |
| 2016/0148433 A1 | 5/2016 | Petrovskaya et al. |
| 2016/0170624 A1 | 6/2016 | Zambetti et al. |
| 2016/0189426 A1 | 6/2016 | Thomas et al. |
| 2016/0210602 A1 | 7/2016 | Siddique et al. |
| 2016/0240011 A1 | 8/2016 | Metaio et al. |
| 2016/0329006 A1 | 11/2016 | Weber et al. |
| 2016/0363990 A1 | 12/2016 | Key |
| 2017/0021273 A1 | 1/2017 | Rios |
| 2017/0053621 A1 | 2/2017 | Chen et al. |
| 2017/0061696 A1 | 3/2017 | Li et al. |
| 2017/0115488 A1 | 4/2017 | Ambrus et al. |
| 2017/0132841 A1 | 5/2017 | Morrison |
| 2017/0212585 A1 | 7/2017 | Kim et al. |
| 2017/0220887 A1 | 8/2017 | Fathi et al. |
| 2017/0230641 A1 | 8/2017 | Scavezz et al. |
| 2017/0277670 A1 | 9/2017 | Smith et al. |
| 2017/0289221 A1 | 10/2017 | Khalid et al. |
| 2017/0316576 A1 | 11/2017 | Colbert et al. |
| 2017/0358142 A1 | 12/2017 | Lee et al. |
| 2017/0372510 A1 | 12/2017 | Ye et al. |
| 2017/0372527 A1* | 12/2017 | Murali ............... H04N 13/239 |
| 2018/0004283 A1 | 1/2018 | Mathey-Owens et al. |
| 2018/0045963 A1 | 2/2018 | Hoover et al. |
| 2018/0088794 A1 | 3/2018 | Graham et al. |
| 2018/0114372 A1 | 4/2018 | Nagy et al. |
| 2018/0165888 A1 | 6/2018 | Duan et al. |
| 2018/0203561 A1 | 7/2018 | Chang et al. |
| 2018/0203581 A1 | 7/2018 | Takeda |
| 2018/0204385 A1 | 7/2018 | Sarangdhar et al. |
| 2018/0300952 A1 | 10/2018 | Evans et al. |
| 2018/0336732 A1 | 11/2018 | Schuster |
| 2018/0336737 A1 | 11/2018 | Varady et al. |
| 2019/0033058 A1 | 1/2019 | Tsurumi |
| 2019/0051054 A1 | 2/2019 | Jovanovic et al. |
| 2019/0065027 A1 | 2/2019 | Hauenstein et al. |
| 2019/0068889 A1 | 2/2019 | Lee et al. |
| 2019/0172261 A1 | 6/2019 | Alt et al. |
| 2019/0180082 A1 | 6/2019 | Moravec et al. |
| 2019/0180506 A1 | 6/2019 | Gebbi et al. |
| 2019/0180512 A1 | 6/2019 | Fedosov et al. |
| 2019/0213389 A1 | 7/2019 | Peruch et al. |
| 2019/0221035 A1 | 7/2019 | Clark et al. |
| 2019/0221041 A1 | 7/2019 | Lin |
| 2019/0310757 A1 | 10/2019 | Lee et al. |
| 2019/0311512 A1 | 10/2019 | VanBlon et al. |
| 2019/0333278 A1 | 10/2019 | Palangie et al. |
| 2019/0339058 A1 | 11/2019 | Dryer et al. |
| 2019/0339839 A1 | 11/2019 | Paul, Sr. et al. |
| 2019/0340799 A1 | 11/2019 | Dryer et al. |
| 2019/0355121 A1 | 11/2019 | Nelson et al. |
| 2019/0369404 A1 | 12/2019 | Joshi et al. |
| 2020/0005538 A1 | 1/2020 | Neeter |
| 2020/0020164 A1 | 1/2020 | Coffman et al. |
| 2020/0027201 A1 | 1/2020 | Chen |
| 2020/0053318 A1 | 2/2020 | Li et al. |
| 2020/0098140 A1 | 3/2020 | Jagnow et al. |
| 2020/0106965 A1 | 4/2020 | Lam et al. |
| 2020/0143593 A1 | 5/2020 | Rudman et al. |
| 2020/0184667 A1 | 6/2020 | Miller et al. |
| 2020/0200794 A1 | 6/2020 | Niles et al. |
| 2020/0226823 A1 | 7/2020 | Stachniak et al. |
| 2020/0232783 A1 | 7/2020 | Dryer et al. |
| 2020/0261799 A1 | 8/2020 | Cahill et al. |
| 2020/0312029 A1 | 10/2020 | Heinen et al. |
| 2020/0322595 A1 | 10/2020 | Abe et al. |
| 2020/0382718 A1 | 12/2020 | Malia et al. |
| 2021/0004996 A1 | 1/2021 | Murillo et al. |
| 2021/0019946 A1 | 1/2021 | Sonasath et al. |
| 2021/0096726 A1 | 4/2021 | Faulkner et al. |
| 2021/0097768 A1 | 4/2021 | Malia et al. |
| 2021/0097776 A1 | 4/2021 | Faulkner et al. |
| 2021/0158427 A1 | 5/2021 | Jobetto et al. |
| 2021/0174596 A1 | 6/2021 | Zhang et al. |
| 2021/0191600 A1 | 6/2021 | Lemay et al. |
| 2021/0241483 A1 | 8/2021 | Dryer et al. |
| 2021/0241505 A1 | 8/2021 | Dryer et al. |
| 2021/0254962 A1 | 8/2021 | Dryer et al. |
| 2021/0286502 A1 | 9/2021 | Lemay et al. |
| 2021/0295602 A1 | 9/2021 | Scalpel et al. |
| 2021/0304465 A1 | 9/2021 | Dryer et al. |
| 2022/0036648 A1 | 2/2022 | Wang et al. |
| 2022/0091722 A1 | 3/2022 | Faulkner et al. |
| 2022/0092861 A1 | 3/2022 | Sharma et al. |
| 2022/0130118 A1 | 4/2022 | Malia et al. |
| 2022/0239842 A1 | 7/2022 | Malia et al. |
| 2022/0276041 A1 | 9/2022 | Dryer et al. |
| 2022/0335697 A1 | 10/2022 | Harding et al. |

(56) References Cited

U.S. PATENT DOCUMENTS

| | | |
|---|---|---|
| 2023/0199296 A1 | 6/2023 | Malia et al. |
| 2023/0368458 A1 | 11/2023 | Dryer et al. |
| 2023/0386146 A1 | 11/2023 | Scapel et al. |
| 2024/0011764 A1 | 1/2024 | Dryer et al. |
| 2024/0045564 A1 | 2/2024 | Dryer et al. |
| 2024/0273832 A1 | 8/2024 | Newman et al. |
| 2024/0290051 A1 | 8/2024 | Malia et al. |

FOREIGN PATENT DOCUMENTS

| | | |
|---|---|---|
| CN | 1629888 A | 6/2005 |
| CN | 102607423 A | 7/2012 |
| CN | 103218854 A | 7/2013 |
| CN | 105103198 A | 11/2015 |
| CN | 105164999 A | 12/2015 |
| CN | 105554247 A | 5/2016 |
| CN | 105579946 A | 5/2016 |
| CN | 105589199 A | 5/2016 |
| CN | 105608746 A | 5/2016 |
| CN | 106164934 A | 11/2016 |
| CN | 106251185 A | 12/2016 |
| CN | 106575299 A | 4/2017 |
| CN | 108886601 A | 11/2018 |
| CN | 112189220 B | 1/2021 |
| EP | 1563370 A | 8/2005 |
| EP | 2 394 714 A1 | 12/2011 |
| EP | 2 983 139 A1 | 2/2016 |
| EP | 2 988 486 A1 | 2/2016 |
| EP | 3017591 A1 | 5/2016 |
| JP | 6264665 B2 | 11/2002 |
| JP | 2008-287691 A | 11/2008 |
| JP | 2011-199560 | 10/2011 |
| JP | 2011-259243 A | 12/2011 |
| JP | 2013-229672 A | 11/2013 |
| JP | 2014-143453 A | 8/2014 |
| JP | 2015-080199 A | 4/2015 |
| JP | 2015-146173 A | 8/2015 |
| JP | 2016-110676 A | 6/2016 |
| JP | 2017-111515 A | 6/2017 |
| JP | 2017-120531 A | 7/2017 |
| JP | 2017-536618 A | 12/2017 |
| JP | 2019-516180 A | 6/2019 |
| JP | 2019-145072 A | 8/2019 |
| KR | 20100003252 A | 1/2010 |
| KR | 20130108684 A | 10/2013 |
| KR | 20150018828 A | 2/2015 |
| KR | 101629134 B1 | 6/2016 |
| KR | 20160141688 A | 12/2016 |
| KR | 20170087501 A | 7/2017 |
| KR | 20180066276 A | 6/2018 |
| KR | 20210031894 A | 3/2021 |
| KR | 20210081904 A | 7/2021 |
| WO | WO 2011/029209 A1 | 3/2011 |
| WO | WO 2013/096052 A2 | 6/2013 |
| WO | WO 2013/099616 A1 | 7/2013 |
| WO | WO 2013/176830 A | 11/2013 |
| WO | WO 2014/013689 A1 | 1/2014 |
| WO | WO 2014/157340 A1 | 10/2014 |
| WO | WO 2014/197631 A1 | 12/2014 |
| WO | WO 2016/017254 A1 | 2/2016 |
| WO | WO 2017/134886 | 8/2017 |
| WO | WO 2018/164932 A | 9/2018 |
| WO | WO 2019/032736 A1 | 2/2019 |
| WO | WO 2017/213070 A1 | 4/2019 |
| WO | WO 2019/217148 A1 | 11/2019 |
| WO | WO 2020/068073 A1 | 4/2020 |
| WO | WO 2021/158427 A1 | 8/2021 |

OTHER PUBLICATIONS

Anonymous, "How to Select Surface and Image Anchors", https:helpx.adobe.com/aeor/how-to-surface-and-image-anchors.html, Oct. 20, 2020, 6 pages.

Apple, "MeasureKit—AR ruler app for iOS 11", https://measurekit.com, Sep. 15, 2017, 10 pages.

Berthiaume, "Augmented Reality Scanning Enables Retail Innovation (Video)", https://www.scandit.com/gb/augmented-reality-scanning-enables-retail-innovation-video, Oct. 3, 2017, 5 pages.

Bhalwankar, "Triple Tap to Zoom Feature in Android Phones", https://www.youtube.com/watch?v=KInbLhA2jg8, Jan. 25, 2014, 2 pages.

Burns, "Google Measure it Demo with Tango", https://www.youtube.com/watch?v=b74VtGGJPBg, May 20, 2016, 2 pages.

IPhoneWave, "How to Use iPhone, [online]", http://web.archive.org/web/20111012000236/http:www.ipodwave.com:80/iphone/howto/camera_video.html, Oct. 12, 2011, 5 pages.

Jain et al., "OverLay: Practical Mobile Augmented Reality", Proceedings of the 13th Annual International conference on Mobile Systems, Applications, and Services. May 18, 2015, 14 pages.

LaanLabs, "AirMeasure—AR Tape & Ruler", https://itunes.apple.com/us/app/airmeasure-ar-tape-ruler/id1251282152, Jun. 4, 2018, 3 pages.

Laanlabs, "AirMeasure—The Augmented Reality Toolkit", https://www.youtube.com/watch?v=9ycpvj6hbdE, Sep. 12, 2017, 2 pages.

Langlotz et al., "Sketching up the World: in Situ Authoring for Mobile Augmented reality", http://mooslechner.infor/workperformed/at/smartphone2010.pdf, Jul. 27, 2011, 8 pages.

Lenovo, Lenovo Tech World 2016—Keynote Livestream from San Francisco, https://www.youtube.com/watch?v=MBgQLraVGJQ, Jun. 9, 2016, 2 pages.

Lenovo, "Lenovo_PHAB2_Pro_User_Guide V1.0", https://pcsupport.lenovo.com/do/en/products/tablets/phab-series/phab2-pro-documentation/doc_userguide, Aug. 29, 2017, 10 pages.

Lynch, "How to Zoom in On iPhone: The Quick Tutorial!", https://www.payetteforward.com/how-to-zoom-in-on-iphone-quck-tutorial, Feb. 26, 2018, 4 pages.

Mapletree Apps, "Apple ARKit iPhone Demo—Measure 3D Pro—Ruler on iOS (1)", https://www.youtube.com/watch?v=fzn3RsveJss, Oct. 1, 2017, 2 pages.

Mapletree Apps, "Apple ARKit iPhone Demo—Measure 3D Pro - Ruler on iOS (2)", https://www.youtube.com/watch?v=fzn3RsveJss, Oct. 1, 2017, 2 pages.

Mapletree Apps, "Measure 3D Tutorial series #1—How to Measure a Room", https://www.youtube.com/watch?v=HGV18HXXZqw, Apr. 19, 2018, 2 pages.

Mapletree Apps, Measure 3D Tutorial series #4—How to Measure Length in Horizonal and Vertical Planes, https://www.youtube.com/watch?V-2PjcbrgS50Q, Apr. 19, 2018, 2 pages.

Mapletree Appls, "Measure 3D Tutorial #5—How to Measure Rectangle Shapes", https://www.youtube.com/watch?v=8Gg0SMwkvQU, Apr. 19, 2018, 2 pages.

Marriott, Adobe Aero: Getting Started with AR/Tutorial, https://www.youtube.com/watch?v=EU2V8Pn0GE4, Nov. 19, 2019, 3 pages.

Miller, "Apple Shares Detailed Human Interface Guidelines for Developers Building ARKit Apps", https://9to5mac.com/2017/08/29/arkit-human-interface-guidelines/, Aug. 29, 2017, 5 pages.

Nuernberger et al., "SnapToReality: Aligning Augmented Reality to the Real World", http://eyalofek.org/Papers/CHI2016_Snap2Reality.pdf., May 7-12, 2016, 12 pages.

Occipital HQ, "TapMeasure Spatial Utility to Capture and Measure Your Space", https://www.youtube.com/watch?v=Hy1Ex2MAXM, Sep. 19, 2017, 2 pages.

Perhiniak, "Yes I'm a Designer: Designing an Augmentged Reality Scene in Adobe Aero" https://wwwyoutube.com/watch?v=fo8a?G0, Jan. 27, 2020, 14 pages.

SmartPicture, "PLNAR—Your AR Measurement Tool", https://www.youtube.com/watch?v=H_cqZqKLjws, Sep. 28, 2017, 2 pages.

SmarPicture Tech, "Mobile App Design for Bay Area—Rely on the Reinvently Agency", https://appadvice.com/app/plnar/1282049921, Sep. 21, 2018, 5 pages.

YouTube, "A1 Corner & Edge Detection (beta)", https://www.youtube.com/watch?v=YSNklighUtxA, Nov. 21, 2020, 2 pages.

YouTube, "How Do I Use The iPhone Measure App? How Accurate Is It?", https://www.youtube.com/watch?v=RvhZ074Vs7c, Aug. 8, 2018, 3 pages.

(56) References Cited

OTHER PUBLICATIONS

YouTube, "Third Aurora: Adobe Aero Tutorial—How to get Started with Adobe Aero", https://www.youtube.com/watch?v=EU2v8P, Nov. 18, 2019, 3 pages.
YouTube, AR Measure—Automatic Measure in Augmented Reality, https://www.youtube.com/watch?v=70CQfH76vg4, Mar. 16, 2019, 2 pages.
YouTube, Huawei P30 Pro AR Measure / Measure length, depth, area and volume, hxos plus, https;//www.youtube.com/watch?v=0OX5QaK7YY, Mar. 26, 2019, 2 pages.
YouTube, Yes, I'm a Designer: "Designing an Augmented Reality Scene in Adobe Aero", https:www.youtube.com/watch?v=fo8aGOvCY7k, Jan. 27, 2020, 3 pages.
Office Action, dated Feb. 21, 2019, received in U.S. Appl. No. 16/145,015 (7532), 34 pages.
Notice of Allowance, dated Jun. 5, 2019, received in U.S. Appl. No. 16/145,015 (7532), 12 pages.
Office Action, dated Aug. 31, 2018, received in Danish Patent Application No. 201870350 (7532DK), which corresponds with U.S. Appl. No. 16/145,015, 11 pages.
Office Action, dated May 28, 2019, received in Danish Patent Application No. 201870350 (7532DK), which corresponds with U.S. Appl. No. 16/145,015, 6 pages.
Office Action, dated Feb. 21, 2020, received in Danish Patent Application No. 201870350 (7532DK), which corresponds with U.S. Appl. No. 16/145,015, 3 pages.
Intention to Grant, dated Mar. 30, 2023, received in European Patent Application No. 21178349.3 (7532EP), which corresponds with U.S. Appl. No. 16/145,015, 8 pages.
Intention to Grant, dated Sep. 19, 2023, received in European Patent Application No. 21178349.3 (7532EP), which corresponds with U.S. Appl. No. 16/145,015, 11 pages.
Notice of Allowance, dated Nov. 22, 2019, received in U.S. Appl. No. 16/138,779 (7554), 17 pages.
Office Action, dated Jul. 7, 2021, received in Australian Patent Application No. 2019267352 (7554AU), which corresponds with U.S. Appl. No. 16/138,779, 5 pages.
Notice of Acceptance, dated Aug. 9, 2021, received in Australian Patent Application No. 2019267352 (7554AU), which corresponds with U.S. Appl. No. 16/138,779, 3 pages.
Patent, dated Dec. 2, 2021, received in Australian Patent Application No. 2019267352 (7554AU), which corresponds with U.S. Appl. No. 16/138,779, 3 pages.
Office Action, dated Aug. 31, 2018, received in Danish Patent Application No. 201870351 (7554DK), which corresponds with U.S. Appl. No. 16/138,779, 11 pages.
Office Action, dated Feb. 13, 2020, received in Danish Patent Application No. 201870351 (7554DK), which corresponds with U.S. Appl. No. 16/138,779, 10 pages.
Office Action, dated Mar. 21, 2019, received in U.S. Appl. No. 16/145,025 (7555), 14 pages.
Final Office Action, dated Sep. 19, 2019, received in U.S. Appl. No. 16/145,025 (7555), 15 pages.
Office Action, dated Jun. 12, 2020, received in U.S. Appl. No. 16/145,025 (7555), 17 pages.
Final Office Action, dated Dec. 18, 2020, received in U.S. Appl. No. 16/145,025 (7555), 17 pages.
Notice of Allowance, dated Mar. 17, 2021, received in U.S. Appl. No. 16/145,025 (7555), 5 pages.
Innovation Patent, dated May 22, 2019, received in Australian Patent Application No. 2019100486 (7555AU), which corresponds with U.S. Appl. No. 16/138,779, 3 pages.
Certificate of Examination, dated Jul. 19, 2019, received in Australian Patent Application No. 2019100486 (7555AU), which corresponds with U.S. Appl. No. 16/138,779, 5 pages.
Office Action, dated Aug. 3, 2020, received in Chinese Patent Application No. 201910261469.3 (7555CN), which corresponds with U.S. Appl. No. 16/138,779, 5 pages.

Office Action, dated Jan. 20, 2021, received in Chinese Patent Application No. 201910261469.3 (7555CN), which corresponds with U.S. Appl. No. 16/138,779, 11 pages.
Notice of Allowance, dated Apr. 20, 2021, received in Chinese Patent Application No. 201910261469.3 (7555CN), which corresponds with U.S. Appl. No. 16/138,779, 6 pages.
Patent, dated Jul. 13, 2021, received in Chinese Patent Application No. 201910261469.3 (7555CN), which corresponds with U.S. Appl. No. 16/138,779, 6 pages.
Office Action, dated Sep. 28, 2018, received in Danish Patent Application No. 201870352 (7555DK), which corresponds with U.S. Appl. No. 16/145,025, 7 pages.
Office Action, dated Jan. 31, 2019, received in Danish Patent Application No. 201870352 (7555DK), which corresponds with U.S. Appl. No. 16/145,025, 4 pages.
Office Action, dated Sep. 16, 2019, received in Danish Patent Application No. 201870352 (7555DK), which corresponds with U.S. Appl. No. 16/145,025, 3 pages.
Office Action, dated Aug. 27, 2020, received in Danish Patent Application No. 201870352 (7555DK), which corresponds with U.S. Appl. No. 16/145,025, 2 pages.
Intention to Grant, dated Mar. 10, 2021, received in Danish Patent Application No. 201870352 (7555DK), which corresponds with U.S. Appl. No. 16/145,025, 2 pages.
Decision to Grant, dated Jul. 2, 2021, received in Danish Patent Application No. 201870352 (7555DK), which corresponds with U.S. Appl. No. 16/145,025, 2 pages.
Patent, dated Nov. 9, 2021, received in Danish Patent Application No. 207870352 (7555DK), which corresponds with U.S. Appl. No. 16/145,025, 3 pages.
Office Action, dated Jul. 17, 2019, received in European Patent Application No. 19159743.4 (7555EP), which corresponds with U.S. Appl. No. 16/145,025, 8 pages.
Office Action, dated Oct. 5, 2020, received in European Patent Application No. 19159743.4 (7555EP), which corresponds with U.S. Appl. No. 16/145,025, 6 pages.
Decision to Grant, dated Jun. 24, 2021, received in European Patent Application No. 19159743.4 (7555EP), which corresponds with U.S. Appl. No. 16/145,025, 2 pages.
Certificate of Grant, dated Aug. 13, 2021, received in European Patent Application No. 19159743.4 (7555EP), which corresponds with U.S. Appl. No. 16/145,025, 3 pages.
Office Action, dated Dec. 13, 2021, received in Japanese Patent Application No. 2020-562126 (7555JP), which corresponds with U.S. Appl. No. 16/145,025, 2 pages.
Notice of Allowance, dated May 30, 2022, received in Japanese Patent Application No. 2020-562126 (7555JP), which corresponds with U.S. Appl. No. 16/145,025, 2 pages.
Patent, dated Jun. 30, 2022, received in Japanese Patent Application No. 2020-562126 (7555JP), which corresponds with U.S. Appl. No. 16/145,025, 3 pages.
Office Action, dated Oct. 26, 2022, received in Korean Patent Application No. 2020-7032392 (7555KR), which corresponds with U.S. Appl. No. 16/145,025, 5 pages.
Notice of Allowance, dated May 19, 2023, received in Korean Patent Application No. 2020-7032392 (7555KR), which corresponds with U.S. Appl. No. 16/145,025, 2 pages.
Patent, dated Jun. 8, 2023, received in Korean Patent Application No. 2020-7032392 (7555KR), which corresponds with U.S. Appl. No. 16/145,025, 4 pages.
Office Action, dated Sep. 20, 2022, received in Indian Patent Application No. 202017052984 (7555IN), which corresponds with U.S. Appl. No. 16/145,025, 11 pages.
Notice of Allowance, dated May 15, 2020, received in U.S. Appl. No. 16/574,029 (7559), 10 pages.
Office Action, dated Jan. 20, 2022, received in Australian Patent Application No. 2019349408 (7559AU), which corresponds with U.S. Appl. No. 16/574,029, 3 pages.
Notice of Acceptance, dated Jul. 29, 2022, received in Australian Patent Application No. 2019349408 (7559AU), which corresponds with U.S. Appl. No. 16/574,029, 3 pages.

(56) References Cited

OTHER PUBLICATIONS

Notice of Allowance, dated Mar. 2, 2022, received in Chinese Patent Application No. 202110369762.9 (7559CN01), which corresponds with U.S. Appl. No. 16/574,029, 7 pages.
Patent, dated Mar. 29, 2022, received in Chinese Patent Application No. 202110369762.9 (7559CN01), which corresponds with U.S. Appl. No. 16/574,029, 6 pages.
Notice of Allowance, dated Apr. 25, 2022, received in Japanese Patent Application No. 2021-510765 (7559JP), which corresponds with U.S. Appl. No. 16/574,029, 2 pages.
Patent, dated May 12, 2022, received in Japanese Patent Application No. 2021-510765 (7559JP), which corresponds with U.S. Appl. No. 16/574,029, 3 pages.
Office Action, dated Dec. 29, 2022, received in Indian Patent Application No. 202117008282 (7559IN), which corresponds with U.S. Appl. No. 16/574,029, 10 pages.
Office Action, dated Feb. 24, 2023, received in Indian Patent Application No. 202118009402 (7559IN01), which corresponds with U.S. Appl. No. 16/574,029, 7 pages.
Office Action, dated Jul. 6, 2022, received in Korean Patent Application No. 2021-7005584 (7559KR), which corresponds with U.S. Appl. No. 16/574,029, 13 pages.
Notice of Allowance, dated Mar. 22, 2023, received in Korean Patent Application No. 2021-7005584 (7559KR), which corresponds with U.S. Appl. No. 16/574,029, 2 pages.
Patent, dated Apr. 11, 2023, received in Korean Patent Application No. 2021-7005584 (7559KR), which corresponds with U.S. Appl. No. 16/574,029, 4 pages.
Office Action, dated Apr. 30, 2021, received in U.S. Appl. No. 17/030,209 (7639), 27 pages.
Notice of Allowance, dated Sep. 13, 2021, received in U.S. Appl. No. 17/030,209 (7639), 9 pages.
Office Action, dated Jan. 8, 2021, received in U.S. Appl. No. 17/018,958 (7659), 27 pages.
Notice of Allowance, dated Apr. 20, 2021, received in U.S. Appl. No. 17/018,958 (7659), 12 pages.
Office Action, dated Aug. 13, 2021, received in Australian Patent Application No. 2020239688 (7659AU), which corresponds with U.S. Appl. No. 17/018,958, 4 pages.
Office Action, dated Nov. 5, 2021, received in Australian Patent Application No. 2020239688 (7659AU), which corresponds with U.S. Appl. No. 17/018,958, 4 pages.
Notice of Allowance, dated Feb. 22, 2022, received in Australian Patent Application No. 2020239688 (7659AU), which corresponds with U.S. Appl. No. 17/018,958, 3 pages.
Certificate of Grant, dated Jun. 23, 2022, received in Australian Patent Application No. 2020239688 (7659AU), which corresponds with U.S. Appl. No. 17/018,958, 4 pages.
Office Action, dated Dec. 18, 2020, received in Danish Patent Application No. 202070602 (7659DK), which corresponds with U.S. Appl. No. 17/018,958, 10 pages.
Office Action, dated Mar. 14, 2022, received in Danish Patent Application No. 202070602 (7659DK), which corresponds with U.S. Appl. No. 17/018,958, 5 pages.
Office Action, dated Nov. 14, 2022, received in Danish Patent Application No. 202070602 (7659DK), which corresponds with U.S. Appl. No. 17/018,958, 2 pages.
Office action, dated Dec. 3, 2021, received in Indian Patent Application No. 202014041448 (7659IN), which corresponds with U.S. Patent Application o. U.S. Appl. No. 17/018,958, 10 pages.
Notice of Allowance, dated Dec. 20, 2021, received in Japanese Patent Application No. 2020-159787 (7659JP), which corresponds with U.S. Appl. No. 17/018,958, 2 pages.
Notice of Allowance, dated Feb. 18, 2022, received in Japanese Patent Application No. 2022-005327 (7659JP01), which corresponds with U.S. Appl. No. 17/018,958, 2 pages.
Patent, dated Mar. 14, 2022, received in Japanese Patent Application No. 2022-005327 (7659JP01), which corresponds with U.S. Appl. No. 17/018,958, 3 pages.

Office Action, dated Nov. 8, 2021, received in Korean Patent Application No. 2020-0124085 (7659KR), which corresponds with U.S. Appl. No. 17/018,958, 9 pages.
Notice of Allowance, dated Jul. 13, 2022, received in Korean Patent Application No. 2020-0124085 (7659KR), which corresponds with U.S. Appl. No. 17/018,958, 2 pages.
Patent, dated Jul. 22, 2022, received in Korean Patent Application No. 2020-0124085 (7659KR), which corresponds with U.S. Appl. No. 17/018,958, 4 pages.
Office Action, dated Aug. 13, 2021, received in U.S. Appl. No. 17/202,233 (7678), 19 pages.
Final Office Action, dated Feb. 15, 2022, received in U.S. Appl. No. 17/202,233 (7678), 24 pages.
Office Action, dated Aug. 16, 2022, received in U.S. Appl. No. 17/202,233 (7678), 25 pages.
Notice of Allowance, dated Mar. 22, 2023, received in U.S. Appl. No. 17/202,233 (7678), 8 pages.
Office Action, dated Feb. 21, 2021, received in U.S. Appl. No. 16/841,550 (7685), 8 pages.
Notice of Allowance, dated May 4, 2021, received in U.S. Appl. No. 16/841,550 (7685), 12 pages.
Notice of Allowance, dated Dec. 7, 2021, received in U.S. Appl. No. 16/997,860 (7724), 10 pages.
Office Action, dated Jan. 22, 2021, received in U.S. Appl. No. 17/018,980 (7738), 17 pages.
Office Action, dated May 14, 2021, received in U.S. Appl. No. 17/018,980 (7738), 4 pages.
Notice of Allowance, dated May 28, 2021, received in U.S. Appl. No. 17/018,980 (7738), 5 pages.
Office Action, dated Aug. 20, 2021, received in Australian Patent Application No. 2020239675 (7738AU), which corresponds with U.S. Appl. No. 17/018,980, 4 pages.
Office Action, dated Dec. 16, 2021, received in Australian Patent Application No. 2020239675 (7738AU), which corresponds with U.S. Appl. No. 17/018,980, 2 pages.
Notice of Allowance, dated Jan. 21, 2022, received in Australian Patent Application No. 2020239675 (7738AU), which corresponds with U.S. Appl. No. 17/018,980, 3 pages.
Certificate of Grant, dated May 26, 2022, received in Australian Patent Application No. 2020239675 (7738AU), which corresponds with U.S. Appl. No. 17/018,980, 3 pages.
Office Action, dated Dec. 18, 2020, received in Danish Patent Application No. 202070603 (7738DK), which corresponds with U.S. Appl. No. 17/018,980, 9 pages.
Office Action, dated Feb. 25, 2022, received in Danish Patent Application No. 202070603 (7738DK), which corresponds with U.S. Appl. No. 17/018,980, 2 pages.
Office Action, dated Feb. 17, 2023, received in Danish Patent Application No. 202070603 (7738DK), which corresponds with U.S. Appl. No. 17/018,980, 4 pages.
Office Action, dated Aug. 10, 2021, received in Indian Patent Application No. 202014040937 (7738IN), which corresponds with U.S. Appl. No. 17/018,980, 7 pages.
Office Action, dated Dec. 20, 2021, received in Japanese Patent Application No. 2020-159788 (7738JP), which corresponds with U.S. Appl. No. 17/018,980, 2 pages.
Notice of Allowance, dated Feb. 18, 2022, received in Japanese Patent Application No. 2022-005328 (7738JP01), which corresponds with U.S. Appl. No. 17/018,980, 2 pages.
Patent, dated Mar. 14, 2022, received in Japanese Patent Application No. 2022-005328 (7738JP01), which corresponds with U.S. Appl. No. 17/018,980, 3 pages.
Office Action, dated Dec. 22, 2023, received in Korean Patent Application No. 2020-0123687 (7738KR), which corresponds with U.S. Appl. No. 17/018,980, 9 pages.
Office Action, dated Jan. 7, 2021, received in U.S. Appl. No. 17/018,994 (7739), 7 pages.
Notice of Allowance, dated Feb. 23, 2021, received in U.S. Appl. No. 17/018,994 (7739), 8 pages.
Office Action, dated Aug. 13, 2021, received in Australian Patent Application No. 2020239691 (7739AU), U.S. Appl. No. 17/018,994 (7739AU), 5 pages.

(56) References Cited

OTHER PUBLICATIONS

Office Action, dated Nov. 15, 2021, received in Australian Patent Application No. 2020239691 (7739AU), U.S. Appl. No. 17/018,994, 4 pages.
Notice of Allowance, dated Mar. 2, 2022, received in Australian Patent Application No. 2020239691 (7739AU), U.S. Appl. No. 17/018,994, 3 pages.
Office Action, dated Jan. 12, 2021, received in Danish Patent Application No. 2020-70604 (7739DK), which corresponds with U.S. Appl. No. 17/018,994, 8 pages.
Office Action, dated Feb. 4, 2022, received in Danish Patent Application No. 2020-70604 (7739DK), which corresponds with U.S. Appl. No. 17/018,994, 3 pages.
Office Action, dated Nov. 2, 2022, received in Danish Patent Application No. 2020-70604 (7739DK), which corresponds with U.S. Appl. No. 17/018,994, 3 pages.
Office Action, dated Dec. 2, 2021, received in Indian Patent Application No. 202014041104 (7739IN), which corresponds with U.S. Appl. No. 17/018,994, 7 pages.
Office Action, dated Jan. 7, 2022, received in Japanese Patent Application No. 2020-159789 (7739JP), which corresponds with U.S. Appl. No. 17/018,994, 5 pages.
Notice of Allowance, dated Aug. 8, 2022, received in Japanese Patent Application No. 2020-159789 (7739JP), which corresponds with U.S. Appl. No. 17/018,994, 1 page.
Office Action, dated Sep. 14, 2023, received in U.S. Appl. No. 17/720,227 (7786), 5 pages.
Notice of Allowance, dated Nov. 13, 2023, received in U.S. Appl. No. 17/720,227 (7786), 5 pages.
Patent, dated Sep. 9, 2022, received in Japanese Patent Application No. 2020-159789 (7739JP), which corresponds with U.S. Appl. No. 17/018,994, 3 pages.
Office Action, dated Apr. 5, 2022, received in U.S. Appl. No. 17/307,957 (7794), 10 pages.
Notice of Allowance, dated May 4, 2022, received in U.S. Appl. No. 17/307,957 (7794), 12 pages.
Office Action, dated Aug. 31, 2022, received in Australian Patent Application No. 2021240284 (7794AU), which corresponds with U.S. Appl. No. 17/307,957, 2 pages.
Notice of Allowance, dated Sep. 14, 2022, received in Australian Patent Application No. 2021240284 (7794AU), which corresponds with U.S. Appl. No. 17/307,957, 3 pages.
Patent, dated Jan. 19, 2023, received in Australian Patent Application No. 2021240284 (7794AU), which corresponds with U.S. Appl. No. 17/307,957, 3 pages.
Office Action, dated Nov. 2, 2022, received in Chinese Patent Application No. 202110660753.5 (7794CN), 2 pages.
Patent, dated Jun. 20, 2023, received in Chinese Patent Application No. 202110660753.5 (7794CN), 7 pages.
Office Action, dated Sep. 1, 2023, received in Japanese Patent Application No. 2022-103836 (7794JP), which corresponds with U.S. Appl. No. 17/307,957, 2 pages.
Office Action, dated Nov. 24, 2023, received in Korean Patent Application No. 2023-7019367 (7794KR), which corresponds with U.S. Appl. No. 17/307,957, 7 pages.
Office Action, dated Jul. 22, 2022, received in U.S. Appl. No. 17/344,846 (7802), 8 pages.
Final Office Action, dated Dec. 23, 2022, received in U.S. Appl. No. 17/344,846 (7802), 8 pages.
Notice of Allowance, dated Apr. 28, 2023, received in U.S. Appl. No. 17/344,846 (7802), 5 pages.
Office Action, dated Mar. 29, 2023, received in Australian Patent Application No. 2022202851 (7802AU), which corresponds with U.S. Appl. No. 17/344,846, 3 pages.
Office Action, dated Dec. 8, 2023, received in Japanese Patent Application No. 2022-142210 (7802JP), which corresponds with U.S. Appl. No. 17/344,846, 5 pages.
Office Action, dated Feb. 3, 2023, received in U.S. Appl. No. 17/568,624 (7839), 44 pages.

Final Office Action, dated May 15, 2023, received in U.S. Appl. No. 17/568,624 (7839), 31 pages.
Office Action, dated Oct. 27, 2023, received in U.S. Appl. No. 17/568,624 (7839), 33 pages.
Noticed of Allowance, dated Dec. 7, 2022, received in U.S. Appl. No. 17/716,984 (7859), 10 pages.
Office Action, dated Sep. 4, 2023, received in Australian Patent Application No. 2022235625 (7859AU), which corresponds with U.S. Appl. No. 17/568,624, 3 pages.
Office Action, dated Jun. 2, 2023, received in Japanese Patent Application No. 2022-077644 (7859JP), which corresponds with U.S. Appl. No. 17/716,984, 6 pages.
Final Office Action, dated Jun. 2, 2023, received in Japanese Patent Application No. 2022-077644 (7859JP), which corresponds with U.S. Appl. No. 17/716,984, 4 pages.
Office Action, dated Dec. 11, 2023, received in Korean Patent Application No. 2023-7012345 (7859KR), which corresponds with U.S. Appl. No. 17/716,984, 10 pages.
Office Action, dated May 17, 2023, received in U.S. Appl. No. 17/750,133 (7877), 23 pages.
Notice of Allowance, dated Jun. 28, 2023, received in U.S. Appl. No. 17/750,133 (7877), 10 pages.
Office Action, dated Jul. 5, 2023, received in Australian Patent Application No. 2022231686 (7877AU), which corresponds with U.S. Appl. No. 17/750,133, 2 pages.
Notice of Allowance, dated Jul. 6, 2023, received in U.S. Appl. No. 18/107,381 (7936), 24 pages.
European Search Report, dated Sep. 23, 2021, received in European Patent Application No. 21178349.3 (7532EP), which corresponds with U.S. Appl. No. 16/145,015, 4 pages.
Invitation to Pay Additional Fees, dated Jul. 15, 2019, received in International Patent Application No. PCT/US2019/029904 (7532WO), which corresponds with U.S. Appl. No. 16/145,015, 29 pages.
International Search Report and Written Opinion, dated Sep. 9, 2019, received in International Patent Application No. PCT/US2019/029904 (7532WO), which corresponds with U.S. Appl. No. 16/145,015, 31 pages.
European Search Report, dated Jul. 4, 2019, received in European Patent Application No. 19158743.4 (7555EP), which corresponds with U.S. Appl. No. 16/145,025, 4 pages.
Invitation to Pay Additional Fees, dated Dec. 12, 2019, received in International Patent Application No. PCT/US2019052140 (7559WO), which corresponds with U.S. Appl. No. 16/574,029, 18 pages.
International Search Report and Written Opinion, dated Feb. 5, 2020, received in International Patent Application No. PCT/US2019052140 (7559WO), which corresponds with U.S. Appl. No. 16/574,029, 22 pages.
Invitation to Pay Additional Fees, dated Jan. 19, 2021, received in International Patent Application No. PCT/US2020/052641 (7697WO), which corresponds with U.S. Appl. No. 17/030,209, 15 pages.
International Search Report and Written Opinion, dated Mar. 12, 2021, received in International Patent Application No. PCT/US2020/052641 (7697WO), which corresponds with U.S. Appl. No. 17/030,209, 21 pages.
Invitation to Pay Additional Fees, dated Jun. 23, 2021, received in International Patent Application No. PCT/US2021/022378 (7657WO), which corresponds with U.S. Appl. No. 17/200,676, 15 pages.
International Search Report and Written Opinion, dated Aug. 13, 2021, received in International Patent Application No. PCT/US2021/022378 (7657WO), which corresponds with U.S. Appl. No. 17/200,676, 19 pages.
Invitation to Pay Additional Fees, dated May 17, 2021, received in International Patent Application No. PCT/US2021/015556 (7659WO), which corresponds with U.S. Appl. No. 17/018,958, 19 pages.
International Search Report and Written Opinion, dated Jul. 8, 2021, received in International Patent Application No. PCT/US2021/015556 (7659WO), which corresponds with U.S. Appl. No. 17/018,958, 26 pages.
Invitation to Pay Additional Fees, dated Jul. 26, 2022, received in International Patent Application No. PCT/US2022/024894 (7786WO), which corresponds with U.S. Appl. No. 17/720,227, 34 pages.

(56) References Cited

OTHER PUBLICATIONS

Invitation to Pay Additional Fees, dated Oct. 5, 2023, received in International Patent Application No. PCT/US2023/021563 (7853WO), which corresponds with U.S. Appl. No. 18/144,746, 19 pages.
International Search Report and Written Opinion, dated Dec. 14, 2023, received in International Patent Application No. PCT/US2023/021563 (7853WO), which corresponds with U.S. Appl. No. 18/144,746, 29 pages.
Grant Certificate, dated Jul. 25, 2024, received in Australian Patent Application No. 2022202851 (7802AU), which corresponds with U.S. Appl. No. 17/344,846, 3 pages.
Grant Certificate, dated Jul. 25, 2024, received in Australian Patent Application No. 2022235625 (7859AU), which corresponds with U.S. Appl. No. 17/568,624, 3 pages.
Notice of Allowance, dated Aug. 7, 2024, received in U.S. Appl. No. 18/372,606 (7965), 7 pages.
Office Action, dated Sep. 6, 2024, received in U.S. Appl. No. 18/219,627 (7975), 17 pages.
Notice of Allowance, dated Jun. 13, 2024, received in U.S. Appl. No. 18/388,176 (8005), 10 pages.
Fukiage et al., "Reduction of Contradictory Partial Occlusion in Mixed Reality by Using Characteristics of Transparency Perception", 2012 IEEE International Symposium On, IEEE, Nov. 5, 2012, 11 pages.
Joaquim, et al., "Dynamic Occlusion Handling for Real-Time AR Applications", https://doi.org/10.1145335/99973365700, Nov. 2019, 10 pages.
Office Action, dated May 23, 2024, received in European Patent Application No. 21717681.7 (7678EP), which corresponds with U.S. Appl. No. 17/202,233, 6 pages.
Notice of Allowance, dated Mar. 5, 2024, received in Japanese Patent Application No. 2022-103836 (7794JP), which corresponds with U.S. Appl. No. 17/307,957, 1 page.
Final Office Action, dated Jul. 5, 2024, received in Korean Patent Application No. 2023-7019367 (7794KR), which corresponds with U.S. Appl. No. 17/307,957, 3 pages.
Notice of Allowance, dated Mar. 25, 2024, received in Australian Patent Application No. 2022202851 (7802AU), which corresponds with U.S. Appl. No. 17/344,846, 3 pages.
Patent, dated May 13, 2024, received in Japanese Patent Application No. 2022-142210 (7802JP), which corresponds with U.S. Appl. No. 17/344,846, 3 pages.
Notice of Allowance, dated Feb. 15, 2024, received in U.S. Appl. No. 17/568,624 (7839), 8 pages.
Notice of Allowance, dated Mar. 25, 2024, received in Australian Patent Application No. 2022235625 (7859AU), which corresponds with U.S. Appl. No. 17/568,624, 3 pages.
Notice of Allowance, dated Feb. 9, 2024, received in Australian Patent Application No. 2022231686 (7877AU), which corresponds with U.S. Appl. No. 17/750,133, 3 pages.
Certificate of Grant, dated Jun. 13, 2024, received in Australian Patent Application No. 2022231686 (7877AU), which corresponds with U.S. Appl. No. 17/750,133, 3 pages.
Office Action, dated Apr. 24, 2024, received in U.S. Appl. No. 18/372,606 (7965), 8 pages.
Office Action, dated Jun. 20, 2024, received in U.S. Appl. No. 18/382,444 (8007), 14 pages.
Extended European Search Report, dated Apr. 26, 2024, received in European Patent Application No. 24151350.6 (7877EP), which corresponds with U.S. Appl. No. 17/750,133, 8 pages.
Office Action, dated Mar. 24, 2025, received in Japanese Patent Application No. 2024-060325 (7554JP), which corresponds with U.S. Appl. No. 16/138,779, 5 pages.
Patent, dated Mar. 11, 2025, received in Indian Patent Application No. 202017052984 (7555IN), which corresponds with U.S. Appl. No. 16/145,025, 4 pages.
Office Action, dated Apr. 28, 2025, received in European Patent Application No. 19783191.0 (7559EP), which corresponds with U.S. Appl. No. 16/574,029, 6 pages.
Patent, dated Mar. 21, 2025, received in Indian Patent Application No. 202118009402 (7559IN01), which corresponds with U.S. Appl. No. 16/574,029, 4 pages.
Office Action, dated Apr. 16, 2025, received in European Application No. 20789374.4 (7639EP), which corresponds with U.S. Appl. No. 17/030,209, 14 pages.
Patent, dated Feb. 27, 2025, received in Indian Patent Application No. 202014041448 (7659IN), which corresponds with U.S. Appl. No. 17/018,958, 6 pages.
Office Action, dated Mar. 4, 2025, received in Japanese Patent Application No. 2024-026846 (7724JP), which corresponds with U.S. Appl. No. 16/997,860, 7 pages.
Office Action, dated Mar. 20, 2025, received in U.S. Appl. No. 18/144,746 (7853), 22 pages.
Decision to Grant, dated Feb. 20, 2025, received in European Patent Application No. 24151350.6 (7877EP), 4 pages.
Patent, dated Apr. 1, 2025, received in European Patent Application No. 24151350.6 (7877EP), 7 pages.
Office Action, dated May 13, 2025, received in Japanese Patent Application No. 2024-076652 (8007JP), which corresponds with U.S. Appl. No. 18/382,444, 4 pages.
Office Action, dated Apr. 29, 2025, received in Australian Patent Application No. 2024202935 (8060AU), 5 pages.
Office Action, dated Feb. 27, 2025, received in U.S. Appl. No. 18/656,318 (8064), 15 pages.
Notice of Allowance, dated May 16, 2025, received in U.S. Appl. No. 18/656,318 (8064), 11 pages.
Notice of Allowance, dated May 27, 2025, received in Chinese Patent Application No. 202210629947.3 (7639CN01), which corresponds with U.S. Appl. No. 17/030,209, 5 pages.
Office Action, dated Jun. 2, 2025, received in U.S. Appl. No. 18/219,627 (7975), 26 pages.
Office Action, dated Dec. 23, 2024, received in Indian Patent Application No. 202118009402 (7559IN01), which corresponds with U.S. Appl. No. 16/574,029, 3 pages.
Office Action, dated Jan. 16, 2025, received in Chinese Patent Application No. 202210629947.3 (7639CN01), which corresponds with U.S. Appl. No. 17/030,209, 2 pages.
Office action, dated Sep. 30, 2024, received in Indian Patent Application No. 202014041448 (7659IN), which corresponds with U.S. Appl. No. 17/018,958, 8 pages.
Notice of Allowance, dated Dec. 5, 2024, received in Korean Patent Application No. 2020-0123687 (7738KR), which corresponds with U.S. Appl. No. 17/018,980, 3 pages.
Patent, dated Sep. 23, 2024, received in Indian Patent Application No. 202014041104 (7739IN), which corresponds with U.S. Appl. No. 17/018,994, 6 pages.
Notice of Allowance, dated Nov. 7, 2024, received in Korean Patent Application No. 2023-7019367 (7794KR), which corresponds with U.S. Appl. No. 17/307,957, 3 pages.
Patent, dated Feb. 6, 2025, received in Korean Patent Application No. 2023-7019367 (7794KR), which corresponds with U.S. Appl. No. 17/307,957, 4 pages.
Office Action, dated Nov. 5, 2024, received in Japanese Patent Application No. 2022-077644 (7859JP), which corresponds with U.S. Appl. No. 17/716,984, 17 pages.
Office Action, dated Sep. 23, 2024, received in Korean Patent Application No. 2023-7012345 (7859KR), which corresponds with U.S. Appl. No. 17/716,984, 5 pages.
Intent to Grant, dated Oct. 14, 2024, received in European Patent Application No. 24151350.6 (7877EP), 11 pages.
Final Office Action, dated Jan. 17, 2025, received in U.S. Appl. No. 18/219,627 (7975), 19 pages.
Notice of Allowance, dated Jan. 10, 2025, received in U.S. Appl. No. 18/382,444 (8007), 6 pages.
Office Action, dated Jun. 3, 2025, received in Indian Patent Application No. 202318041184 (7554IN), which corresponds with U.S. Appl. No. 16/138,779, 8 pages.
Office Action, dated Jun. 3, 2025, received in Indian Patent Application No. 202318041182 (7617IN), 9 pages.
Office Action, dated Jun. 16, 2023, received in Indian Patent Application No. 202318041185 (7794IN), 8 pages.

(56) References Cited

OTHER PUBLICATIONS

Notice of Allowance, dated Jul. 15, 2025, received in U.S. Appl. No. 18/144,746 (7853), 9 pages.
Patent, dated Jul. 7, 2025, received in Japanese Patent Application No. 2024-060325 (7554JP), which corresponds with U.S. Appl. No. 16/138,779, 4 pages.
Patent, dated Aug. 19, 2025, received in Chinese Patent Application No. 202210629947.3 (7639CN01), which corresponds with U.S. Appl. No. 17/030,209, 4 pages.
Notice of Allowance, Aug. 22, 2025, received in Japanese Patent Application No. 2024-026846 (7724JP), which corresponds with U.S. Appl. No. 16/997,860, 2 pages.
Office Action, dated Jul. 7, 2025, received in Australian Patent Application No. 2024204720 (8005AU), which corresponds with U.S. Appl. No. 18/388,176, 2 pages.
Notice of Allowance, dated Jul. 28, 2025, received in Japanese Patent Application No. 2024-076652 (8007JP), which corresponds with U.S. Appl. No. 18/382,444, 2 pages.

\* cited by examiner

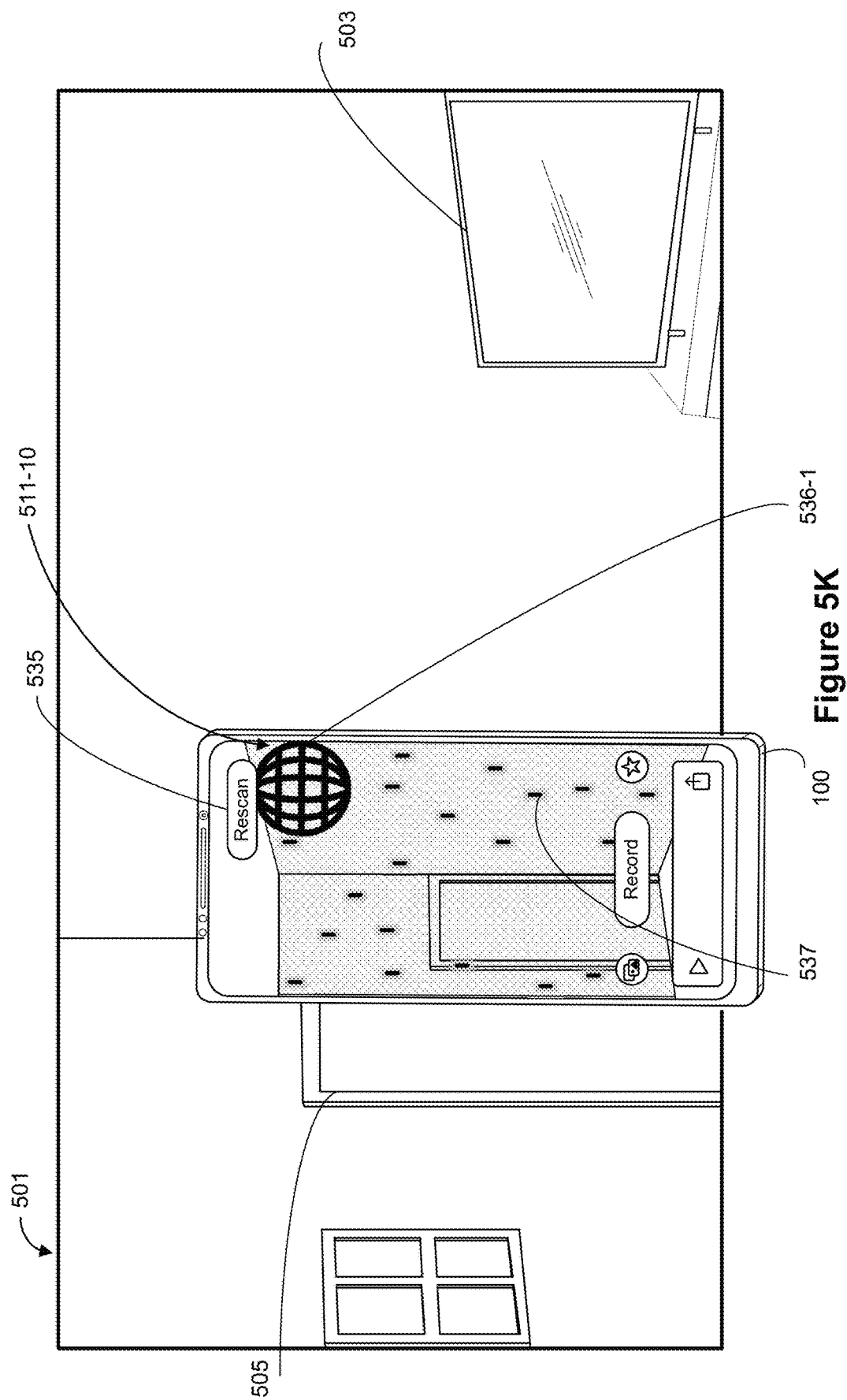

612 In response to receiving the request to add the first virtual effect to the displayed representation of the field of view of the one or more cameras and in accordance with a determination that the first virtual effect does not require a scan of the physical environment, display the first virtual effect.

614 While displaying the first virtual effect in response to receiving the request to add the first virtual effect to the displayed representation of the field of view of the one or more cameras and in accordance with the determination that the first virtual effect does not require a scan of the physical environment:
  receive a request to add a second virtual effect distinct from the first virtual effect to the displayed representation of the field of view of the one or more cameras;
  in response to receiving the request to add the second virtual effect to the displayed representation of the field of view of the one or more cameras and in accordance with a determination that the second virtual effect requires a scan of the physical environment:
    initiate a scan of the physical environment to detect one or more features of the physical environment; and
    display a user interface that indicates a progress of the scan of the physical environment;
  in response to receiving the request to add the second virtual effect to the displayed representation of the field of view of the one or more cameras and in accordance with a determination that the second virtual effect does not require a scan of the physical environment, display the second virtual effect.

616 After completing the scan of the physical environment, display the first virtual effect over the field of view of the one or more cameras.

618 After completing at least a predefined portion of the scan of the physical environment, provide a notification indicating that the first virtual effect is ready to be displayed.

620 After completing at least a predefined portion of the scan of the physical environment, provide a user-selectable user interface element that, when selected, causes the first virtual effect to be displayed; and
in response to detecting selection of the user interface element, display the first virtual effect.

Figure 6B

622 While scanning the physical environment, display a progress indicator that indicates one or more features of the physical environment that have been detected.

624 Display an option for discarding the scan of the physical environment.

626 Display one or more visual prompts indicating an error condition.

628 While scanning the physical environment, display a progress indicator that indicates two or more features of the physical environment that have been detected.

630 Display the first virtual effect over the representation of the field of view of the one or more cameras; and
while displaying the first virtual effect over the field of view of the one or more cameras, provide a user interface element for switching to a third virtual effect distinct from the first virtual effect.

632 Receive a user input selecting the user interface element for switching to the third virtual effect distinct from the first virtual effect; and
in response to the user input selecting the user interface element for switching to the third virtual effect, display the third virtual effect without initiating a scan.

634 Display a user interface that includes one or more representations of one or more selectable virtual effects to be added to the displayed representation of the field of view of the one or more cameras and a selectable representation of the scanned physical environment.

636 While scanning the physical environment, detect one or more surfaces within the physical environment, wherein the first virtual effect changes an appearance of at least one of the one or more surfaces.

Figure 6C

638 The first virtual effect adds one or more virtual objects to the display of the representation of the field of view of the one or more cameras.

640 While scanning the physical environment, detect one or more surfaces within the physical environment, wherein the first virtual effect adds one or more virtual objects that are only displayed within an area corresponding to one or more surfaces detected during the scan.

642 While scanning the physical environment, detect one or more surfaces within the physical environment, wherein the first virtual effect comprises displaying one or more virtual objects interacting with one or more surfaces.

644 Capture a media item that includes the first virtual effect displayed in conjunction with the representation of the field of view of the one or more cameras.

646 While displaying the first virtual effect, receiving an input for moving the computer system within the physical environment;
in response to receiving the input for moving the computer system:
update the displayed representation of the field of view of the one or more cameras to include an updated representation of a current portion of a three-dimensional physical environment that is in the updated field of view of the one or more cameras; and
in accordance with a determination that the current portion of the three-dimensional physical environment that is in the updated field of view of the one or more cameras has not been scanned, and in accordance with a determination that the first virtual effect requires a scan of the physical environment:
initiate a scan of the current portion of the physical environment to detect one or more features of the current portion of the physical environment; and
display a user interface that indicates a progress of the scan of the physical environment.

702 Display, via the display generation component, a representation of a field of view of the one or more cameras, including a representation of a portion of a three-dimensional physical environment that is in the field of view of the one or more cameras

706 In response to receiving the request to add the virtual effect, add the virtual effect to the displayed representation of the field of view of the one or more cameras, including:

708 In accordance with a determination that a human subject is at a first position within the field of view of the one or more cameras, displaying the virtual effect in a first manner, wherein displaying the virtual effect in the first manner includes displaying one or more virtual elements that have an appearance determined based on:

location and/or shape of one or more detected surfaces in the three-dimensional physical environment that are separate from the human subject; and the first position of the human subject in the physical space

710 In accordance with a determination that the human subject is at a second position within the field of view of the one or more cameras, displaying the virtual effect in a second manner distinct from the first manner, wherein displaying the virtual effect in the second manner includes displaying one or more virtual elements that have an appearance determined based on:

the location and/or shape of one or more detected surfaces in the three-dimensional physical environment that are separate from the human subject; and the second position of the human subject in the physical space

712 The one or more virtual elements are displayed at a predetermined location relative to the respective position of the human subject.

---

714 In accordance with a determination that the human subject changes position, update display of a first virtual element of the one or more virtual elements based on the change in the position of the human subject.

---

716 At least one of the one or more virtual elements is visually deemphasized within a predefined area defined relative to the respective position of the human subject.

---

718 At least one of the one or more virtual elements is visually occluded behind the human subject.

---

720 The one or more virtual elements comprises a plurality of particles that are displayed in the representation of the field of view of the one or more camera.

---

722 The one or more virtual elements comprises simulated light that is displayed on at least one of the one or more detected surfaces in the three-dimensional physical environment.

---

724 Capture a media item that that includes the virtual effect displayed in conjunction with the representation of the field of view of the one or more cameras.

Figure 7B

SYSTEMS, METHODS, AND GRAPHICAL USER INTERFACES FOR ADDING EFFECTS IN AUGMENTED REALITY ENVIRONMENTS

RELATED APPLICATIONS

This application is a continuation of U.S. application Ser. No. 17/720,227, filed Apr. 13, 2022, which claims priority to U.S. Provisional Patent Application No. 63/176,322, filed Apr. 18, 2021, each of which are hereby incorporated by reference in its entirety.

TECHNICAL FIELD

This relates generally to computer systems for virtual/augmented reality, including but not limited to electronic devices that produce virtual/augmented reality environments.

BACKGROUND

The development of computer systems for virtual/augmented reality has increased significantly in recent years. But methods and interfaces for interacting with environments that include at least some virtual elements (e.g., augmented reality environments, mixed reality environments, and virtual reality environments) are cumbersome and inefficient.

Conventional methods of adding virtual effects using augmented reality do not intelligently determine surfaces and objects of the physical environment such that the virtual effect is displayed to interact with various portions the physical environment as a position of the augmented reality device changes. In some cases, conventional methods of displaying virtual effects do not take into account an individual that is within the physical environment such that the virtual effect is dynamically updated based on the various stationary portions of the physical environment as well as features of the individual. In addition, these methods take longer than necessary, thereby wasting energy and/or producing virtual effects that are not well synchronized with a "live view" of the physical environment produced by one or more cameras of the device or computer system. The energy usage consideration is particularly important in battery-operated devices.

SUMMARY

Accordingly, there is a need for computer systems with faster, more efficient methods and interfaces for displaying virtual effects using augmented reality environments. Such methods and interfaces reduce the number, extent, and/or nature of the inputs from a user and produce a more efficient human-machine interface. For battery-operated devices, such methods and interfaces conserve power and increase the time between battery charges.

The above deficiencies and other problems associated with user interfaces for virtual/augmented reality are reduced or eliminated by the disclosed computer systems. In some embodiments, the computer system includes a desktop computer. In some embodiments, the computer system is portable (e.g., a notebook computer, tablet computer, or handheld device). In some embodiments, the computer system includes a personal electronic device (e.g., a wearable electronic device, such as a watch). In some embodiments, the computer system has (and/or is in communication with) a touchpad. In some embodiments, the computer system has (and/or is in communication with) a touch-sensitive display (also known as a "touch screen" or "touch-screen display") or display generation component. In some embodiments, the computer system has a graphical user interface (GUI), one or more processors, memory and one or more modules, programs or sets of instructions stored in the memory for performing multiple functions. In some embodiments, the user interacts with the GUI in part through stylus and/or finger contacts and gestures on the touch-sensitive surface. In some embodiments, the functions optionally include game playing, image editing, drawing, presenting, word processing, spreadsheet making, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors.

In accordance with some embodiments, a method is performed at a computer system in communication with a display generation component and one or more cameras. The method includes displaying, via the display generation component, a representation of a field of view of the one or more cameras, including a representation of a portion of a three-dimensional physical environment that is in the field of view of the one or more cameras. The method further includes receiving a request to add a first virtual effect to the displayed representation of the field of view of the one or more cameras. The method includes, in response to receiving the request to add the first virtual effect to the displayed representation of the field of view of the one or more cameras and in accordance with a determination that the first virtual effect requires a scan of the physical environment, initiating a scan of the physical environment to detect one or more features of the physical environment and displaying a user interface that indicates a progress of the scan of the physical environment.

In accordance with some embodiments, a method is performed at a computer system in communication with a display generation component and one or more cameras. The method includes displaying, via the display generation component, a representation of a field of view of the one or more cameras, including a representation of a portion of a three-dimensional physical environment that is in the field of view of the one or more cameras. The method further includes receiving a request to add a virtual effect. The method includes, in response to receiving the request to add the virtual effect, adding the virtual effect to the displayed representation of the field of view of the one or more cameras, including. The method includes, in accordance with a determination that a human subject is at a first position within the field of view of the one or more cameras, displaying the virtual effect in a first manner, wherein displaying the virtual effect in the first manner includes displaying one or more virtual elements that have an appearance determined based on location and/or shape of one or more detected surfaces in the three-dimensional physical environment that are separate from the human subject and the first position of the human subject in the physical space. The method further includes, in accordance with a determination that the human subject is at a second position within the field of view of the one or more cameras, displaying the virtual effect in a second manner distinct from the first manner, wherein displaying the virtual effect in the second manner includes displaying one or more virtual elements that have an appearance determined based on the location and/or shape of one or more detected surfaces in the three-dimensional physical environment that are separate from the human subject and the second position of the human subject in the physical space.

In accordance with some embodiments, a computer system includes (and/or is in communication with) a display generation component (e.g., a display, a projector, a head-mounted display, a heads-up display, or the like), one or more cameras (e.g., video cameras that continuously, or repeatedly at regular intervals, provide a live preview of at least a portion of the contents that are within the field of view of the cameras and optionally generate video outputs including one or more streams of image frames capturing the contents within the field of view of the cameras), and one or more input devices (e.g., a touch-sensitive surface, such as a touch-sensitive remote control, or a touch-screen display that also serves as the display generation component, a mouse, a joystick, a wand controller, and/or cameras tracking the position of one or more features of the user such as the user's hands), optionally one or more pose sensors, optionally one or more sensors to detect intensities of contacts with the touch-sensitive surface, optionally one or more tactile output generators, one or more processors, and memory storing one or more programs; the one or more programs are configured to be executed by the one or more processors and the one or more programs include instructions for performing or causing performance of the operations of any of the methods described herein.

In accordance with some embodiments, a computer readable storage medium has stored therein instructions that, when executed by a computer system that includes (and/or is in communication with) a display generation component, one or more cameras, one or more input devices, optionally one or more pose sensors, optionally one or more sensors to detect intensities of contacts with the touch-sensitive surface, and optionally one or more tactile output generators, cause the computer system to perform or cause performance of the operations of any of the methods described herein.

In accordance with some embodiments, a graphical user interface on a computer system that includes (and/or is in communication with) a display generation component, one or more cameras, one or more input devices, optionally one or more pose sensors, optionally one or more sensors to detect intensities of contacts with the touch-sensitive surface, optionally one or more tactile output generators, a memory, and one or more processors to execute one or more programs stored in the memory includes one or more of the elements displayed in any of the methods described herein, which are updated in response to inputs, as described in any of the methods described herein. In accordance with some embodiments, a computer system includes (and/or is in communication with) a display generation component, one or more cameras, one or more input devices, optionally one or more pose sensors, optionally one or more sensors to detect intensities of contacts with the touch-sensitive surface, optionally one or more tactile output generators, and means for performing or causing performance of the operations of any of the methods described herein. In accordance with some embodiments, an information processing apparatus, for use in a computer system that includes (and/or is in communication with) a display generation component, one or more cameras, one or more input devices, optionally one or more pose sensors, optionally one or more sensors to detect intensities of contacts with the touch-sensitive surface, and optionally one or more tactile output generators, includes means for performing or causing performance of the operations of any of the methods described herein.

Thus, computer systems that have (and/or are in communication with) a display generation component, one or more cameras, one or more input devices, optionally one or more pose sensors, optionally one or more sensors to detect intensities of contacts with the touch-sensitive surface, and optionally one or more tactile output generators, are provided with improved methods and interfaces for adding virtual effects using augmented reality environments, thereby increasing the effectiveness, efficiency, and user satisfaction with such computer systems. Such methods and interfaces may complement or replace conventional methods for adding virtual effects using augmented reality environments.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 6A-6D are flow diagrams of a process for adding a virtual effect to a representation of a physical environment in accordance with some embodiments.

FIGS. 7A-7B are flow diagrams of a process for adding a virtual effect to a representation of a physical environment that includes a human subject in accordance with some embodiments.

DESCRIPTION OF EMBODIMENTS

As noted above, augmented reality environments are useful for adding virtual effects that are intelligently applied to surfaces and objects of the physical environment, even as a position of the augmented reality device changes. Conventional methods of displaying virtual effects do not scan features of the physical environment before applying the virtual effect using augmented reality. In some cases, conventional methods do not take into account an individual that is within the physical environment such that the virtual effect is dynamically updated based on the various stationary portions of the physical environment as well as features of the individual.

The systems, methods, and GUIs described herein improve user interface interactions with virtual/augmented reality environments in multiple ways. For example, they make it easier to apply interactive virtual effects to an augmented reality environment by automatically initiating a scanning process to detect surfaces within a physical environment. and by intelligently detecting human subjects within the physical environment to provide virtual effects that update based on a state of the human subject.

Figure 4A:
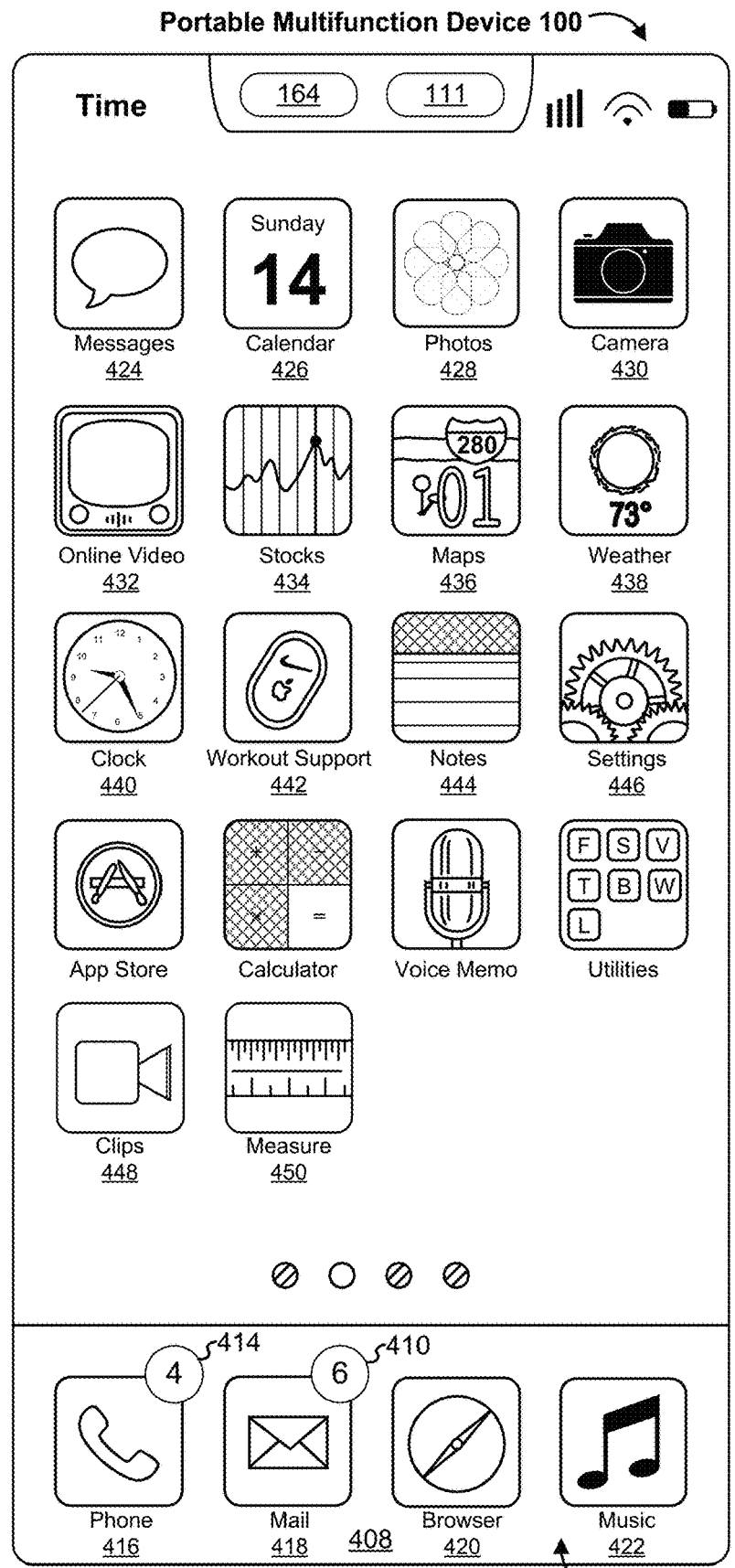
FIG. 4A illustrates an example user interface for a menu of applications on a portable multifunction device in accordance with some embodiments.
Figure 4B:
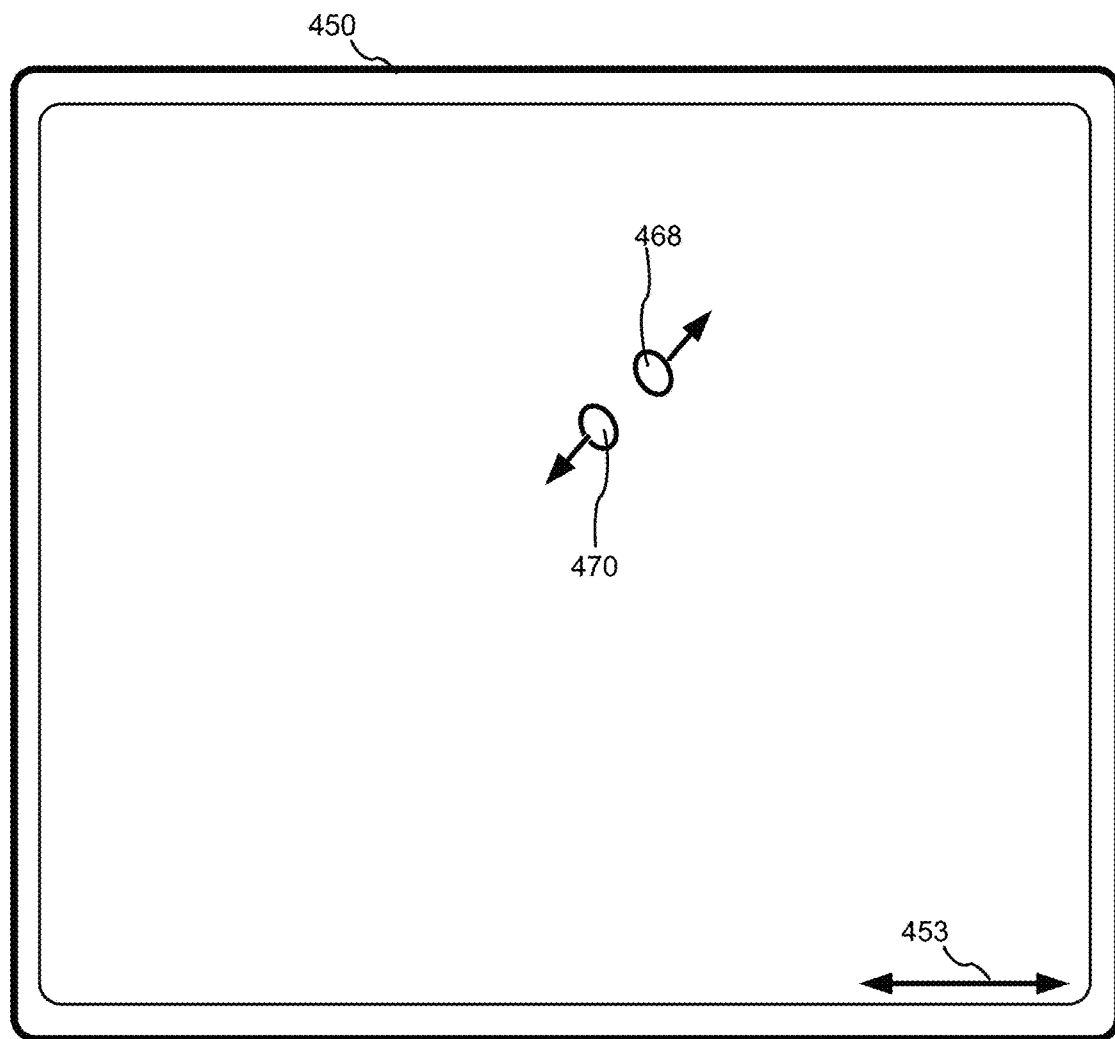
FIG. 4B illustrates an example user interface for a multifunction device with a touch-sensitive surface that is separate from the display in accordance with some embodiments.
Figure 4B:
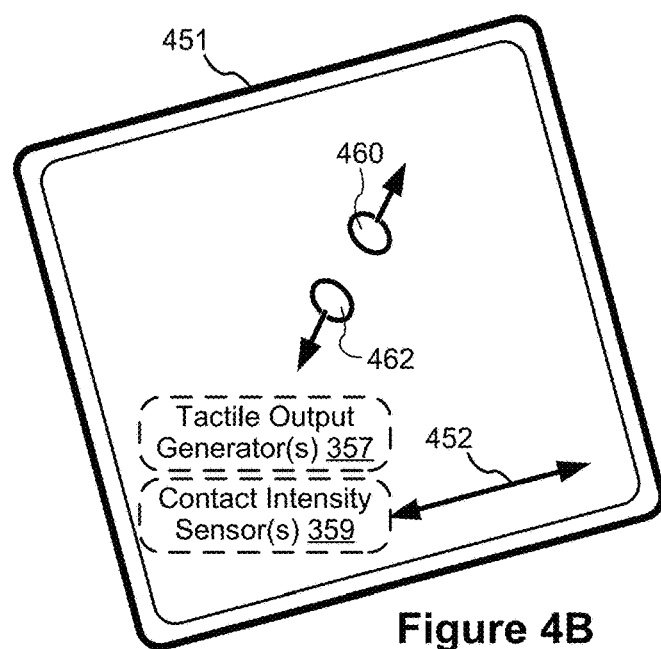
Figure 5A:
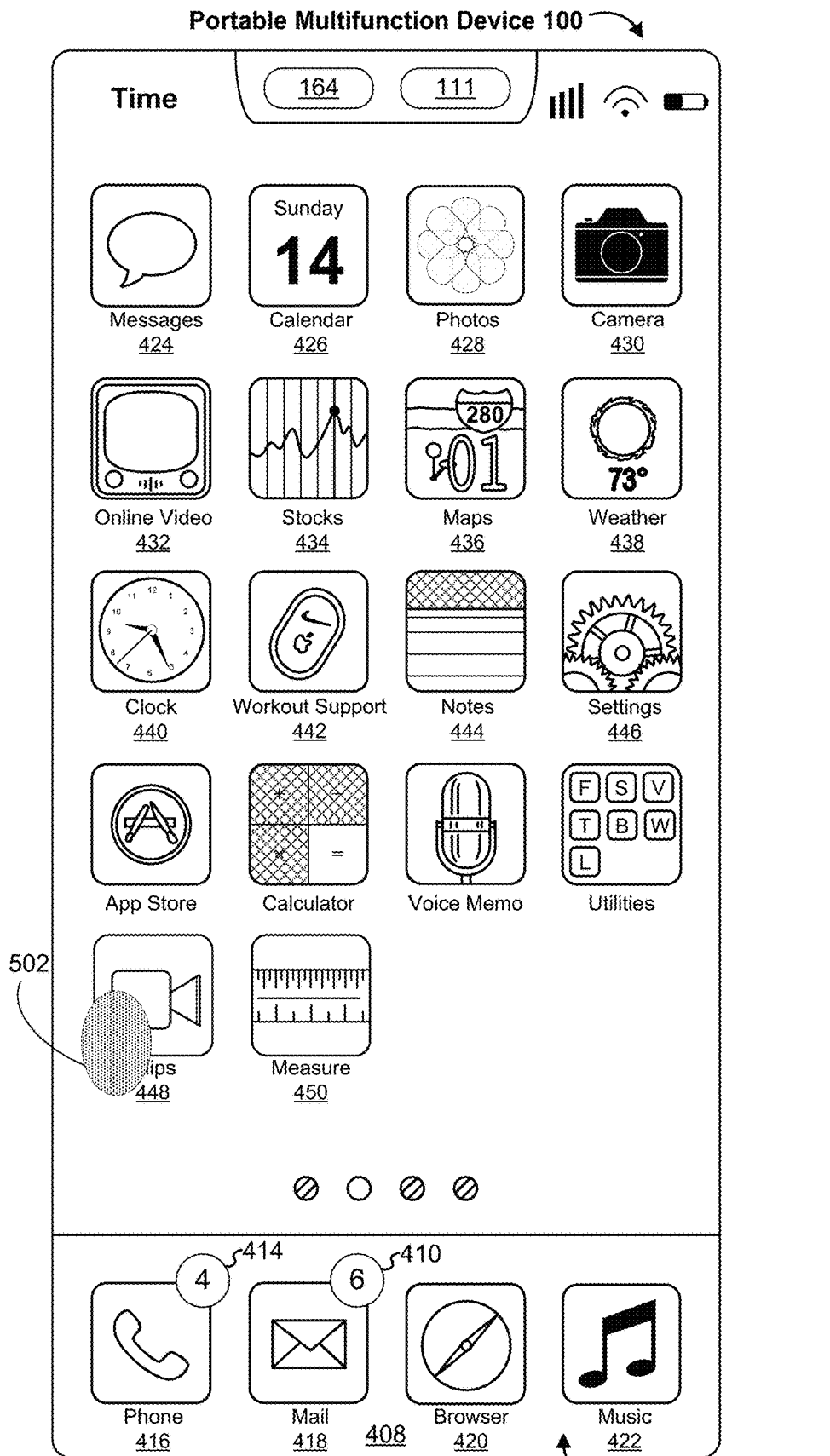
FIGS. 5A-5AK illustrate example user interfaces for adding virtual effects using augmented reality environments in accordance with some embodiments.

Below, FIGS. 1A-1B, 2A-2B, and 3A-3C provide a description of example devices. FIGS. 4A-4B and 5A-5AK illustrate example user interfaces for interacting with augmented reality environments. FIGS. 6A-6D illustrate a flow diagram of a method of adding a virtual effect to a representation of a physical environment. FIGS. 7A-7B illustrate a flow diagram of a method of adding a virtual effect to a representation of a physical environment that includes a human subject. The user interfaces in FIGS. 5A-5AK are used to illustrate the processes in FIGS. 6A-6D and 7A-7B.

Example Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Computer systems for virtual/augmented reality include electronic devices that produce virtual/augmented reality environments. Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad) that also includes, or is in communication with, one or more cameras.

In the discussion that follows, a computer system that includes an electronic device that has (and/or is in communication with) a display and a touch-sensitive surface is described. It should be understood, however, that the computer system optionally includes one or more other physical user-interface devices, such as a physical keyboard, a mouse, a joystick, a wand controller, and/or cameras tracking the position of one or more features of the user such as the user's hands.

The device typically supports a variety of applications, such as one or more of the following: a gaming application, a note taking application, a drawing application, a presentation application, a word processing application, a spreadsheet application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed by the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
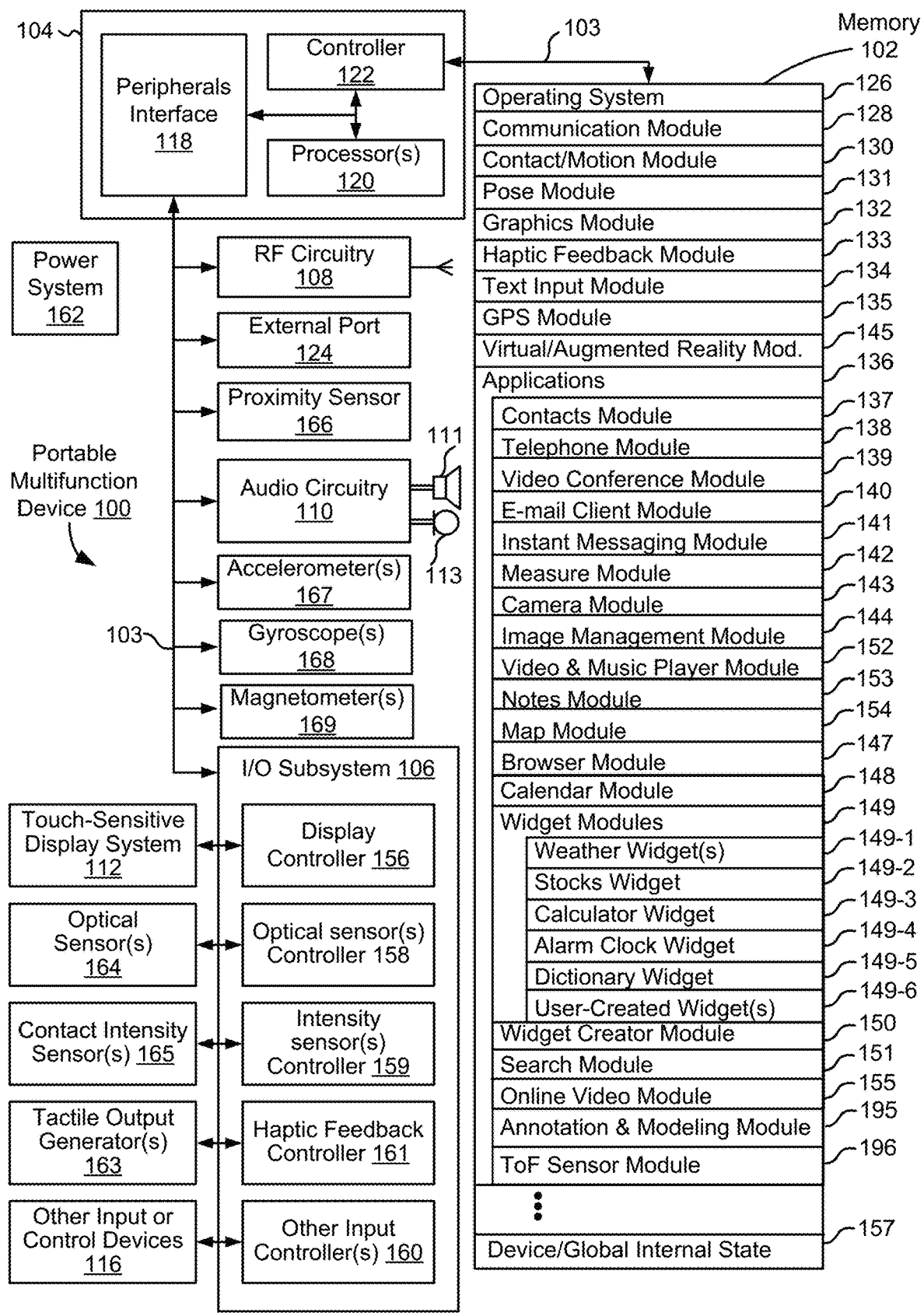
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164 (e.g., as part of one or more cameras). Device 100 optionally includes one or more intensity sensors 165 for detecting intensities of contacts on device 100 (e.g., a touch-sensitive surface such as touch-sensitive display system 112 of device 100). Device 100 optionally includes one or more tactile output generators 163 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user. Using tactile outputs to provide haptic feedback to a user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In some embodiments, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In some embodiments, projected mutual capacitance sensing technology is used, such as that found in the iPhone®, iPod Touch®, and iPad® from Apple Inc. of Cupertino, California.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164 (e.g., as part of one or more cameras). FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 163. FIG. 1A shows a tactile output generator coupled with haptic feedback controller 161 in I/O subsystem 106. In some embodiments, tactile output generator(s) 163 include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 163 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 167, gyroscopes 168, and/or magnetometers 169 (e.g., as part of an inertial measurement unit (IMU)) for obtaining information concerning the pose (e.g., position and orientation or attitude) of the device. FIG. 1A shows sensors 167, 168, and 169 coupled with peripherals interface 118. Alternately, sensors 167, 168, and 169 are, optionally, coupled with an input controller 160 in I/O subsystem 106. In some embodiments, information is displayed on the touch-screen display in a portrait view or a landscape view based on an analysis of data received from the one or more accelerometers. Device 100 optionally includes a GPS (or GLONASS or other global navigation system) receiver for obtaining information concerning the location of device 100.

In some embodiments, the software components stored in memory 102 include operating system 126, communication module (or set of instructions) 128, contact/motion module (or set of instructions) 130, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's pose (e.g., location and/or attitude).

Operating system 126 (e.g., iOS, Android, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, California. In some embodiments, the external port is a Lightning connector that is the same as, or similar to and/or compatible with the Lightning connector used in some iPhone®, iPod Touch®, and iPad® devices from Apple Inc. of Cupertino, California. In some embodiments, the external port is a USB Type-C connector that is the same as, or similar to and/or compatible with the USB Type-C connector used in some electronic devices from Apple Inc. of Cupertino, California.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

In some embodiments, detecting a finger tap gesture depends on the length of time between detecting the finger-down event and the finger-up event, but is independent of the intensity of the finger contact between detecting the finger-down event and the finger-up event. In some embodiments, a tap gesture is detected in accordance with a determination that the length of time between the finger-down event and the finger-up event is less than a predetermined value (e.g., less than 0.1, 0.2, 0.3, 0.4 or 0.5 seconds), independent of whether the intensity of the finger contact during the tap meets a given intensity threshold (greater than a nominal contact-detection intensity threshold), such as a light press or deep press intensity threshold. Thus, a finger tap gesture can satisfy particular input criteria that do not require that the characteristic intensity of a contact satisfy a given intensity threshold in order for the particular input criteria to be met. For clarity, the finger contact in a tap gesture typically needs to satisfy a nominal contact-detection intensity threshold, below which the contact is not detected, in order for the finger-down event to be detected. A similar analysis applies to detecting a tap gesture by a stylus or other contact. In cases where the device is capable of detecting a finger or stylus contact hovering over a touch sensitive surface, the nominal contact-detection intensity threshold optionally does not correspond to physical contact between the finger or stylus and the touch sensitive surface.

The same concepts apply in an analogous manner to other types of gestures. For example, a swipe gesture, a pinch gesture, a depinch gesture, and/or a long press gesture are optionally detected based on the satisfaction of criteria that are either independent of intensities of contacts included in the gesture, or do not require that contact(s) that perform the gesture reach intensity thresholds in order to be recognized. For example, a swipe gesture is detected based on an amount of movement of one or more contacts; a pinch gesture is detected based on movement of two or more contacts towards each other; a depinch gesture is detected based on movement of two or more contacts away from each other; and a long press gesture is detected based on a duration of the contact on the touch-sensitive surface with less than a threshold amount of movement. As such, the statement that particular gesture recognition criteria do not require that the intensity of the contact(s) meet a respective intensity threshold in order for the particular gesture recognition criteria to be met means that the particular gesture recognition criteria are capable of being satisfied if the contact(s) in the gesture do not reach the respective intensity threshold, and are also capable of being satisfied in circumstances where one or more of the contacts in the gesture do reach or exceed the respective intensity threshold. In some embodiments, a tap gesture is detected based on a determination that the finger-down and finger-up event are detected within a predefined time period, without regard to whether the contact is above or below the respective intensity threshold during the predefined time period, and a swipe gesture is detected based on a determination that the contact movement is greater than a predefined magnitude, even if the contact is above the respective intensity threshold at the end of the contact movement. Even in implementations where detection of a gesture is influenced by the intensity of contacts performing the gesture (e.g., the device detects a long press more quickly when the intensity of the contact is above an intensity threshold or delays detection of a tap input when the intensity of the contact is higher), the detection of those gestures does not require that the contacts reach a particular intensity threshold so long as the criteria for recognizing the gesture can be met in circumstances where the contact does not reach the particular intensity threshold (e.g., even if the amount of time that it takes to recognize the gesture changes).

Contact intensity thresholds, duration thresholds, and movement thresholds are, in some circumstances, combined in a variety of different combinations in order to create heuristics for distinguishing two or more different gestures directed to the same input element or region so that multiple different interactions with the same input element are enabled to provide a richer set of user interactions and responses. The statement that a particular set of gesture recognition criteria do not require that the intensity of the contact(s) meet a respective intensity threshold in order for the particular gesture recognition criteria to be met does not preclude the concurrent evaluation of other intensity-dependent gesture recognition criteria to identify other gestures that do have criteria that are met when a gesture includes a contact with an intensity above the respective intensity threshold. For example, in some circumstances, first gesture recognition criteria for a first gesture—which do not require that the intensity of the contact(s) meet a respective intensity threshold in order for the first gesture recognition criteria to be met—are in competition with second gesture recognition criteria for a second gesture—which are dependent on the contact(s) reaching the respective intensity threshold. In such competitions, the gesture is, optionally, not recognized as meeting the first gesture recognition criteria for the first gesture if the second gesture recognition criteria for the second gesture are met first. For example, if a contact reaches the respective intensity threshold before the contact moves by a predefined amount of movement, a deep press gesture is detected rather than a swipe gesture. Conversely, if the contact moves by the predefined amount of movement before the contact reaches the respective intensity threshold, a swipe gesture is detected rather than a deep press gesture. Even in such circumstances, the first gesture recognition criteria for the first gesture still do not require that the intensity of the contact(s) meet a respective intensity threshold in order for the first gesture recognition criteria to be met because if the contact stayed below the respective intensity threshold until an end of the gesture (e.g., a swipe gesture with a contact that does not increase to an intensity above the respective intensity threshold), the gesture would have been recognized by the first gesture recognition criteria as a swipe gesture. As such, particular gesture recognition criteria that do not require that the intensity of the contact(s) meet a respective intensity threshold in order for the particular gesture recognition criteria to be met will (A) in some circumstances ignore the intensity of the contact with respect to the intensity threshold (e.g. for a tap gesture) and/or (B) in some circumstances still be dependent on the intensity of the contact with respect to the intensity threshold in the sense that the particular gesture recognition criteria (e.g., for a long press gesture) will fail if a competing set of intensity-dependent gesture recognition criteria (e.g., for a deep press gesture) recognize an input as corresponding to an intensity-dependent gesture before the particular gesture recognition criteria recognize a gesture corresponding to the input (e.g., for a long press gesture that is competing with a deep press gesture for recognition).

Pose module 131, in conjunction with accelerometers 167, gyroscopes 168, and/or magnetometers 169, optionally detects pose information concerning the device, such as the device's pose (e.g., roll, pitch, yaw and/or position) in a particular frame of reference. Pose module 131 includes software components for performing various operations related to detecting the position of the device and detecting changes to the pose of the device.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions (e.g., instructions used by haptic feedback controller 161) to produce tactile outputs using tactile output generator(s) 163 at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing, to camera module 143 as picture/video metadata, and to applications that provide location-based services such as weather widgets, local yellow page widgets, and map/navigation widgets).

Virtual/augmented reality module 145 provides virtual and/or augmented reality logic to applications 136 that implement augmented reality, and in some embodiments virtual reality, features. Virtual/augmented reality module 145 facilitates superposition of virtual content, such as a virtual user interface object, on a representation of at least a portion of a field of view of the one or more cameras. For example, with assistance from the virtual/augmented reality module 145, the representation of at least a portion of a field of view of the one or more cameras may include a respective physical object and the virtual user interface object may be displayed at a location, in a displayed augmented reality environment, that is determined based on the respective physical object in the field of view of the one or more cameras or a virtual reality environment that is determined based on the pose of at least a portion of a computer system (e.g., a pose of a display device that is used to display the user interface to a user of the computer system).

Applications 136 optionally include the following modules (or sets of instructions), or a subset or superset thereof:

- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages, and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and video and music player module 152, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touch-sensitive surface. In some other embodiments, the menu button is a physical push button or other physical input control device instead of a touch-sensitive surface.

Figure 1B:
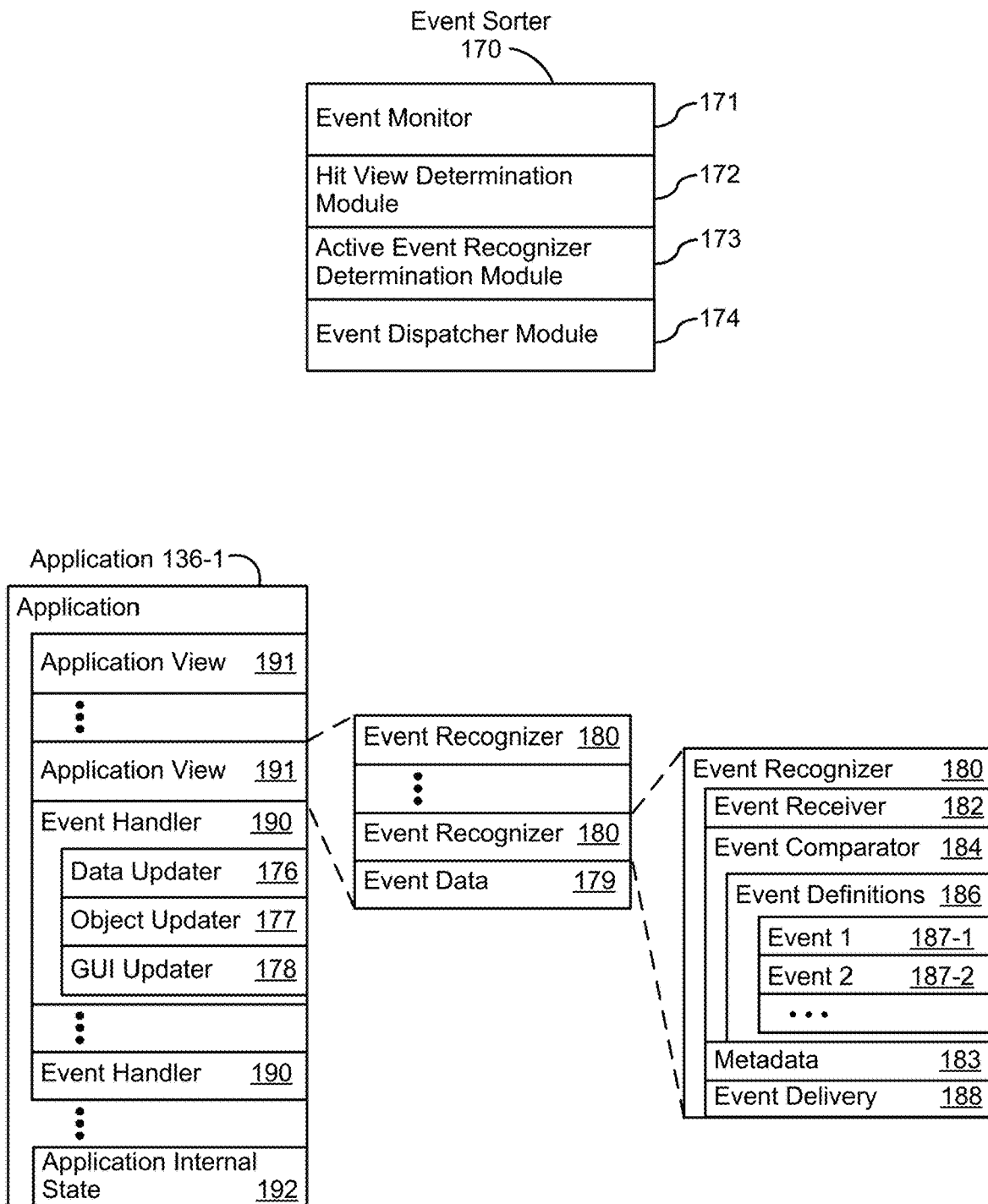
FIG. 1B is a block diagram illustrating example components for event handling in accordance with some embodiments.

FIG. 1B is a block diagram illustrating example components for event handling in accordance with some embodiments. In some embodiments, memory 102 (in FIG. 1A) or 370 (FIG. 3A) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 167, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current pose (e.g., position and orientation) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video and music player module 152. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; inputs based on real-time analysis of video images obtained by one or more cameras; movement of the device; oral instructions; detected eye movements; biometric inputs; and/or any combination thereof are optionally utilized as inputs corresponding to sub-events which define an event to be recognized.

Figure 2A:
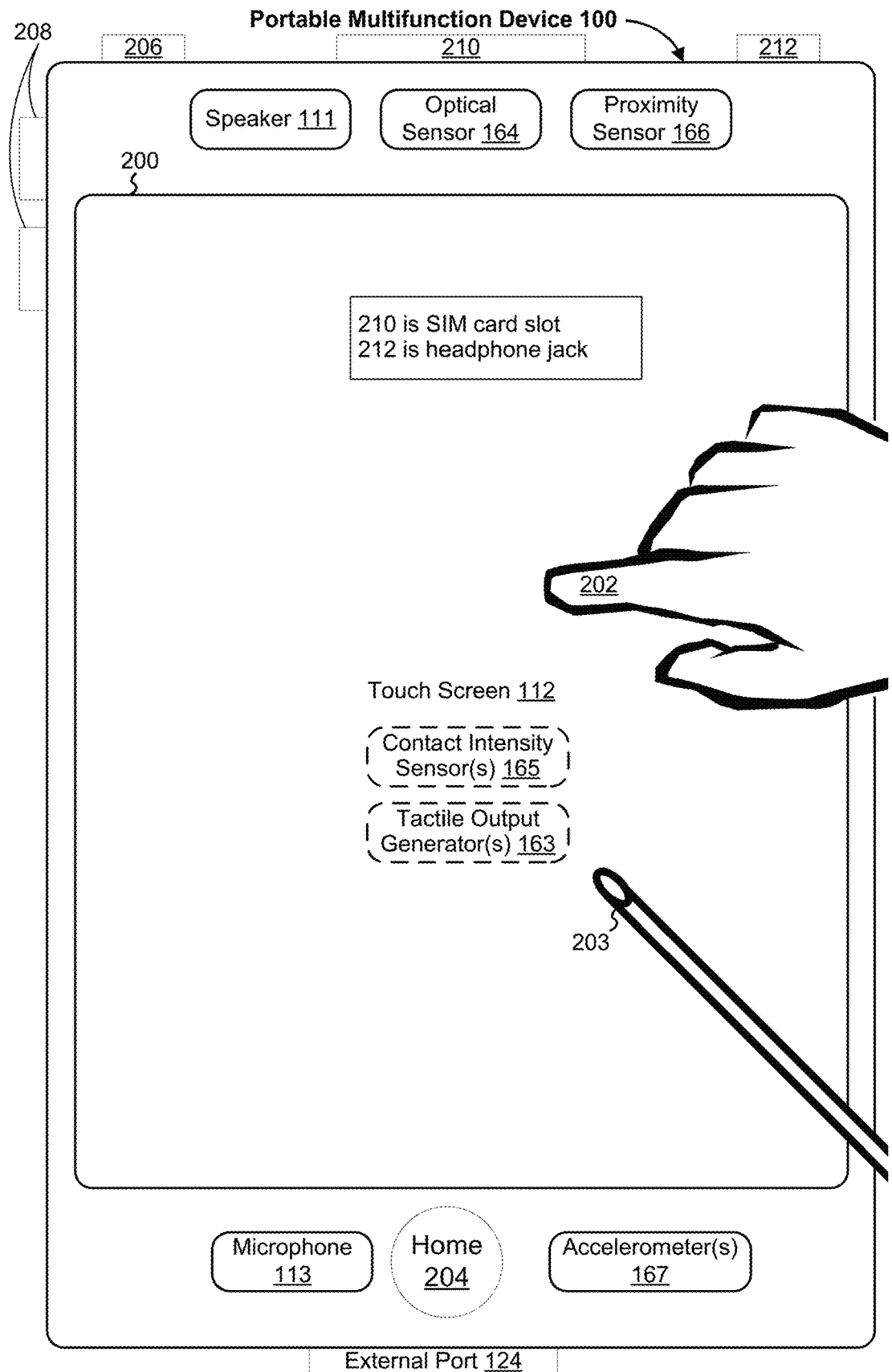
FIG. 2A illustrates a portable multifunction device having a touch screen in accordance with some embodiments.

FIG. 2A illustrates a portable multifunction device 100 having a touch screen (e.g., touch-sensitive display system 112, FIG. 1A) in accordance with some embodiments. The touch screen optionally displays one or more graphics within user interface (UI) 200. In these embodiments, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204 (sometimes called home button 204), push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensities of contacts on touch-sensitive display system 112 and/or one or more tactile output generators 163 for generating tactile outputs for a user of device 100.

Figure 2B:
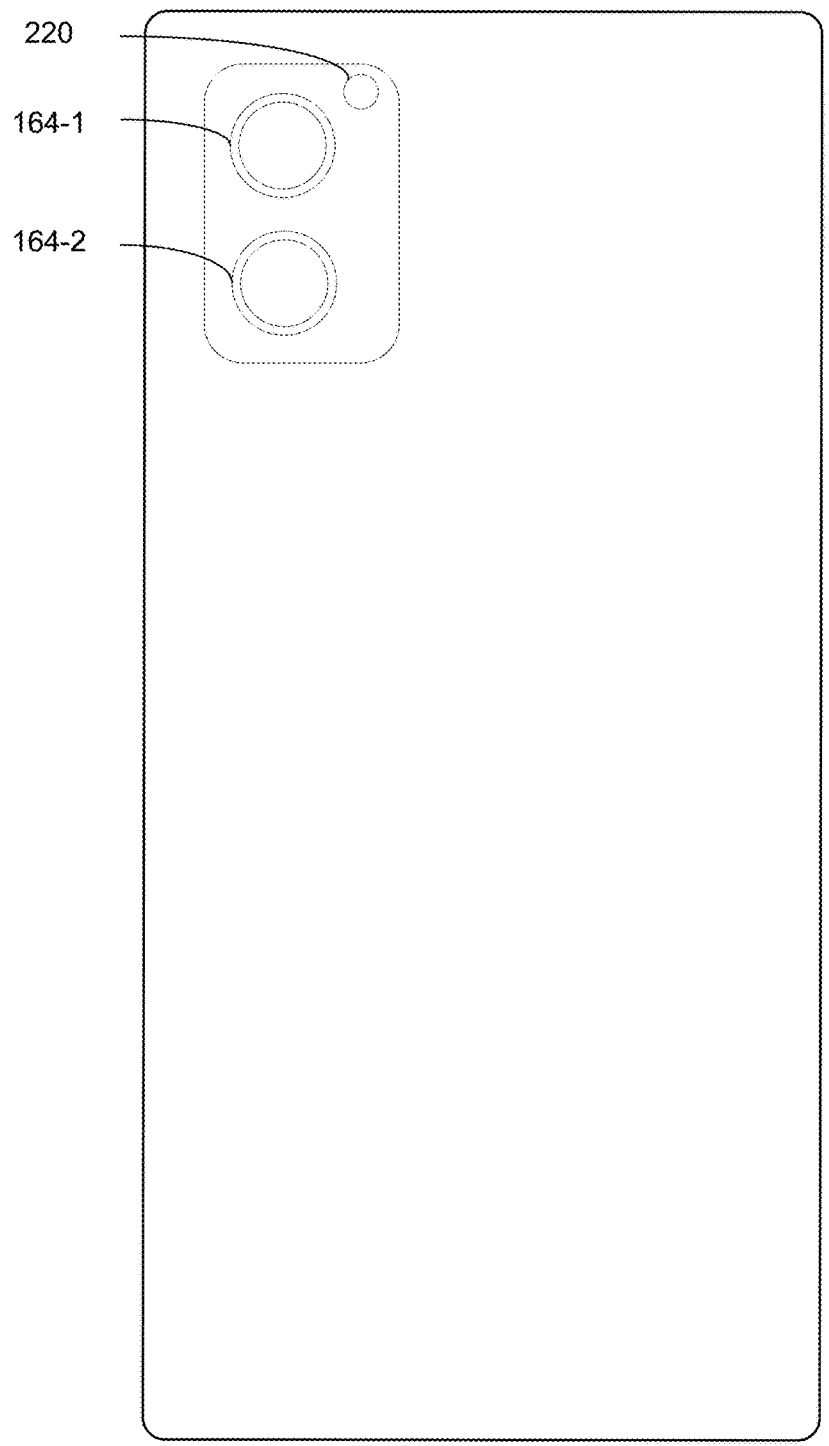
FIG. 2B illustrates a portable multifunction device having optical sensors and a depth sensor (e.g., time-of-flight sensor) in accordance with some embodiments.

FIG. 2B illustrates a portable multifunction device 100 (e.g., a view of the back of device 100) that optionally includes optical sensors 164-1 and 164-2, and a depth sensor 220 (e.g., one or more time-of-flight ("ToF") sensors, structured-light sensors (also known as structured-light scanners), etc.). When optical sensors (e.g., cameras) 164-1 and 164-2 concurrently capture a representation of a physical environment (e.g., an image or a video), the portable multifunction device can determine depth information from the disparity between the information concurrently captured by the optical sensors (e.g., disparities between the captured images). Depth information provided by (e.g., image) disparities determined using optical sensors 164-1 and 164-2 may lack accuracy, but typically provides high resolution. To improve the accuracy of depth information provided by the disparity between images, depth sensor 220 is optionally used in conjunction with optical sensors 164-1 and 164-2. In some embodiments, depth sensor 220 emits a waveform (e.g., light from a light emitting diode (LED) or a laser), and measures the time it takes for the reflection(s) of the waveform (e.g., light) to return back to ToF sensor 220. Depth information is determined from the measured time it takes for the light to return back to depth sensor 220. A depth sensor typically provides high accuracy (e.g., accuracy of 1 cm or better with respect to measured distances or depths), but may lack high resolution (e.g., depth sensor 220 optionally has a resolution that is one quarter of the resolution of optical sensors 164, or less than one quarter of the resolution of optical sensors 164, or one sixteenth of the resolution of optical sensors 164, or less than one sixteenth of the resolution of optical sensors 164). Therefore, combining depth information from depth sensor (e.g., depth sensor 220, such as a ToF sensor) with depth information provided by (e.g., image) disparities determined using optical sensors (e.g., cameras) provides a depth map that is both accurate and has high resolution.

Figure 3A:
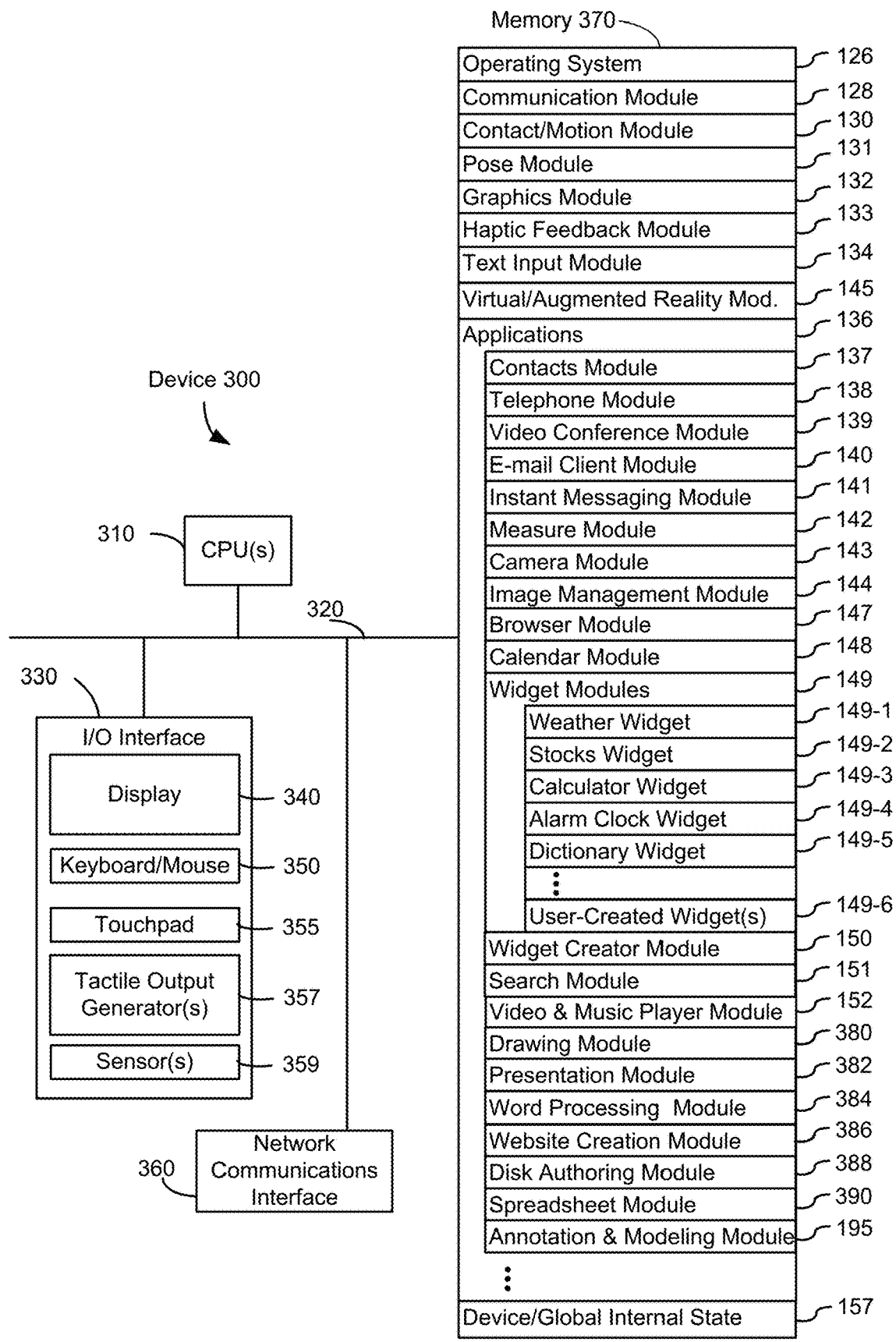
FIG. 3A is a block diagram of an example multifunction device with a display and a touch-sensitive surface in accordance with some embodiments.

FIG. 3A is a block diagram of an example multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is optionally a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 163 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3A are, optionally, stored in one or more of the previously mentioned memory devices. Each of the above identified modules corresponds to a set of instructions for performing a function described above. The above identified modules or programs (e.g., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Figure 3B:
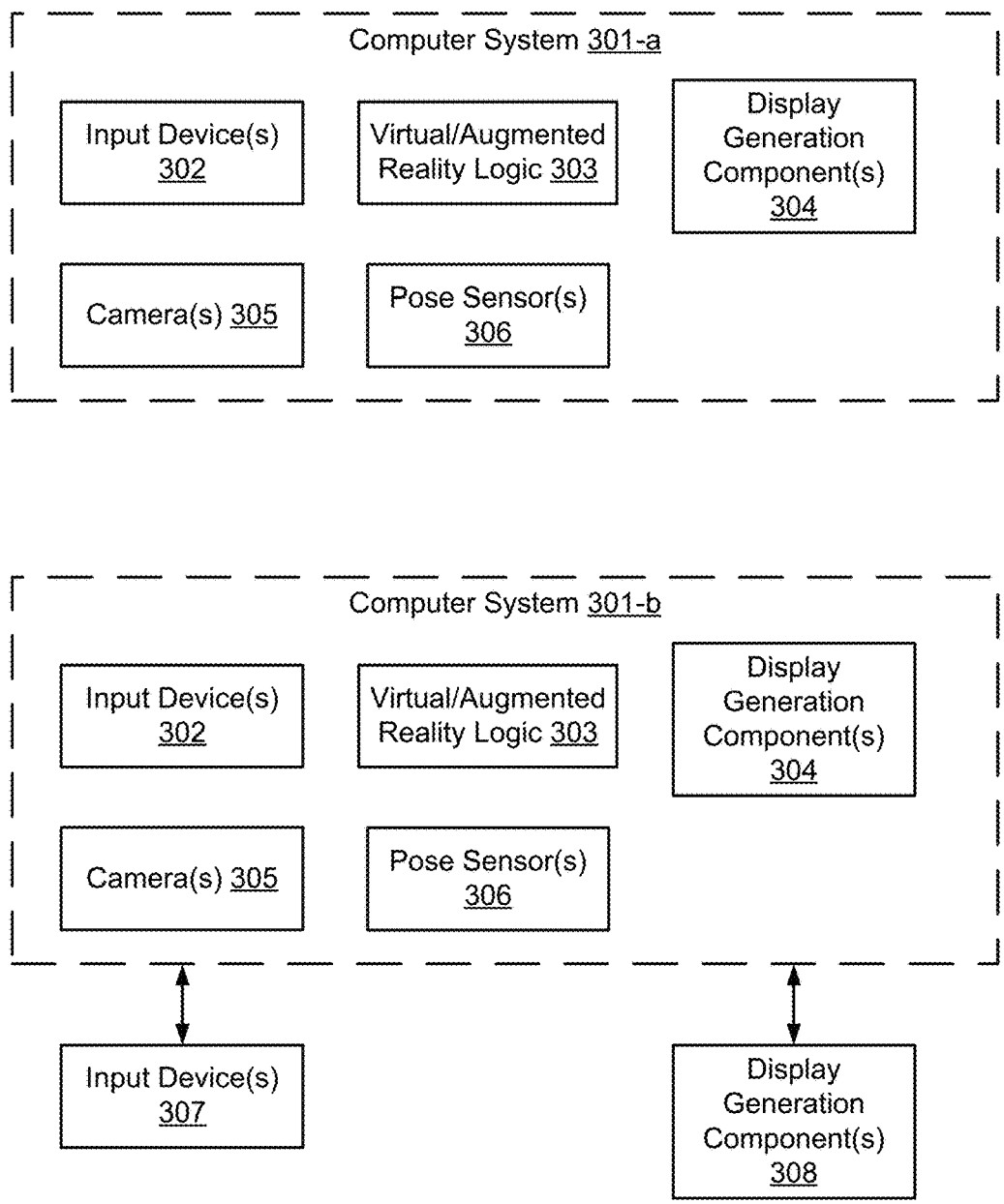
FIGS. 3B-3C are block diagrams of example computer systems in accordance with some embodiments.
Figure 3C:
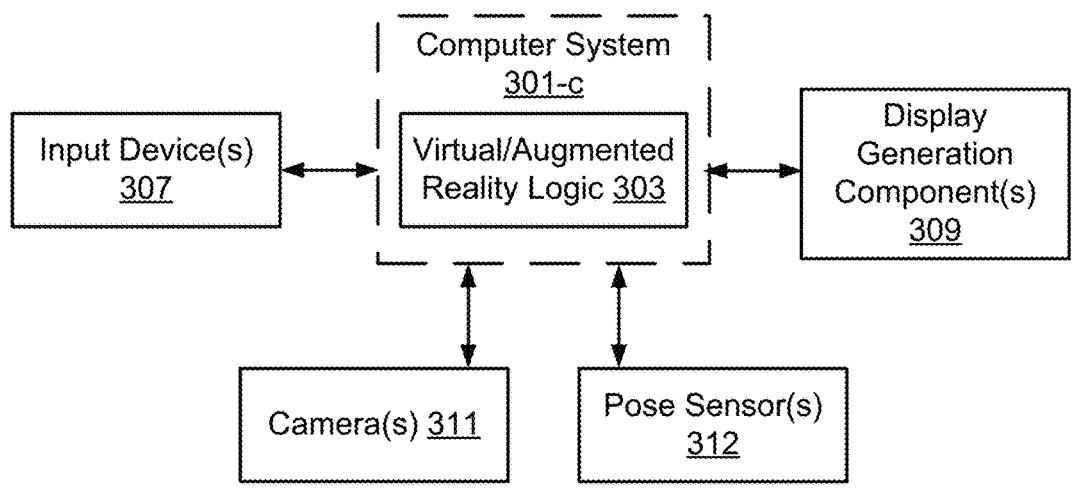

FIGS. 3B-3C are block diagrams of example computer systems 301 in accordance with some embodiments.

In some embodiments, computer system 301 includes and/or is in communication with:
input device(s) (302 and/or 307, e.g., a touch-sensitive surface, such as a touch-sensitive remote control, or a touch-screen display that also serves as the display generation component, a mouse, a joystick, a wand controller, and/or cameras tracking the position of one or more features of the user such as the user's hands);
virtual/augmented reality logic 303 (e.g., virtual/augmented reality module 145);
display generation component(s) (304 and/or 308, e.g., a display, a projector, a head-mounted display, a heads-up display, or the like) for displaying virtual user interface elements to the user;
camera(s) (e.g., 305 and/or 311) for capturing images of a field of view of the device, e.g., images that are used to determine placement of virtual user interface elements, determine a pose of the device, and/or display a portion of the physical environment in which the camera(s) are located; and pose sensor(s) (e.g., 306 and/or 311) for determining a pose of the device relative to the physical environment and/or changes in pose of the device.

In some computer systems (e.g., 301-*a* in FIG. 3B), input device(s) 302, virtual/augmented reality logic 303, display generation component(s) 304, camera(s) 305; and pose sensor(s) 306 are all integrated into the computer system (e.g., portable multifunction device 100 in FIGS. 1A-1B or device 300 in FIG. 3 such as a smartphone or tablet).

In some computer systems (e.g., 301-*b*), in addition to integrated input device(s) 302, virtual/augmented reality logic 303, display generation component(s) 304, camera(s) 305; and pose sensor(s) 306, the computer system is also in communication with additional devices that are separate from the computer system, such as separate input device(s) 307 such as a touch-sensitive surface, a wand, a remote control, or the like and/or separate display generation component(s) 308 such as virtual reality headset or augmented reality glasses that overlay virtual objects on a physical environment.

In some computer systems (e.g., 301-*c* in FIG. 3C), the input device(s) 307, display generation component(s) 309, camera(s) 311; and/or pose sensor(s) 312 are separate from the computer system and are in communication with the computer system. In some embodiments, other combinations of components in computer system 301 and in communication with the computer system are used. For example, in some embodiments, display generation component(s) 309, camera(s) 311, and pose sensor(s) 312 are incorporated in a headset that is either integrated with or in communication with the computer system.

In some embodiments, all of the operations described below with reference to FIGS. 5A-5AK are performed on a single computing device with virtual/augmented reality logic 303 (e.g., computer system 301-*a* described below with reference to FIG. 3B). However, it should be understood that frequently multiple different computing devices are linked together to perform the operations described below with reference to FIGS. 5A-5AK (e.g., a computing device with virtual/augmented reality logic 303 communicates with a separate computing device with a display 450 and/or a separate computing device with a touch-sensitive surface 451). In any of these embodiments, the computing device that is described below with reference to FIGS. 5A-5AK is the computing device (or devices) that contain(s) the virtual/augmented reality logic 303. Additionally, it should be understood that the virtual/augmented reality logic 303 could be divided between a plurality of distinct modules or computing devices in various embodiments; however, for the purposes of the description herein, the virtual/augmented reality logic 303 will be primarily referred to as residing in a single computing device so as not to unnecessarily obscure other aspects of the embodiments.

In some embodiments, the virtual/augmented reality logic 303 includes one or more modules (e.g., one or more event handlers 190, including one or more object updaters 177 and one or more GUI updaters 178 as described in greater detail above with reference to FIG. 1B) that receive interpreted inputs and, in response to these interpreted inputs, generate instructions for updating a graphical user interface in accordance with the interpreted inputs which are subsequently used to update the graphical user interface on a display. In some embodiments, an interpreted input for an input that has been detected (e.g., by a contact motion module 130 in FIGS. 1A and 3), recognized (e.g., by an event recognizer 180 in FIG. 1B) and/or distributed (e.g., by event sorter 170 in FIG. 1B) is used to update the graphical user interface on a display. In some embodiments, the interpreted inputs are generated by modules at the computing device (e.g., the computing device receives raw contact input data so as to identify gestures from the raw contact input data). In some embodiments, some or all of the interpreted inputs are received by the computing device as interpreted inputs (e.g., a computing device that includes the touch-sensitive surface 451 processes raw contact input data so as to identify gestures from the raw contact input data and sends information indicative of the gestures to the computing device that includes the virtual/augmented reality logic 303).

In some embodiments, both a display and a touch-sensitive surface are integrated with the computer system (e.g., 301-a in FIG. 3B) that contains the virtual/augmented reality logic 303. For example, the computer system may be a desktop computer or laptop computer with an integrated display (e.g., 340 in FIG. 3) and touchpad (e.g., 355 in FIG. 3). As another example, the computing device may be a portable multifunction device 100 (e.g., a smartphone, PDA, tablet computer, etc.) with a touch screen (e.g., 112 in FIG. 2).

In some embodiments, a touch-sensitive surface is integrated with the computer system while a display is not integrated with the computer system that contains the virtual/augmented reality logic 303. For example, the computer system may be a device 300 (e.g., a desktop computer or laptop computer) with an integrated touchpad (e.g., 355 in FIG. 3) connected (via wired or wireless connection) to a separate display (e.g., a computer monitor, television, etc.). As another example, the computer system may be a portable multifunction device 100 (e.g., a smartphone, PDA, tablet computer, etc.) with a touch screen (e.g., 112 in FIG. 2) connected (via wired or wireless connection) to a separate display (e.g., a computer monitor, television, etc.).

In some embodiments, a display is integrated with the computer system while a touch-sensitive surface is not integrated with the computer system that contains the virtual/augmented reality logic 303. For example, the computer system may be a device 300 (e.g., a desktop computer, laptop computer, television with integrated set-top box) with an integrated display (e.g., 340 in FIG. 3) connected (via wired or wireless connection) to a separate touch-sensitive surface (e.g., a remote touchpad, a portable multifunction device, etc.). As another example, the computer system may be a portable multifunction device 100 (e.g., a smartphone, PDA, tablet computer, etc.) with a touch screen (e.g., 112 in FIG. 2) connected (via wired or wireless connection) to a separate touch-sensitive surface (e.g., a remote touchpad, another portable multifunction device with a touch screen serving as a remote touchpad, etc.).

In some embodiments, neither a display nor a touch-sensitive surface is integrated with the computer system (e.g., 301-c in FIG. 3C) that contains the virtual/augmented reality logic 303. For example, the computer system may be a stand-alone computing device 300 (e.g., a set-top box, gaming console, etc.) connected (via wired or wireless connection) to a separate touch-sensitive surface (e.g., a remote touchpad, a portable multifunction device, etc.) and a separate display (e.g., a computer monitor, television, etc.).

In some embodiments, the computer system has an integrated audio system (e.g., audio circuitry 110 and speaker 111 in portable multifunction device 100). In some embodiments, the computing device is in communication with an audio system that is separate from the computing device. In some embodiments, the audio system (e.g., an audio system integrated in a television unit) is integrated with a separate display. In some embodiments, the audio system (e.g., a stereo system) is a stand-alone system that is separate from the computer system and the display.

Attention is now directed towards embodiments of user interfaces ("UI") that are, optionally, implemented on portable multifunction device 100.

FIG. 4A illustrates an example user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) for wireless communication(s), such as cellular and Wi-Fi signals;
Time;
a Bluetooth indicator;
a Battery status indicator;
Tray 408 with icons for frequently used applications, such as:
 Icon 416 for telephone module 138, labeled "Phone," which optionally includes an indicator 414 of the number of missed calls or voicemail messages;
 Icon 418 for e-mail client module 140, labeled "Mail," which optionally includes an indicator 410 of the number of unread e-mails;
 Icon 420 for browser module 147, labeled "Browser"; and
 Icon 422 for video and music player module 152, labeled "Music"; and
Icons for other applications, such as:
 Icon 424 for IM module 141, labeled "Messages";
 Icon 426 for calendar module 148, labeled "Calendar";
 Icon 428 for image management module 144, labeled "Photos";
 Icon 430 for camera module 143, labeled "Camera";
 Icon 432 for online video module 155, labeled "Online Video";
 Icon 434 for stocks widget 149-2, labeled "Stocks";
 Icon 436 for map module 154, labeled "Maps";
 Icon 438 for weather widget 149-1, labeled "Weather";
 Icon 440 for alarm clock widget 149-4, labeled "Clock";
 Icon 442 for workout support module 142, labeled "Workout Support";
 Icon 444 for notes module 153, labeled "Notes";
 Icon 446 for a settings application or module, labeled "Settings," which provides access to settings for device 100 and its various applications 136;
 Icon 448 for a clips application or module, labeled "Clips," which provides access to virtual effects and filters that may be applied to capture media using the one or more camera(s); and
 Icon 450 for a measure application or module, labeled "Measure".

It should be noted that the icon labels illustrated in FIG. 4A are merely examples. For example, other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

FIG. 4B illustrates an example user interface on a device (e.g., device 300, FIG. 3A) with a touch-sensitive surface 451 (e.g., a tablet or touchpad 355, FIG. 3A) that is separate from the display 450. Although many of the examples that follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, contact 460 corresponds to 468 and contact 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a mouse based input or a stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

User Interfaces and Associated Processes

Attention is now directed towards embodiments of user interfaces ("UI") and associated processes that may be implemented on a computer system (e.g., portable multifunction device 100, or device 300) that includes (and/or is in communication with) a display generation component (e.g., a display, a projector, a head-mounted display, a heads-up display, or the like), one or more cameras (e.g., video cameras that continuously provide a live preview of at least a portion of the contents that are within the field of view of the cameras and optionally generate video outputs including one or more streams of image frames capturing the contents within the field of view of the cameras), and one or more input devices (e.g., a touch-sensitive surface, such as a touch-sensitive remote control, or a touch-screen display that also serves as the display generation component, a mouse, a joystick, a wand controller, and/or cameras tracking the position of one or more features of the user such as the user's hands), optionally one or more pose sensors, optionally one or more sensors to detect intensities of contacts with the touch-sensitive surface, and optionally one or more tactile output generators.

FIGS. 5A-5AK illustrate example user interfaces for displaying virtual effects in an AR environment in accordance with some embodiments. The user interfaces in these figures are used to illustrate the processes described below, including the processes in FIGS. 6A-6D and 7A-7B. For convenience of explanation, some of the embodiments will be discussed with reference to operations performed on a device with a touch-sensitive display system 112. In such embodiments, the focus selector is, optionally: a respective finger or stylus contact, a representative point corresponding to a finger or stylus contact (e.g., a centroid of a respective contact or a point associated with a respective contact), or a centroid of two or more contacts detected on the touch-sensitive display system 112. However, analogous operations are, optionally, performed on a device with a display 450 and a separate touch-sensitive surface 451 in response to detecting the contacts on the touch-sensitive surface 451 while displaying the user interfaces shown in the figures on the display 450, along with a focus selector.

FIGS. 5A-5AK illustrate example user interfaces for displaying virtual effects in an AR environment in accordance with some embodiments. FIG. 5A illustrates an example user interface for launching an application, labeled "Clips" 448, on device 100. For example, the device 100 detects user input 502 (e.g., a tap input) at a location on the user interface corresponding to the "Clips" application, and in response to detecting user input 502, launches the "Clips" application 448. In some embodiments, the example user interface shown in FIG. 5A is an application launch interface that includes at least a subset of the application icons (e.g., one or more, two or more, several or all of the application icons) discussed above with reference to FIG. 4A.

Figure 5B:
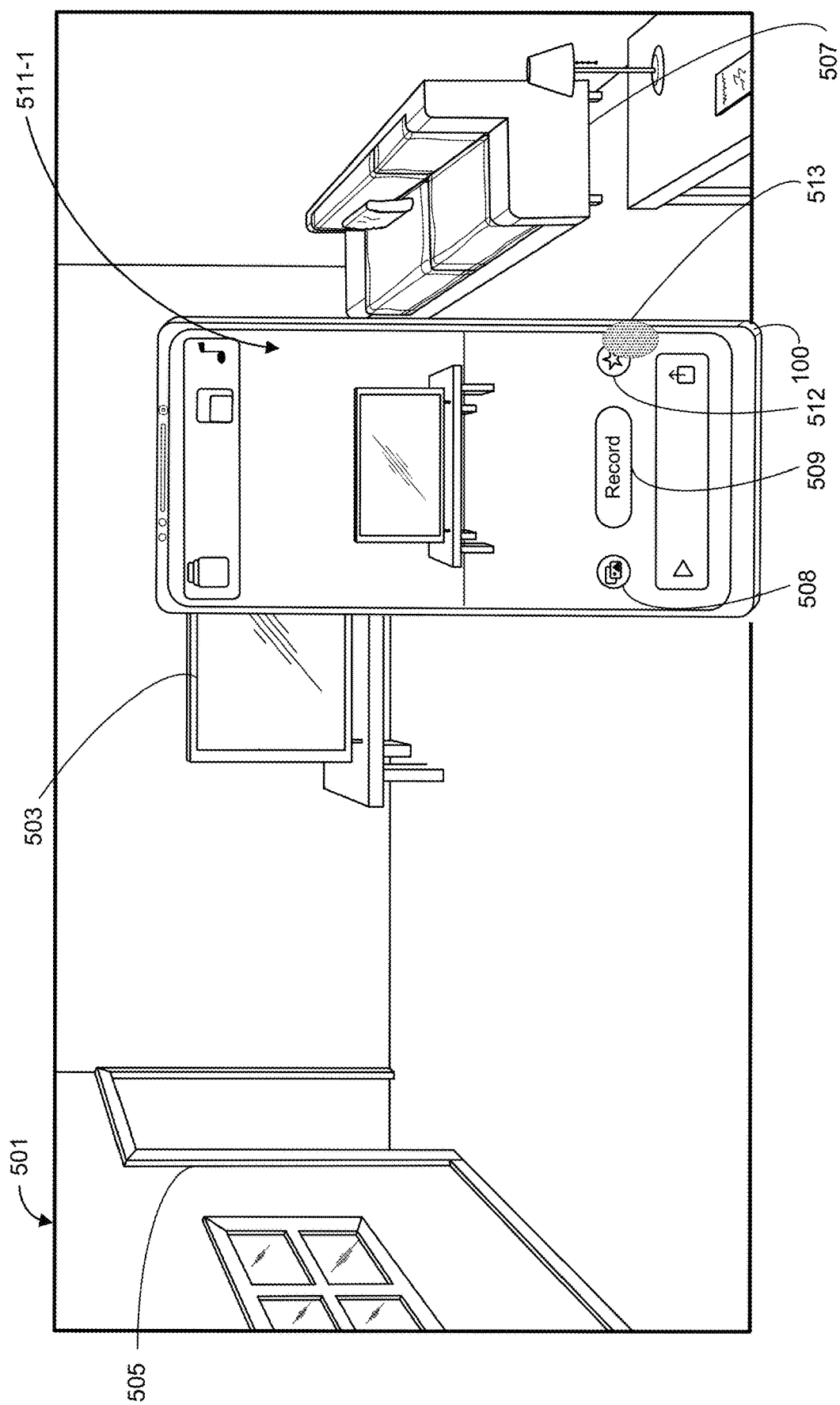

FIG. 5B illustrates portable multifunction device 100 displaying user interface 511-1 in response to detecting user input 502. For example, user interface 511-1 corresponds to a user interface of the "Clips" application 448. FIG. 5B further illustrates a physical environment 501, which includes physical features (e.g., physical objects) including television 503, couch 507, and doorway 505. User interface 511-1 displays a representation of the physical environment that is within a field of view of one or more cameras of device 100 (e.g., optical sensor(s) 164, as illustrated FIG. 1A and FIG. 2B), also referred to herein as a camera view that is displayed on the user interface of device 100. For example, in FIG. 5B, the field of view of the one or more cameras of device 100 includes television 503, but does not include couch 507 or doorway 505. As such, user interface 511-1 includes a representation of the television but does not include a representation of couch 507 or doorway 505. As the device 100 moves within the physical environment (e.g., rotates in direction, or moves within the physical environment), user interface 511-1 is updated to display a current representation of the physical environment that is within the field of view of the one or more cameras of device 100.

FIG. 5B further illustrates a plurality of user interface elements that are displayed within user interface 511-1. For example, user interface 511-1 includes record button 509, which, when activated, causes device 100 to record an image and/or a video as captured by the one or more cameras of device 100. User interface 511-1 further includes an effects button 512, which, when activated, such as by a tap input 513, causes the device to display options for modifying the displayed camera view, as displayed in FIG. 5C. In some embodiments, user interface 511-1 further includes a media access button 508 for opening media (e.g., photos and/or videos) stored on device 100.

Figure 5C:
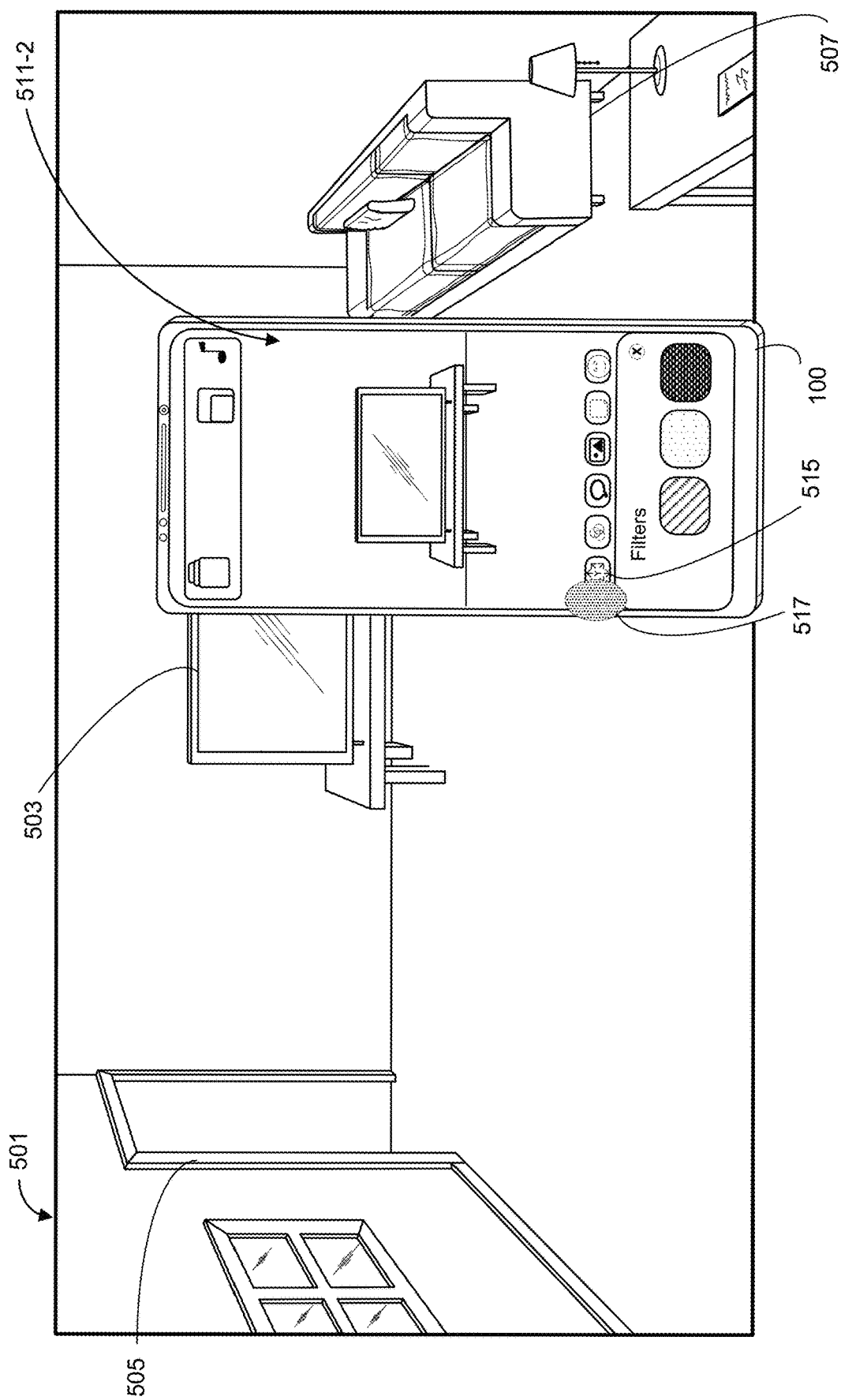

In some embodiments, in response to tap input 513, device 100 updates user interface 511-1 to user interface 511-2, as illustrated in FIG. 5C. User interface 511-2 displays a plurality of options for modifying the displayed camera view, including an option to apply a filter (shown in FIG. 5C), as well as an option 515 to add a virtual effect to the camera view. In some embodiments, in response to activation of the effects button 512, a plurality of filter types are displayed. For example, user interface 511-2 displays one or more selectable filters. In some embodiments, in response to a respective filter being selected, a color, brightness, fading, or other modification is applied to the displayed camera view. In some embodiments, the plurality of options for modifying the displayed camera view includes, an option to apply a filter, an option to add a caption, an option to add media (e.g., text, sticker(s), and/or emoji(s)) to the camera view, an option to change a background scene, and/or an option to add a virtual effect (e.g., an AR effect) to the camera view. For example, button 515 corresponds to the option to add a virtual effect to the camera view. In response to receiving a user input 517 on button 515, the device 100 displays user interface 511-3, as illustrated in FIG. 5D.

Figure 5D:
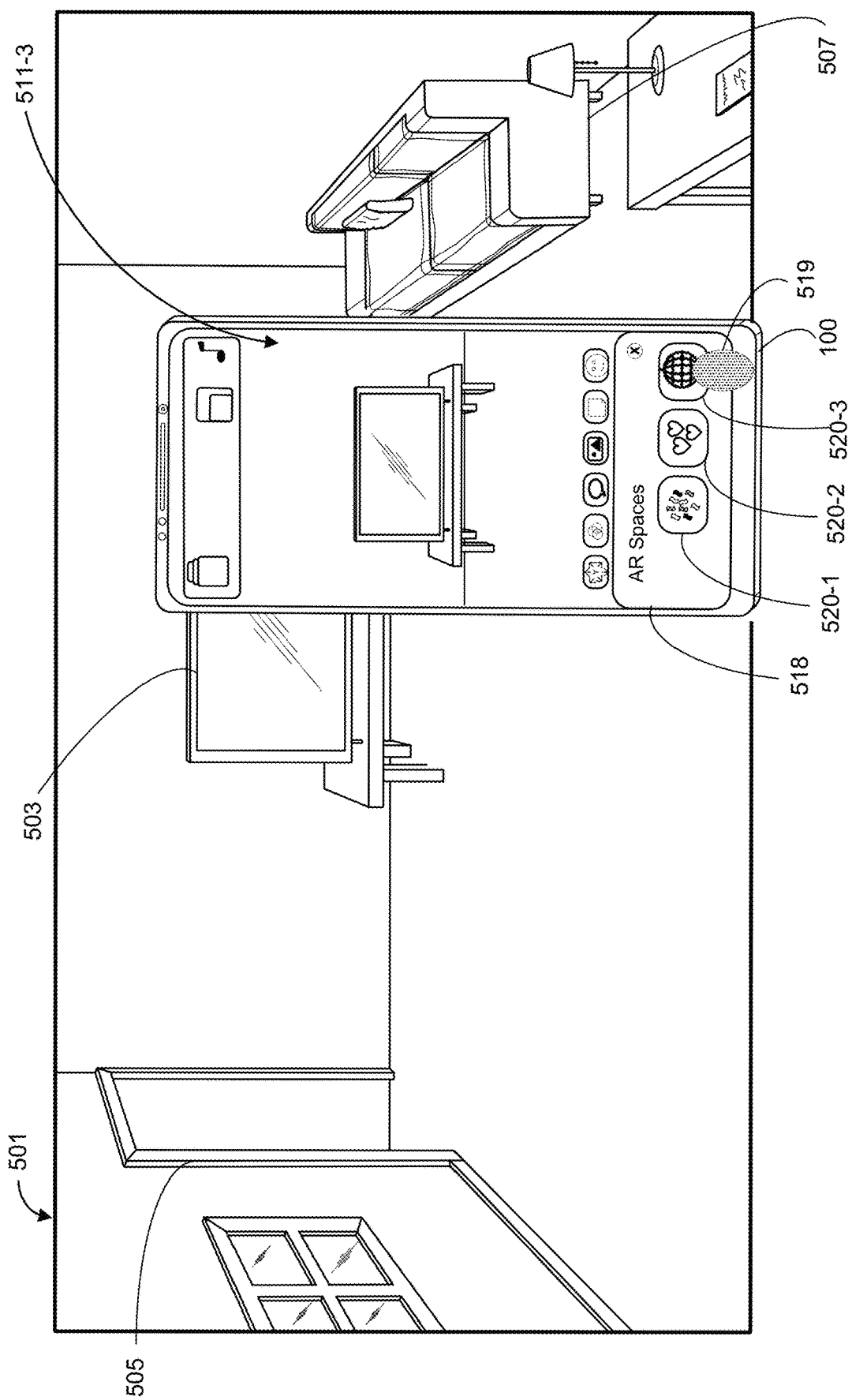

FIG. 5D illustrates user interface 511-3, which includes AR Spaces portion 518. AR Spaces portion 518 includes a plurality of options for applying different virtual effects to the camera view displayed in user interface 511-3. For example, AR Spaces portion 518 displays a plurality of selectable options for applying different virtual effects over the camera view, including an option to apply a confetti virtual effect 520-1, an option to apply a hearts virtual effect 520-2 and an option to apply a disco virtual effect 520-3. In some embodiments, a subset of the possible virtual effects are initially displayed in portion 518. For example, additional and/or other virtual effects that are not described herein may also be available for a user to select for display as a virtual effect.

In some embodiments or in some circumstances, the device detects a user input 519 selecting disco virtual effect 520-3, and in response to the user input 519, the device determines whether the selected virtual effect requires a scan of the physical environment. For example, based on the type of virtual effect (e.g., the types of virtual element(s) to be displayed for the virtual effect), the device determines which virtual effects interact with the representation of the physical environment. For example, virtual effects that interact with the representation of the physical environment require that device 100 detect objects and/or surfaces (e.g., walls, floor and/or ceiling) of the physical environment before applying the virtual effects. In some embodiments, virtual effects that include animating or interacting with surfaces (e.g., animated addition of virtual objects or effects to surfaces in the physical environment) require that device 100 detect the surfaces of the room. In some embodiments, at least one virtual effect does not require that device 100 detect objects and/or surfaces of the physical environment. For example, a virtual effect (e.g., a particle virtual effect such as the hearts virtual effect, described below) that does not interact with surfaces (e.g., virtual effects that fill a volume corresponding to the space within the camera view) do not require that device 100 scan the physical environment.

Because disco virtual effect 520-3 includes applying a virtual effect that interacts with one or more surfaces of the physical environment (e.g., simulated light from a disco ball are applied to walls in the camera view and/or a virtual disco ball appears mounted to a ceiling in the camera view), device 100 prompts the user to scan the physical environment such that device 100 is enabled to detect (e.g., and store, for example, as a virtual blueprint) objects and/or surfaces of the physical environment.

Figure 5E:
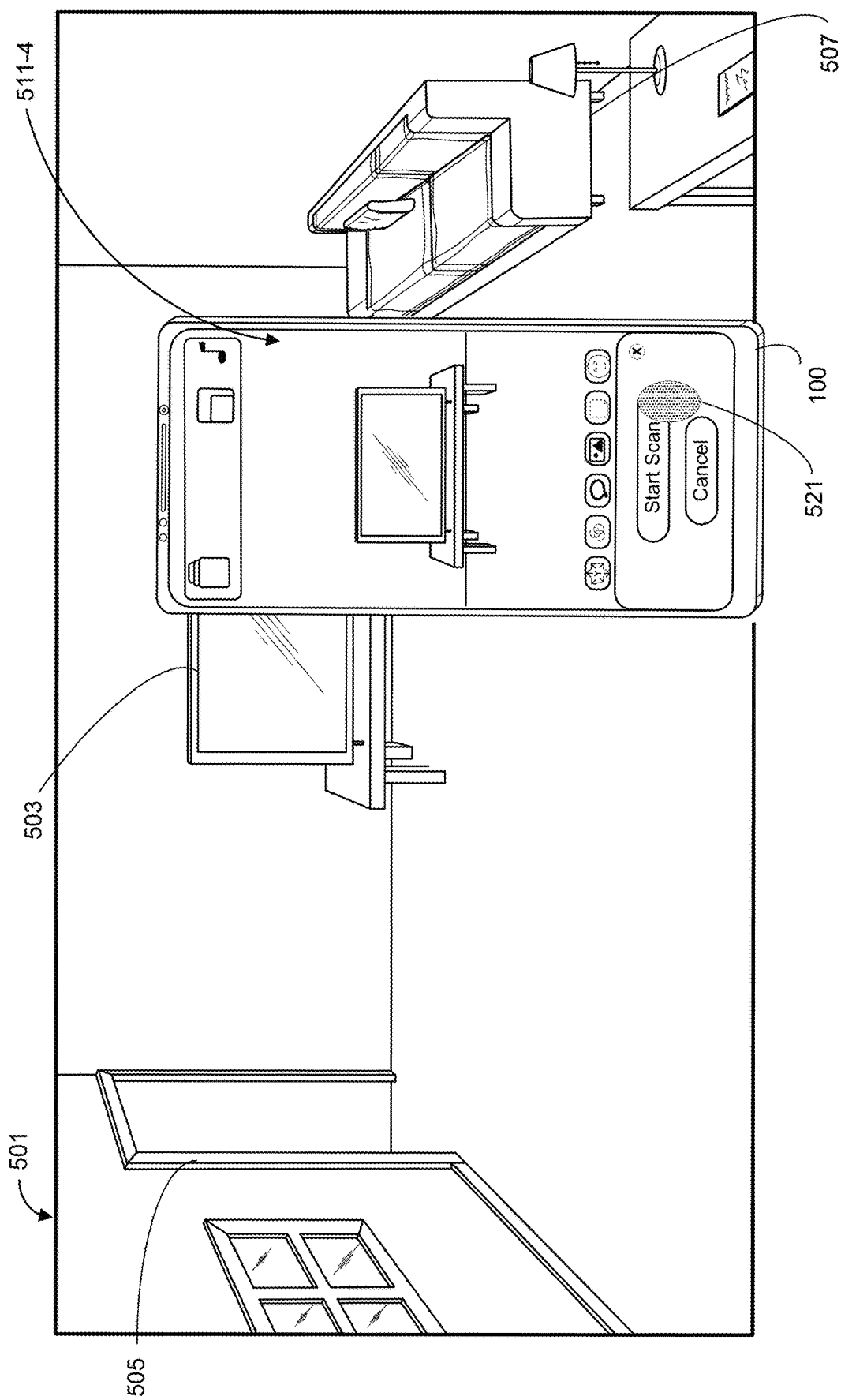

In some embodiments, in response to the selection of disco virtual effect 520-3, device 100 provides an option for the user to start the scan, as illustrated in FIG. 5E. For example, the user selects "Start Scan" button via user input 521.

Figure 5F:
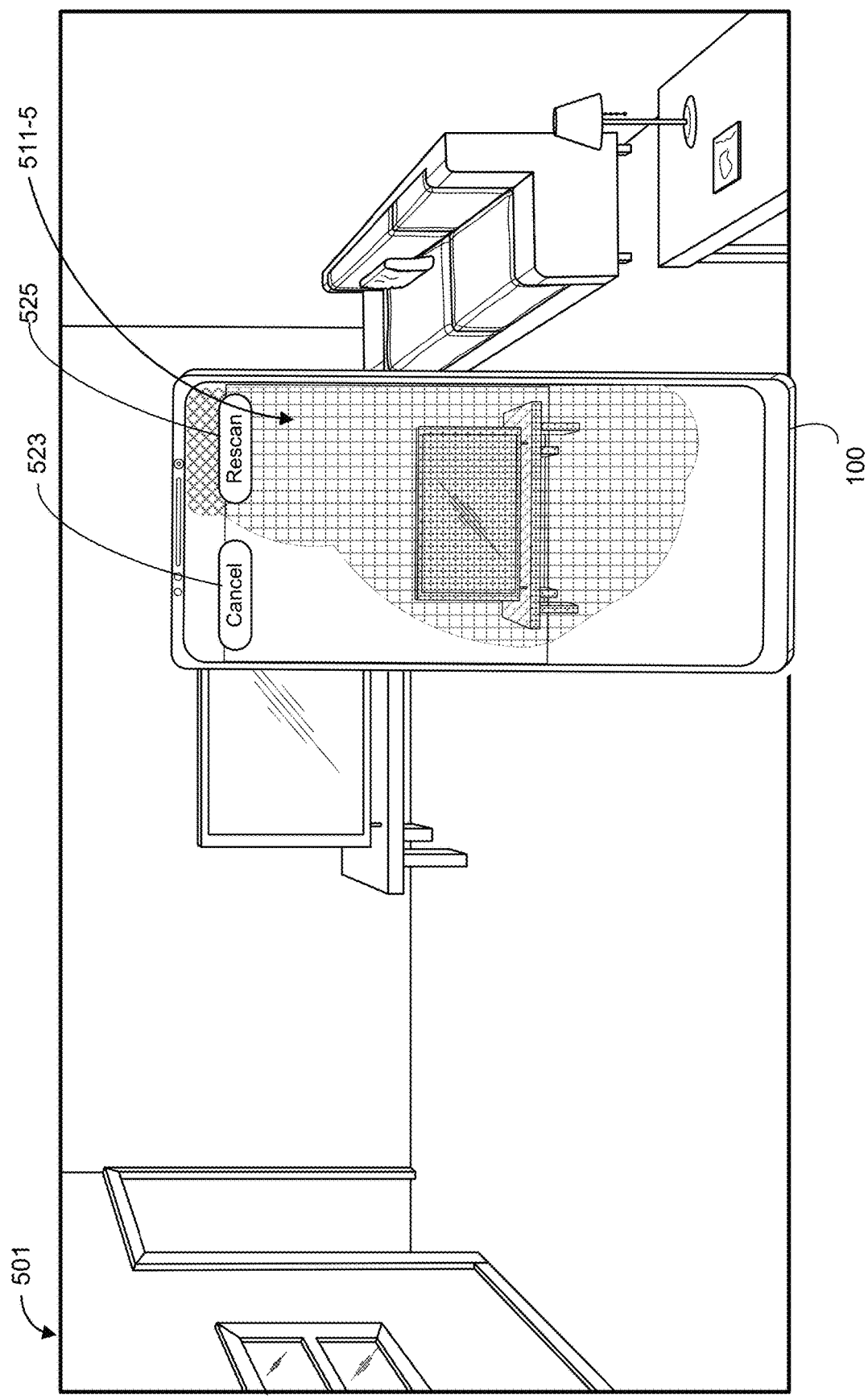

In some embodiments, device 100 does not provide the option for the user to select the "Start Scan" button shown in FIG. 5E, and instead automatically, in response to receiving the selection of disco virtual effect 520-3, initiates a scan mode and begins scanning the physical environment, as illustrated in FIG. 5F. In some embodiments, the scan mode is initiated in response to detecting movement of the device. For example, as a user begins to turn (e.g., rotate) the device and/or move the device within the physical environment, device 100 automatically initiates scanning of the portion of the physical environment that is within a current camera view.

FIG. 5F illustrates user interface 511-5 for scanning the physical environment. In some embodiments, while scanning the physical environment 501, user interface 511-5 indicates progress of the scan by applying a mesh (e.g., grid) overlay to the features of the physical environment 501 that have been detected by the device. In some embodiments, the mesh overlay (or other visual indicator of scanning progress) comprises a texture applied over the surfaces detected in the physical environment. For example, display of the shape and/or contours of objects and surfaces are maintained while a mesh (e.g., grid) effect is displayed over the detected surfaces and/or contours.

In some embodiments, user interface 511-5 further include a cancel button 523 and a rescan button 525. For example, in response to detecting a selection of cancel button 523, device 100 exits the scan mode and returns to the options for applying effects shown in FIG. 5D. In some embodiments, in response to detecting a selection of rescan button 525, the device discards the previous scan and begins (e.g., re-initiates) scanning the portion of the physical environment that is within the current camera view. For example, a user that wants to apply the virtual effect to a second room is enabled to, while in the scan mode in the first room, enter the second room, select rescan button 525, and device 100 would discard the scan of the first room and initiate scanning of the second room.

Figure 5G:
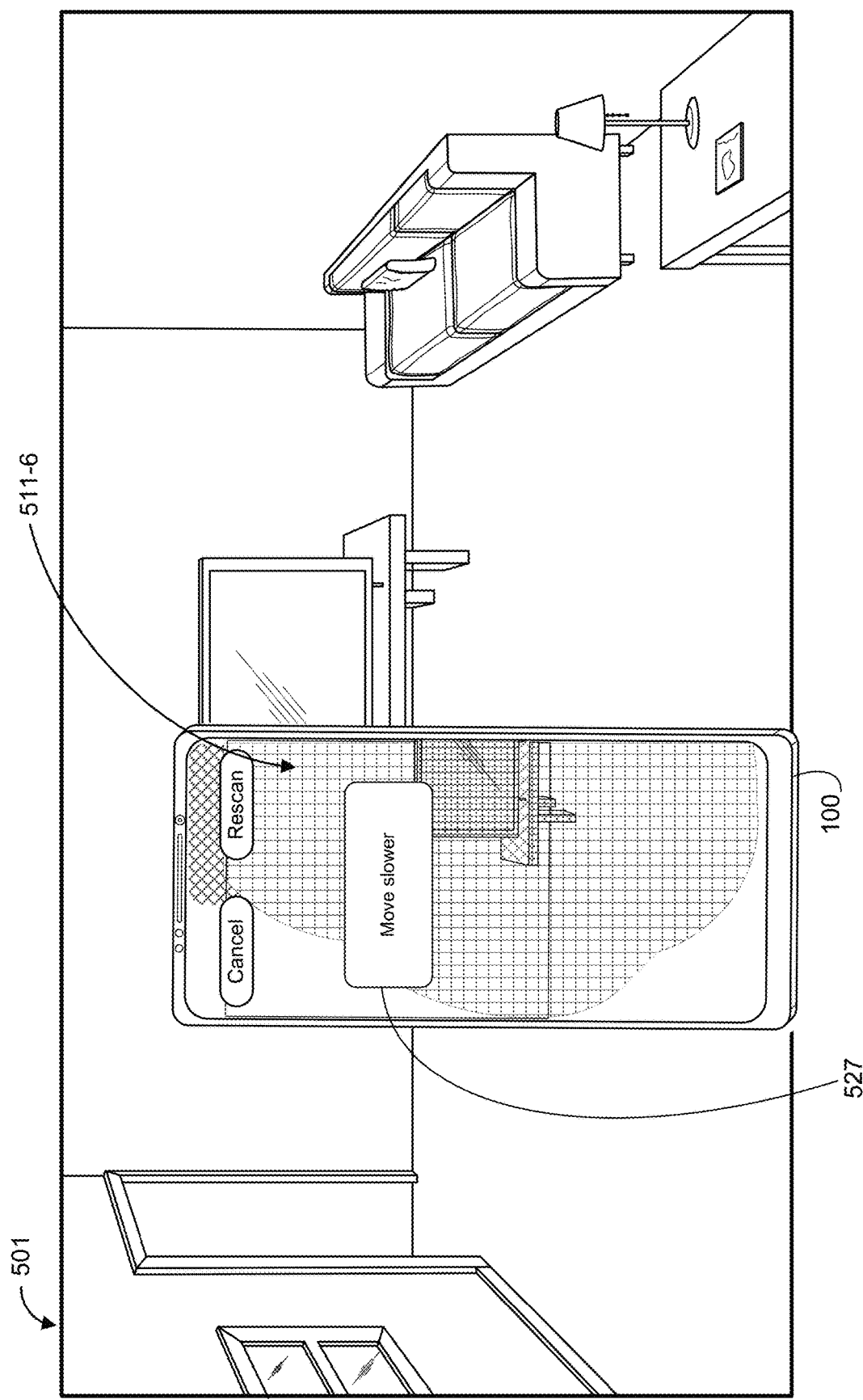

In some embodiments, as device 100 moves around the room (e.g., is moved around the room by a user holding the device), as illustrated in FIG. 5G, device 100 continues to scan the portions of the physical environment that are brought within the camera view, and the mesh (or other) overlay indicating progress of the scan is continuously updated in accordance with the scanning.

While device 100 scans different portions of the physical environment, the device 100 requires that one or more conditions are satisfied in order to obtain the scan (e.g., to obtain an accurate scan). In some embodiments, device 100 must be moved and/or rotated about the physical environment at a rate below a threshold movement rate. In accordance with a determination that the device 100 is moved at a rate that exceeds the threshold movement rate, an error condition is triggered. For example, in response to triggering the error condition (e.g., by moving device 100 too quickly), device 100 displays user interface 511-6, shown in FIG. 5G, which includes displaying error message 527 ("Move slower") to indicate that the user has exceeded the threshold movement rate for moving the device. In some embodiments, error message 527 automatically disappears once the error condition has been resolved. For example, in response to the user slowing down the rate of movement of device 100, error message 527 disappears. In some embodiments, the device does not continue scanning the physical environment while the error condition is triggered, and the progress indicator does not update. For example, the mesh overlay is not extended over additional features within the camera view when the device is moved too quickly. In some embodiments, upon resolving the error condition, device 100 continues scanning the physical environment.

Figure 5H:
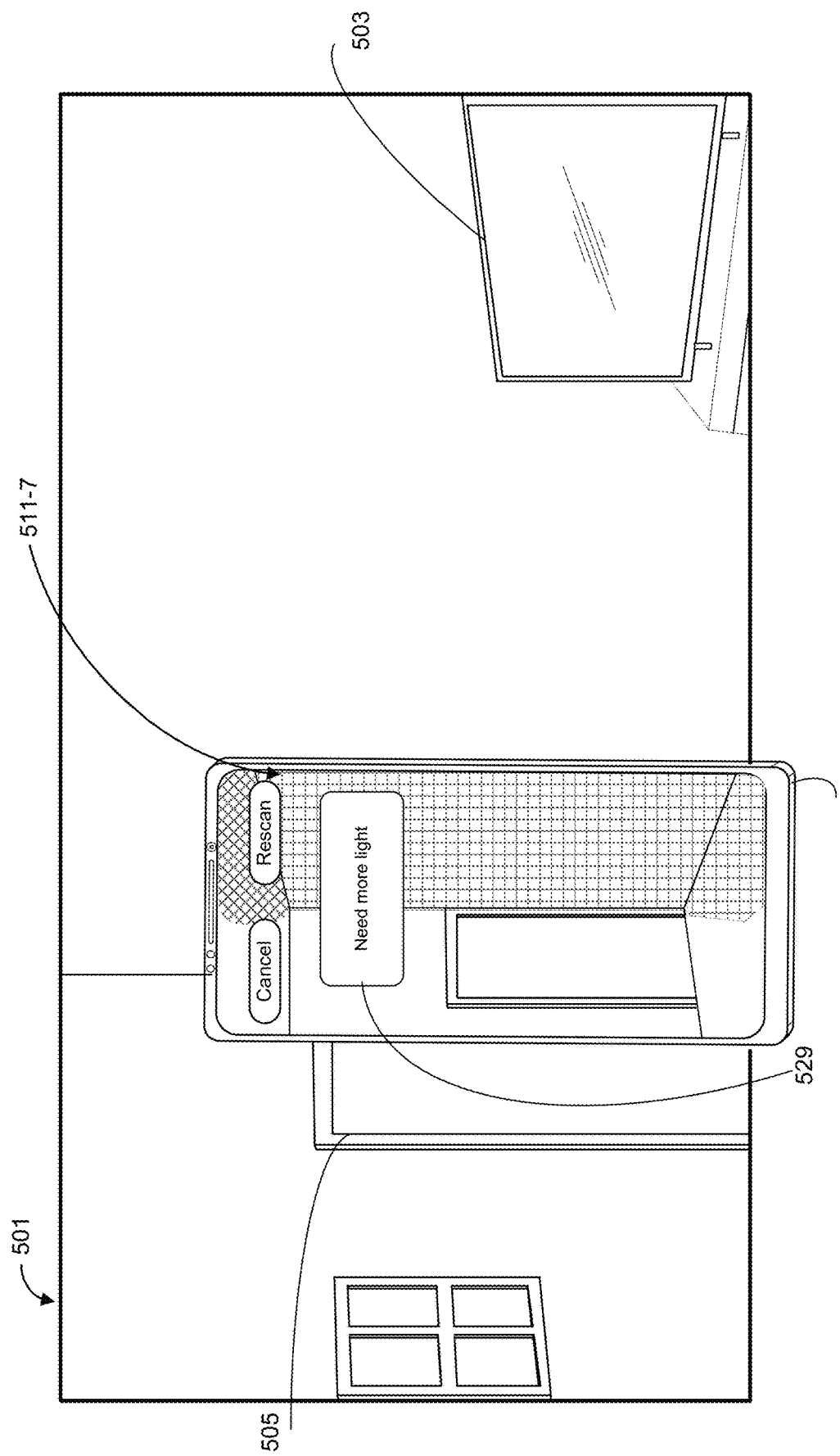

FIG. 5H illustrates user interface 511-7, which includes a current camera view that includes a representation of doorway 505 (e.g., as the device has been rotated to capture the doorway instead of the television). FIG. 5H illustrates a second error message 529 ("Need more light") in accordance with a second error condition being triggered. For example, device 100 requires a threshold amount of light to be detected by the one or more cameras (or other sensors of device 100) in order to scan the physical environment. In some embodiments, error message 529 is generated in response to detecting that there is not enough light present for the device to scan the physical environment. In some embodiments, device 100 automatically stops displaying error message 529 in accordance with the error condition being resolved. For example, after the user adds light (e.g., turns on a light) to resolve the error condition, error message 529 is no longer displayed, and the device 100 continues scanning the physical environment, as illustrated in FIG. 5I.

Figure 5I:
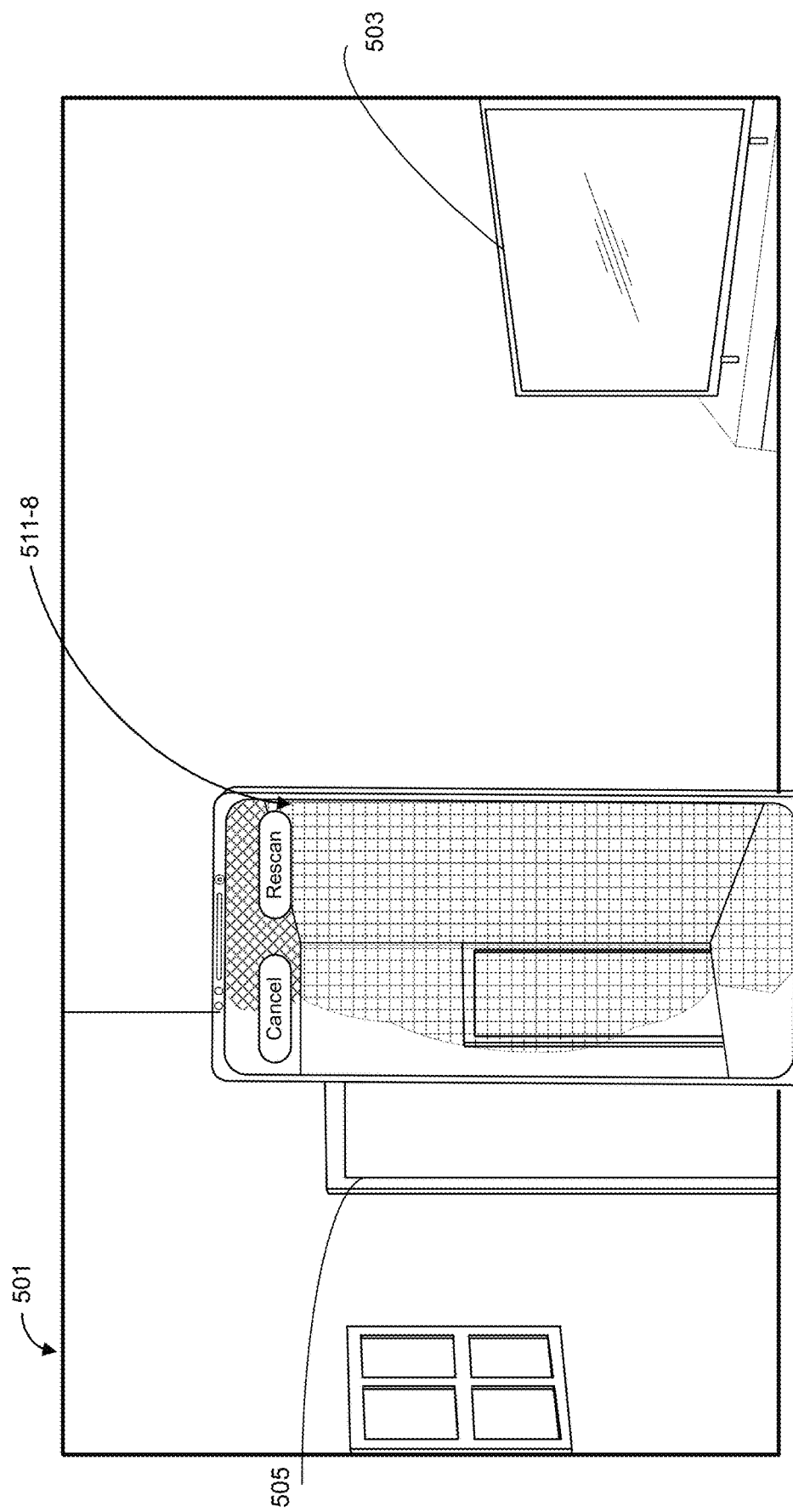
Figure 5J:
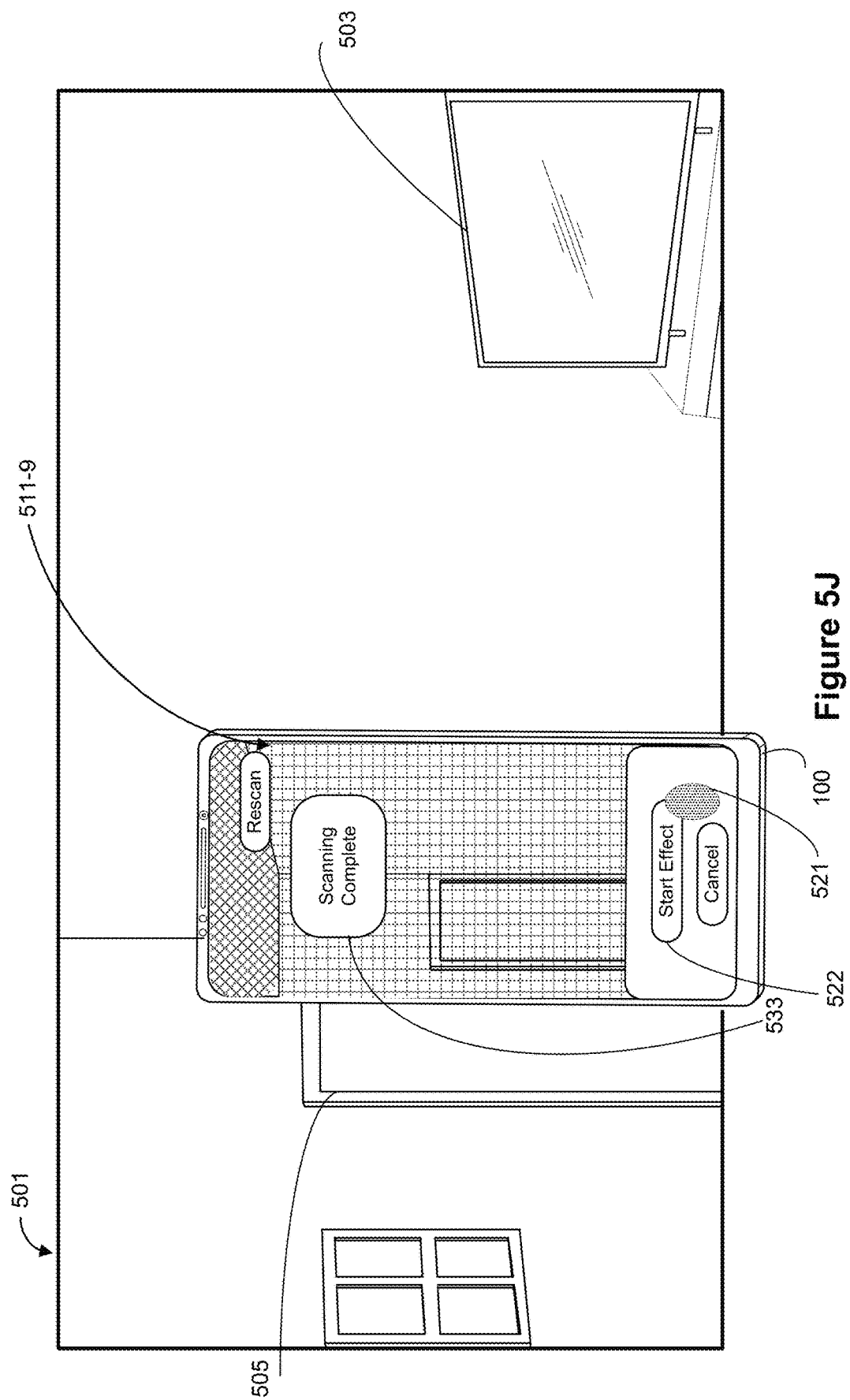

FIG. 5I illustrates user interface 511-8 showing progress of the scan of the physical environment. In some embodiments, the device continues scanning the physical environment as the user continues moving the device with respect to the physical environment. FIG. 5J illustrates that all of the surfaces within the current camera view have been scanned (e.g., detected), as indicated by all of the surfaces and objects displayed with the mesh overlay.

In some embodiments, in accordance with a determination the device is no longer moving with respect to the physical environment (e.g., the device remains still in a same position for a threshold amount of time), the device determines that scanning is complete. For example, in response to detecting that device 100 has maintained its position relative to the physical environment for a threshold amount of time (e.g., and thus scanning is complete), device 100 displays user interface 511-9, shown in FIG. 5J.

In some embodiments, in response to determining that the scan has been completed, device 100 displays a notification. For example, user interface 511-9 includes notification 533 ("Scanning Complete"). In some embodiments, user interface 511-9 further includes a button to rescan (e.g., which, if selected, causes the device to discard the completed scan and restart the scanning process) and a cancel button (e.g., which, if selected, causes the device to exit the scan mode and return to user interface 511-3 shown in FIG. 5D). User interface 511-9 further includes a button 522 ("Start Effect") for initiating display of the virtual effect (e.g., disco virtual effect 520-3, as selected in FIG. 5D). In response to the user selecting button 522 via user input 521, the device initiates the virtual effect, as illustrated in FIG. 5K.

FIG. 5K illustrates user interface 511-10, which includes the selected virtual effect applied over the camera view. In some embodiments, the virtual effect includes a plurality of virtual effect elements. For example, disco virtual effect includes displaying a virtual object (e.g., a virtual disco ball 536-1), adding a gradient to one or more surfaces (e.g., as illustrated by shading on the walls), and displaying simulated light (e.g., light beams 537) on one or more surfaces (e.g., the walls). In some embodiments, based on the scan of the physical environment, device 100 identifies particular objects and/or surfaces. For example, device 100 identifies the walls as a different surface than the floor, ceiling, and the doorway opening. In some embodiments, a respective virtual effect element is applied on respective surfaces that have been identified. For example, the simulated light is displayed on the walls without being displayed on the identified floor, ceiling, or doorway opening. It will be understood than any combination of virtual elements of a virtual effect may be applied to any portion(s) identified or detected by device 100 from the scan, with the specific virtual effects and specific portions of the physical environment being determined in accordance with the virtual effect selected and the portions of the physical environment that have been detected by the computer system.

In some embodiments, virtual effect elements move and/or interact with surfaces in the current camera view. For example, simulated light (e.g., light beams 537) appear to twinkle and appear to travel across the walls (e.g., as if light is cast on the walls from disco ball 536-1). In some embodiments, the virtual object remains stationary at a predefined position relative to the physical environment. In some embodiments, the predefined position of the virtual object is determined based on features (e.g., surfaces) of the physical environment. For example, disco ball 536-1 is positioned to appear to be hanging from the ceiling (e.g., as detected by the device 100 from scanning the physical environment). User interface 511-10 optionally includes rescan button 535 to discard the previous scan and restart the scanning process using a current position of the device.

Figure 5L:
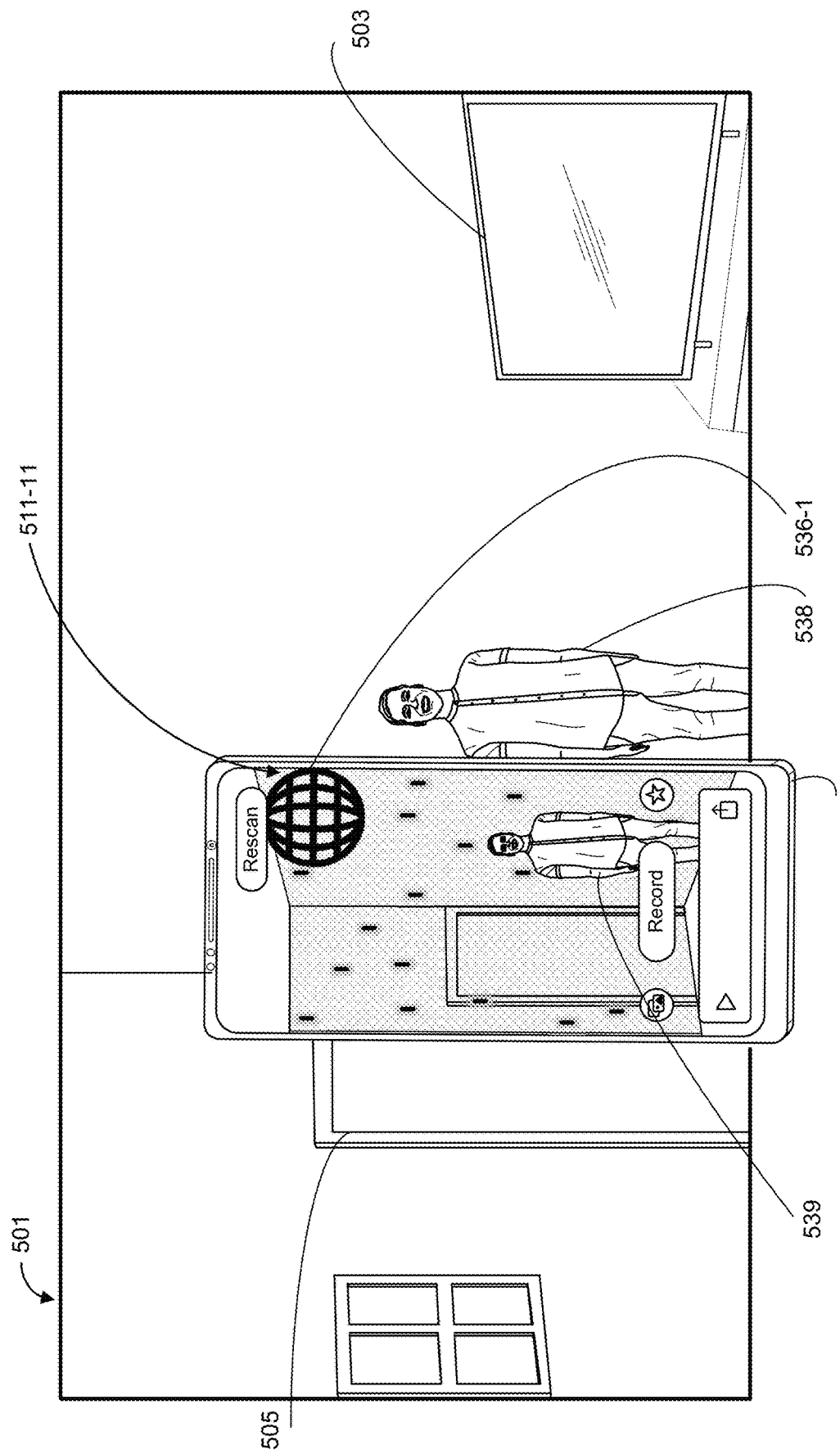

FIG. 5L illustrates a person 538 entering the camera view. In some embodiments, device 100 identifies (e.g., detects) that person 538 is a person (e.g., device 100 is enabled to distinguish between a person and a moving object or animal). For example, a representation of the person 539 is displayed in user interface 511-11 to indicate that person 538 is now in the field of view of the one or more cameras. As illustrated in FIG. 5L, in some embodiments, the virtual effect (or at least a portion of the virtual effect elements) is not applied to the representation of the person 539. For example, the gradient and/or simulated light (e.g., light beam 537) are not displayed over the representation of the person. Instead, the virtual effects are applied to the surfaces and/or stationary objects that are detected (e.g., by the scan) within the physical environment without being applied to the representation of the person.

Figure 5M:
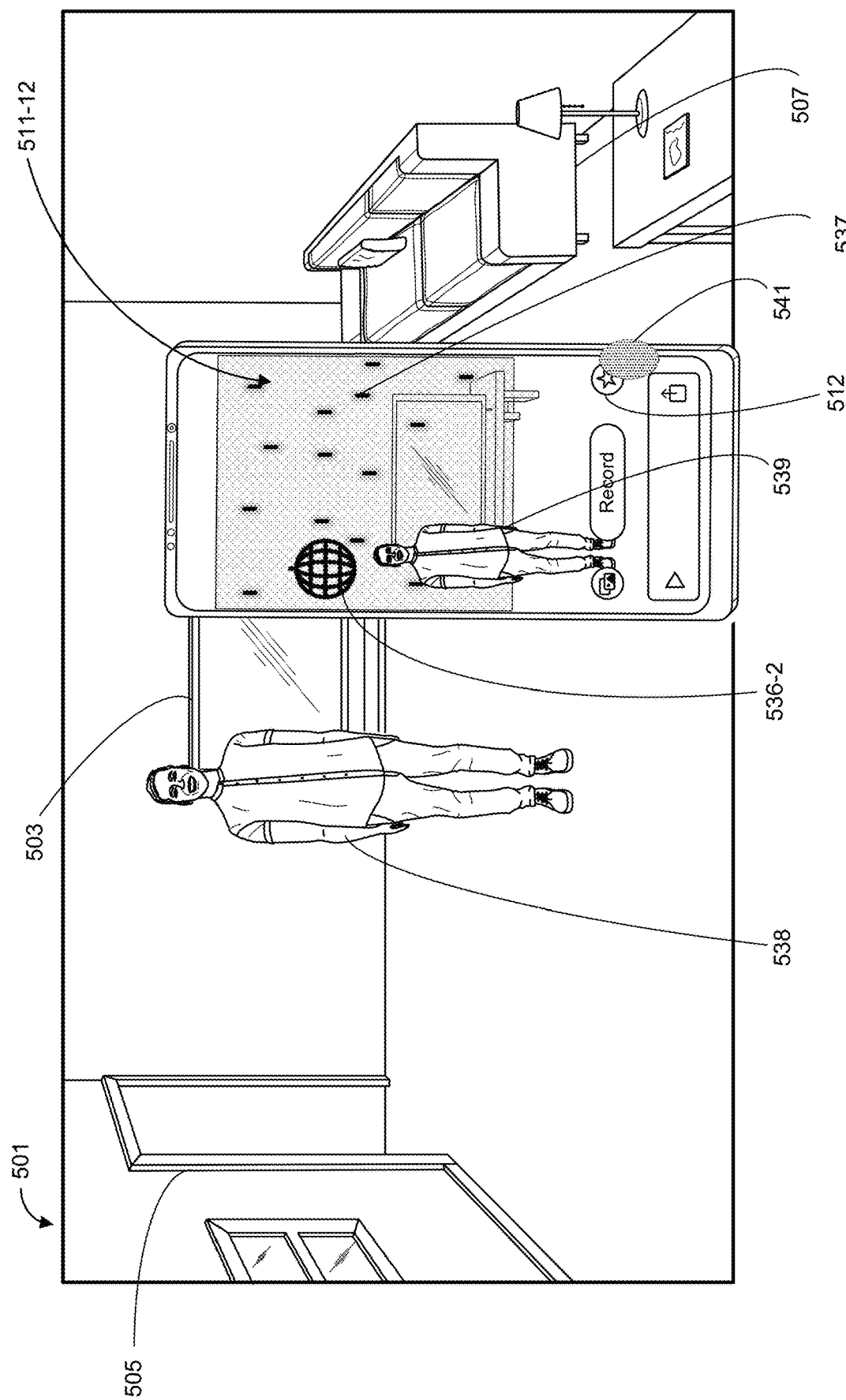

FIG. 5M illustrates user interface 511-12, which includes displaying the disco virtual effect applied based on a position of the person (e.g., as opposed to FIG. 5L in which the predefined position of the virtual object is based on features (surfaces) of the physical environment). For example, the predefined position of a virtual object (e.g., virtual disco ball 536-2) is determined based on the position of the person, such that the virtual object appears at a position relative to the person. In FIG. 5M, virtual disco ball 536-2 is displayed at a predefined distance above the person's head. FIG. 5M further illustrates user input 541 selecting the effects button 512.

Figure 5N:
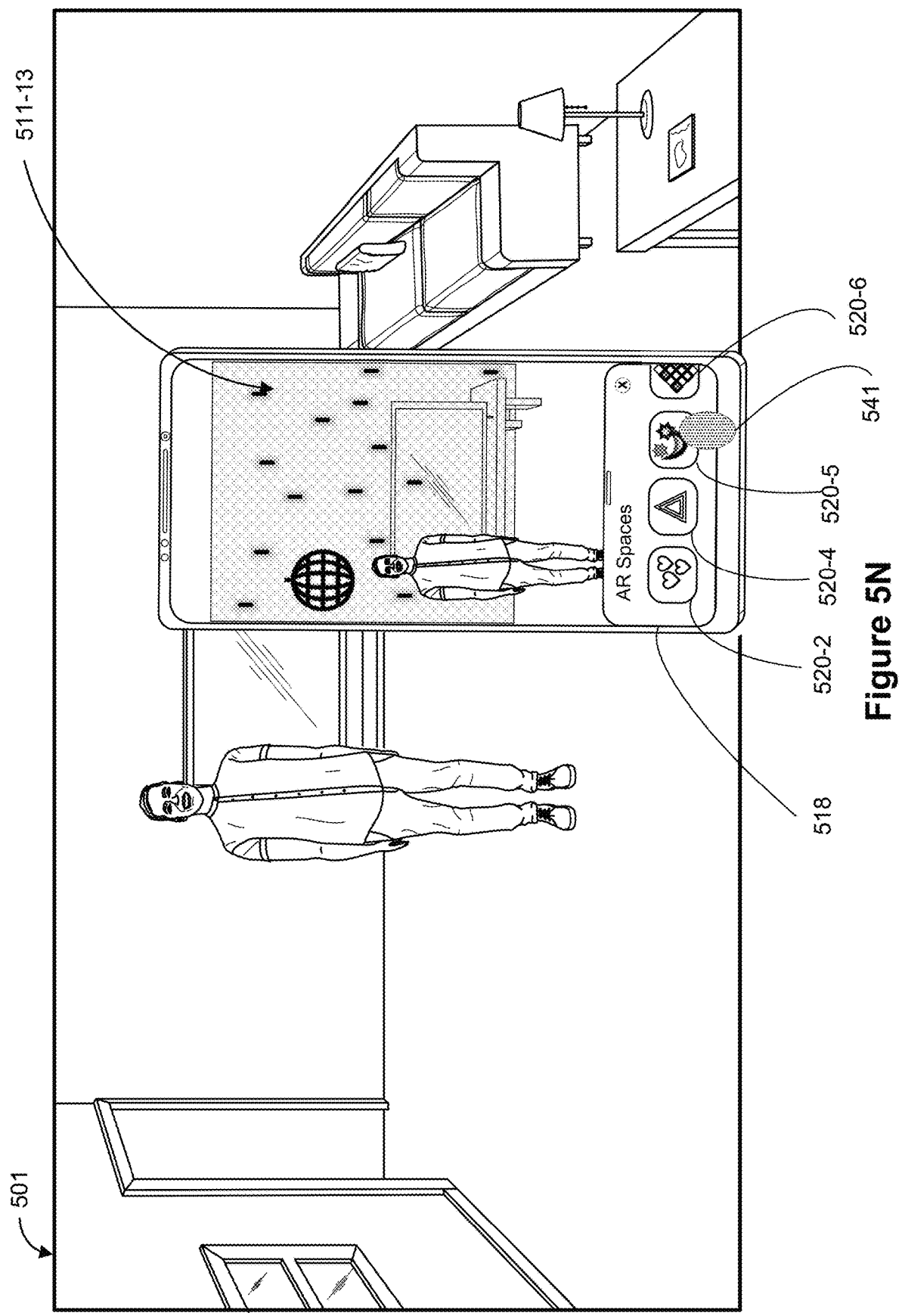

In response to selection of effects button 512, user interface 511-13 displays portion 518 ("AR Spaces") to provide options for changing a virtual effect applied to the camera view, as illustrated in FIG. 5N. In some embodiments, portion 518 includes different options for virtual effects than the currently applied virtual effect. For example, disco virtual effect is currently applied over the camera view in user interface 511-13, and portion 518 includes options to change to hearts virtual effect 520-2, prism virtual effect 520-4, comet virtual effect 520-5, or dance floor virtual effect 520-6. In response to a user input 541 selecting comet virtual effect 520-5, user interface 511-14 is displayed, as illustrated in FIG. 5O.

Figure 5O:
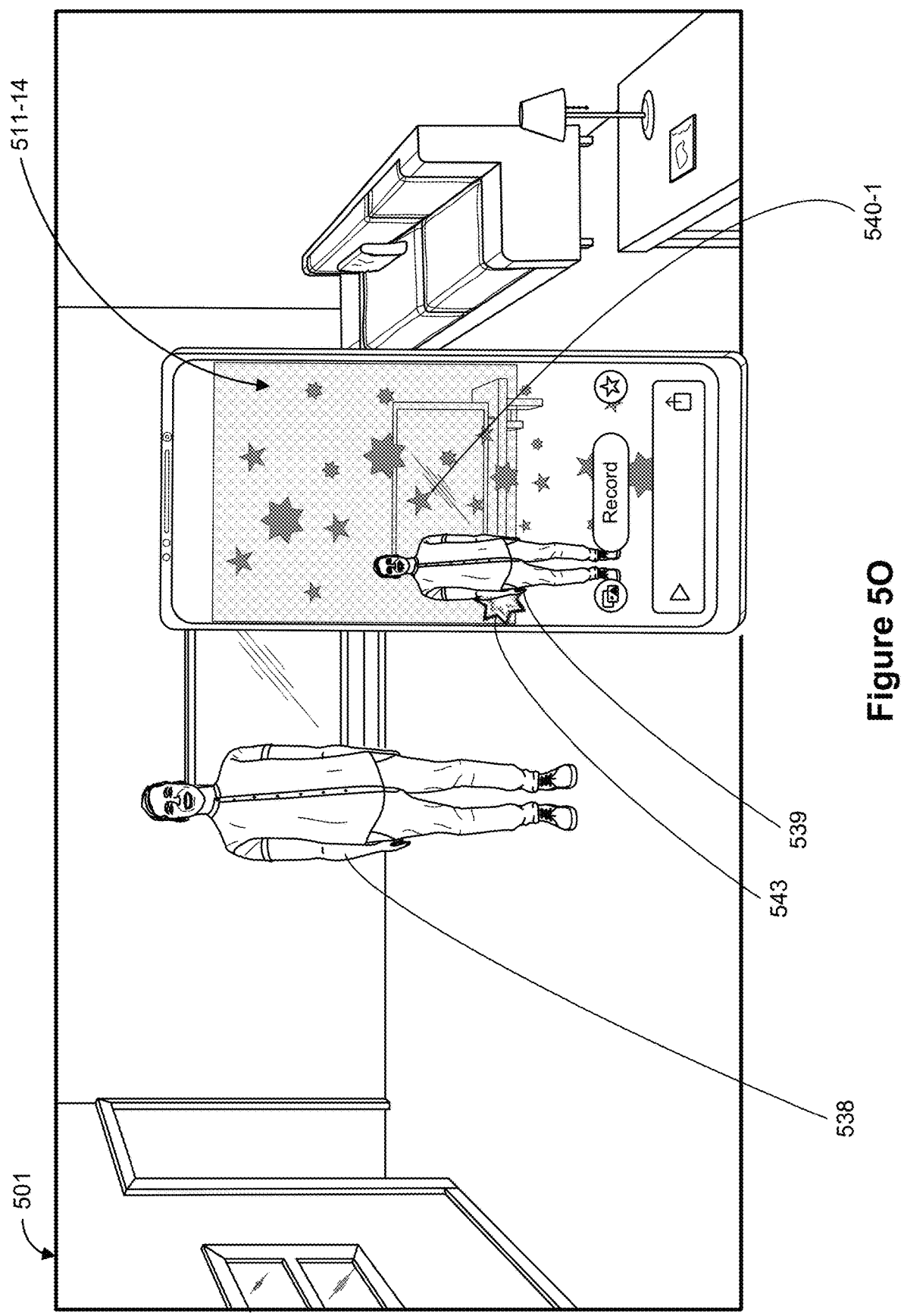
Figure 5P:
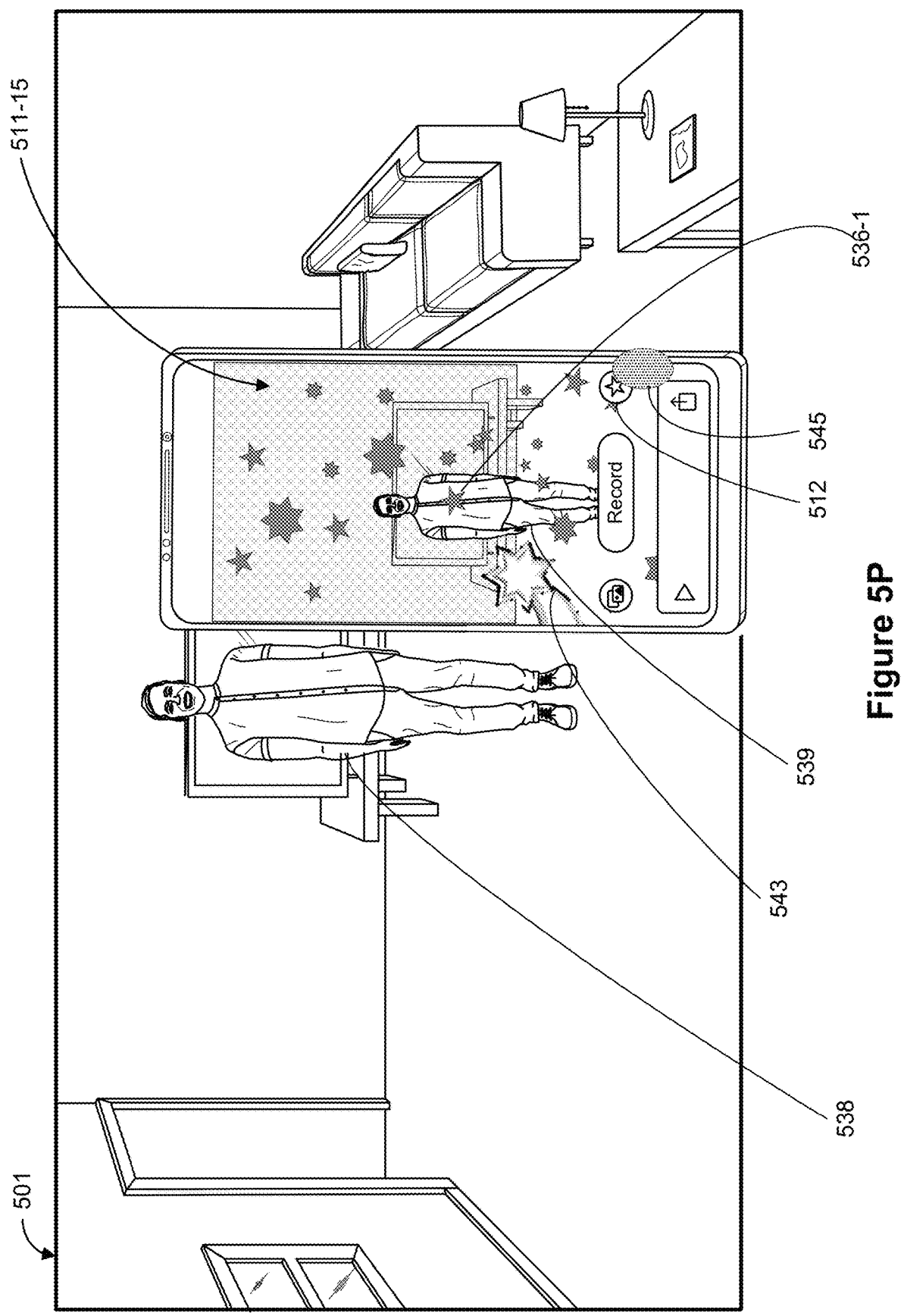
Figure 5Q:
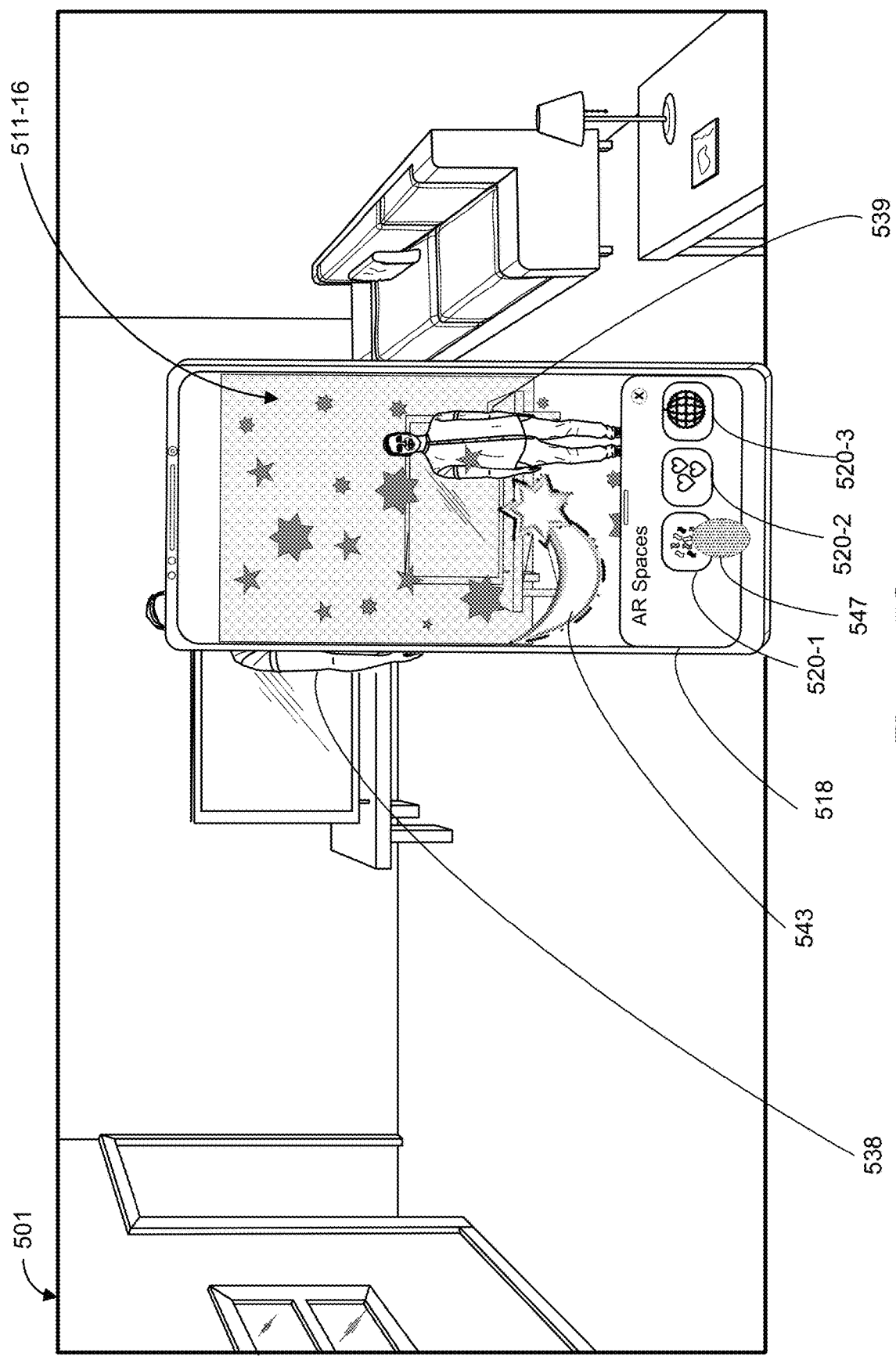

FIGS. 5O-5Q illustrate the comet virtual effect 520-5 applied over the camera view as person 538 moves relative to the physical environment 501. For example, as person 538 moves within the physical environment, representation of the person 539 displayed on device 100 also moves (e.g., according to a position of person 538 within the field of view of the one or more cameras). In some embodiments, comet virtual effect 520-6 includes a plurality of virtual effect elements. For example, comet virtual effect optionally includes applying a gradient (e.g., shading) to the representation of the one or more walls (e.g., and/or other detected surfaces, such as the television), and optionally includes one or more virtual objects (e.g., particles) that appear to fill a volume of the physical environment that is within the camera view, both of which are shown in FIGS. 5O-5Q. For example, stars (e.g., star 540-1, FIG. 5O) are displayed as suspended within the representation of the field of view of the one or more cameras. In some embodiments, the particles (e.g., stars) are dynamic and appear to float and/or move around the representation of the physical environment.

In some embodiments, one or more virtual objects are displayed in front of (e.g., partially covering) the representation of the person 539. For example, unlike the simulated light that only appeared on the surfaces for the disco virtual effect, a least a portion of the stars for the comet effect appear in front of the representation of the person 539. Further, displaying the comet virtual effect includes displaying virtual object 543 (e.g., a virtual comet) at a position determined relative to the representation of the person 539. For example, as the representation of the person 539 moves within the camera view (as illustrated between FIGS. 5O-5Q), virtual object 543 is also updated to move to appear as though virtual object 543 is following the representation of the person 539.

FIG. 5P illustrates receiving a user input 545 on effects button 512 which, when activated, provides options (e.g., via AR Spaces portion 518) that the user may select to change the virtual effect. For example, FIG. 5Q illustrates user input 547 selecting confetti virtual effect 520-1. In response to the request to display confetti virtual effect 520-1, user interface 511-17 is displayed, as illustrated in FIG. 5R.

Figure 5R:
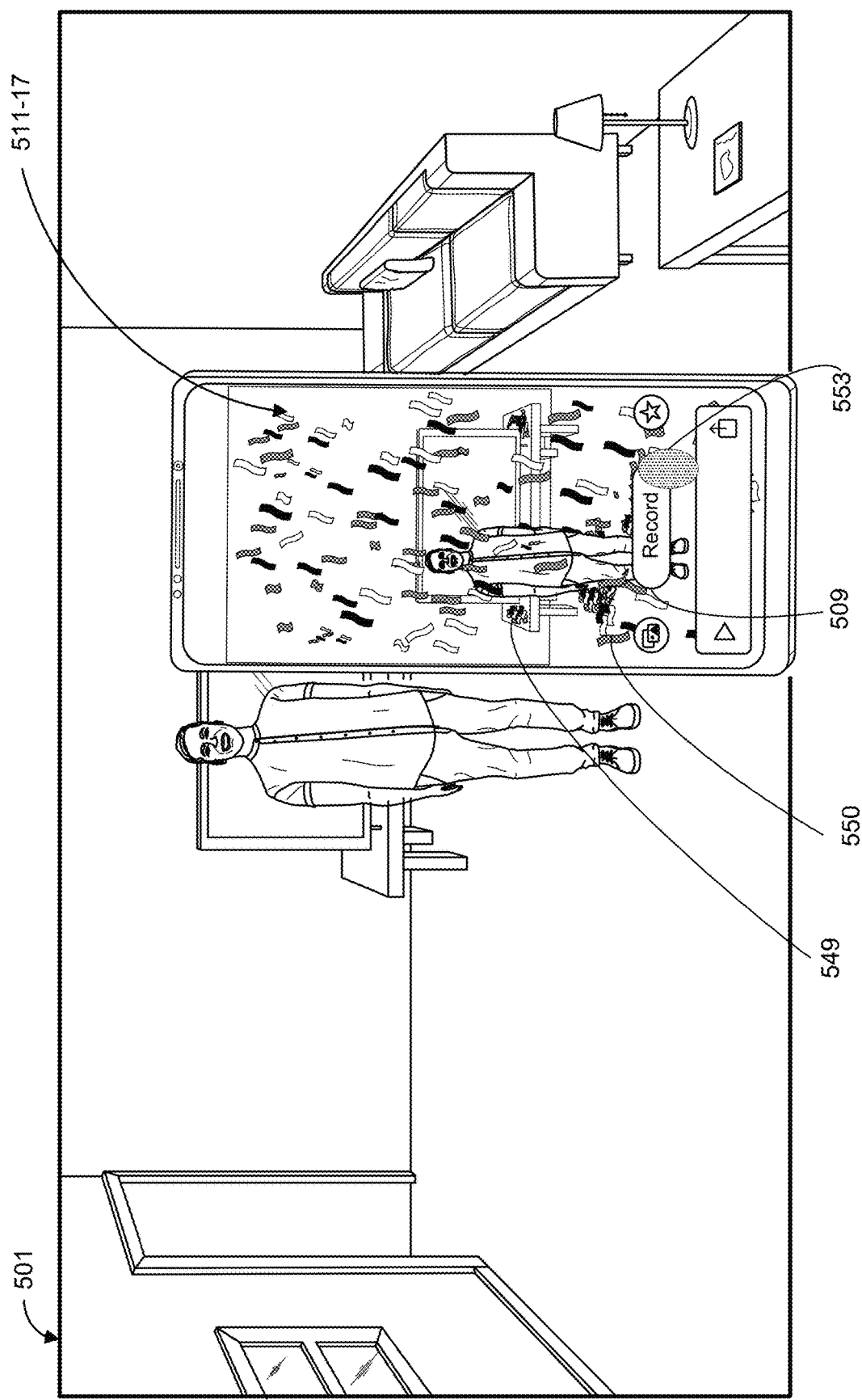

FIG. 5R illustrates confetti virtual effect applied over the camera view in the user interface 511-17. In some embodiments, confetti virtual effect includes a plurality of particles (e.g., each particle corresponding to a piece of virtual confetti 550) that appears to be falling from the ceiling (e.g., as identified from the scan of the physical environment, described above). In some embodiments, the plurality of particles includes particles of various sizes, shapes, and/or colors. In some embodiments, the plurality of particles is displayed to appear to occupy (e.g., fill) a volume of the portion of the physical environment of the camera view. For example, some of the particles appear to be falling in front of the representation of the person 539, while other particles are hidden behind the representation of the person 539 (e.g., to provide a visual effect in which the person is standing in the middle of a room where confetti is falling). In some embodiments, confetti virtual effect includes displaying one or more virtual piles of confetti on one or more surfaces (e.g., horizontal surfaces) of the physical environment 501 that are within the camera view. For example, a virtual pile of confetti 549 is displayed on the representation of the table top that holds the television. In some embodiments, the virtual pile of confetti 549 is displayed to appear as an accumulation of the particles (e.g., that are falling from the ceiling) on one or more surfaces, such as on table tops and/or the floor.

Figure 5S:
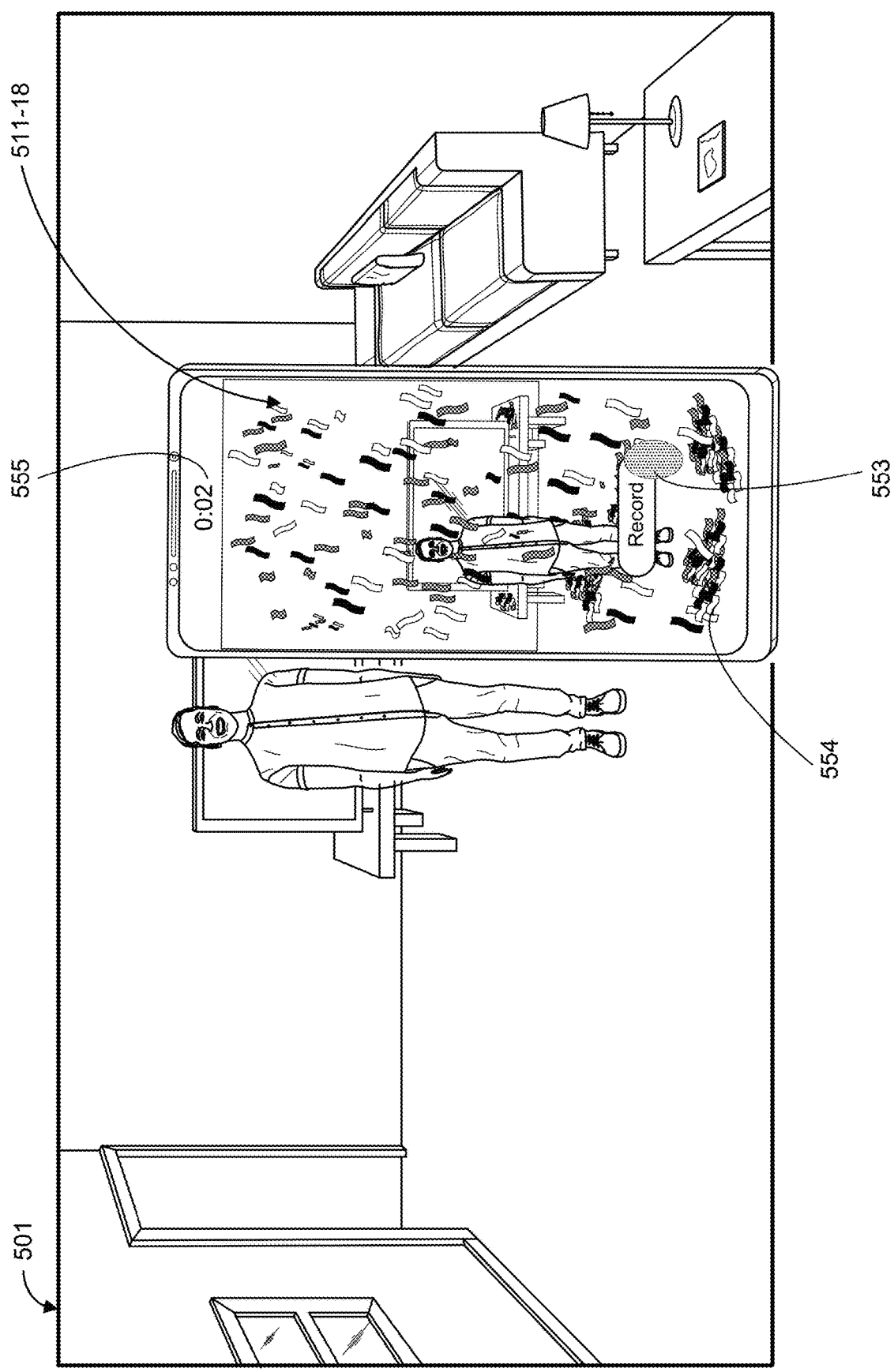

FIG. 5R further illustrates receiving a user input 553 selecting Record button 509. In some embodiments, user input 553 is a tap input. In some embodiments, user input 553 is a press and hold input (e.g., the user maintains contact with the button while the recording is in process, as shown in user interface 511-18 of FIG. 5S). For example, FIG. 5S illustrates that, in response to activating the Record button 509, the device 100 captures (e.g., and stores) media, such as a photo or a video, showing the virtual effect applied over the camera view. For example, timer 555 (shown in FIG. 5S) indicates a length of the current video that is being captured by device 100 (e.g., 2 seconds). User interface 511-18 also illustrates another example of a virtual pile of confetti 554 that appears to accumulate on the floor within the camera view.

Figure 5T:
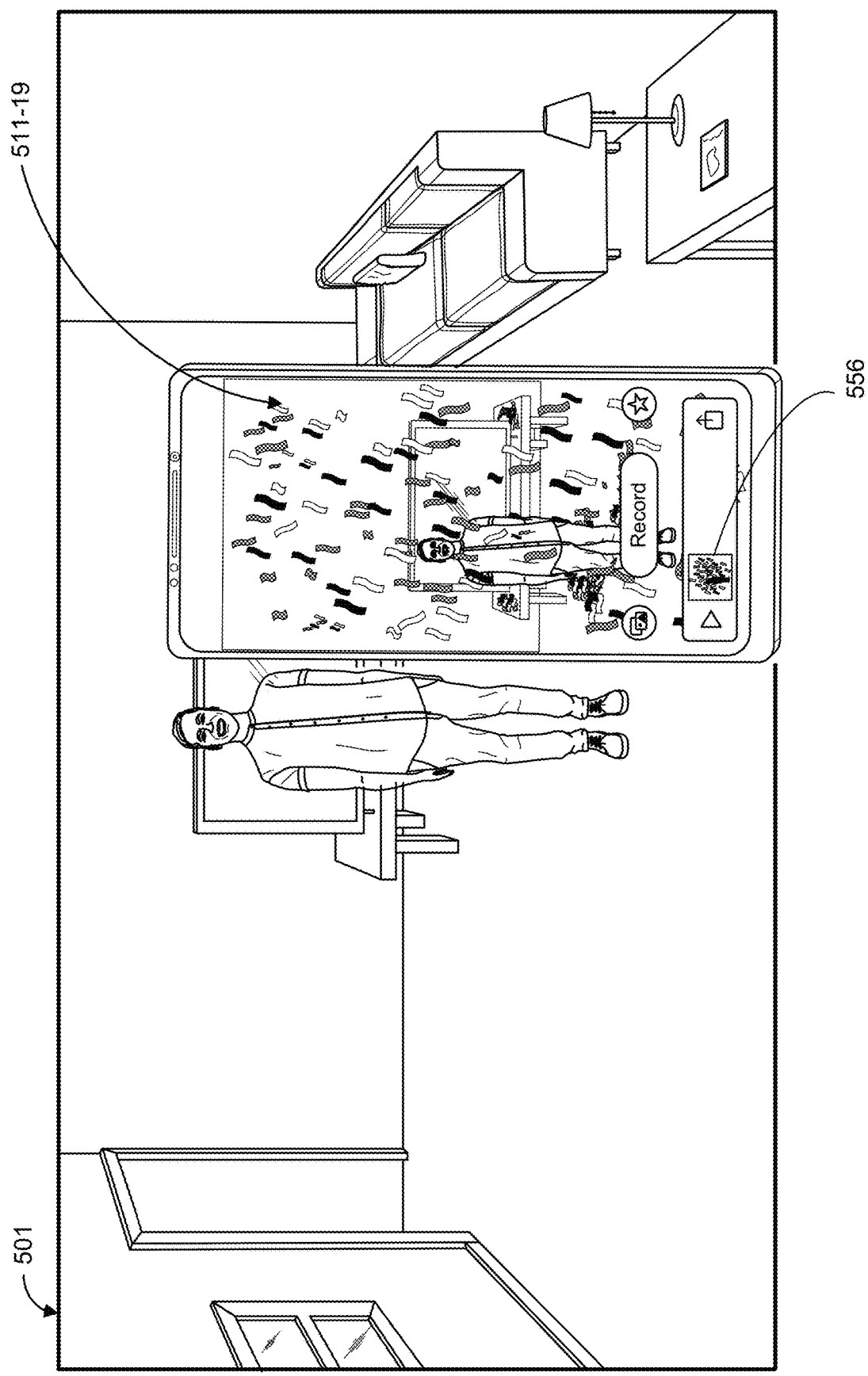

In some embodiments, in response to the user lifting off the user input 553, the recording of the video stops. In some embodiments, after the video has been recorded, a thumbnail 556 representing the captured video is displayed within user interface 511-19, as illustrated in FIG. 5T.

Figure 5U:
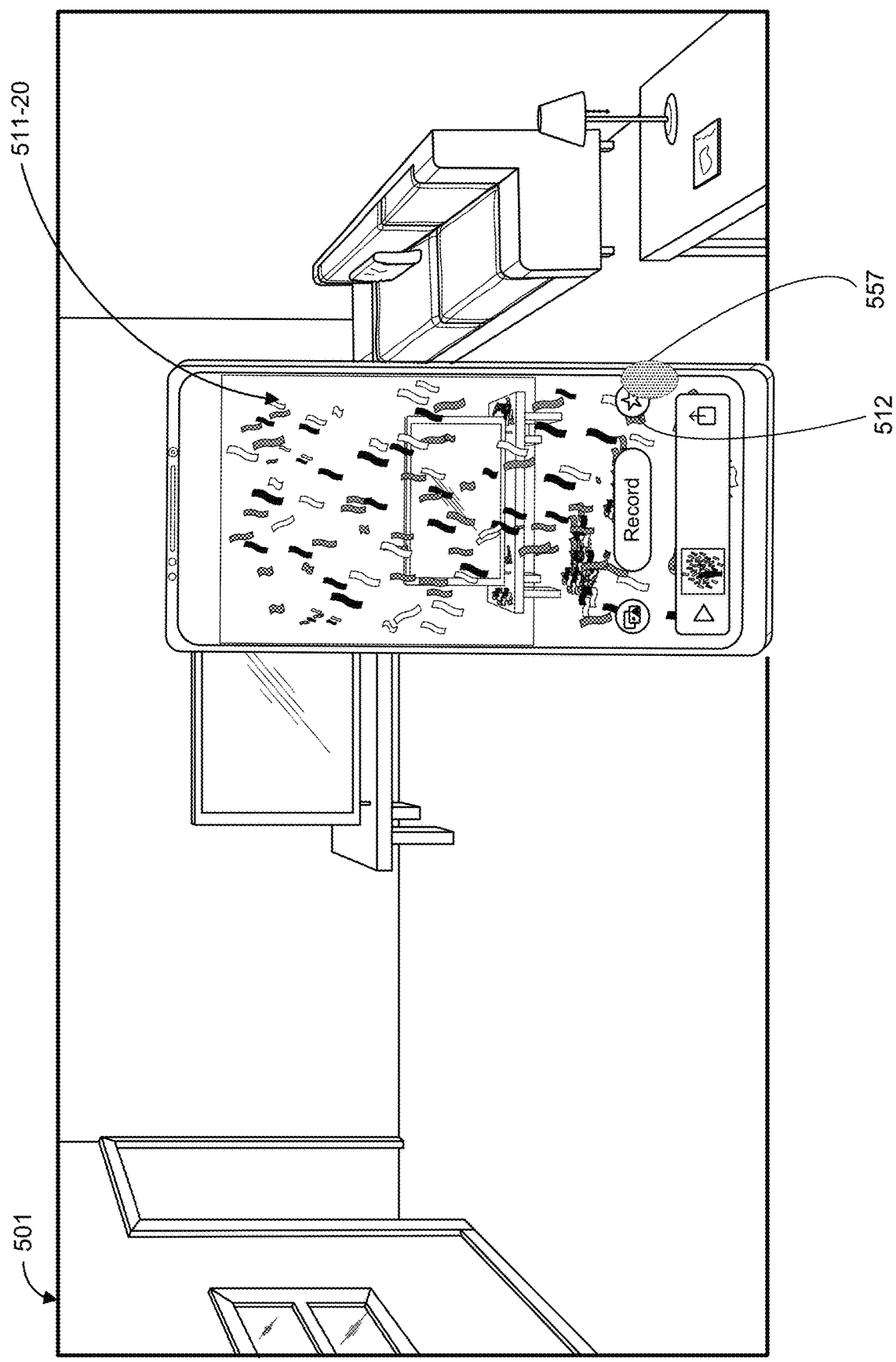
Figure 5V:
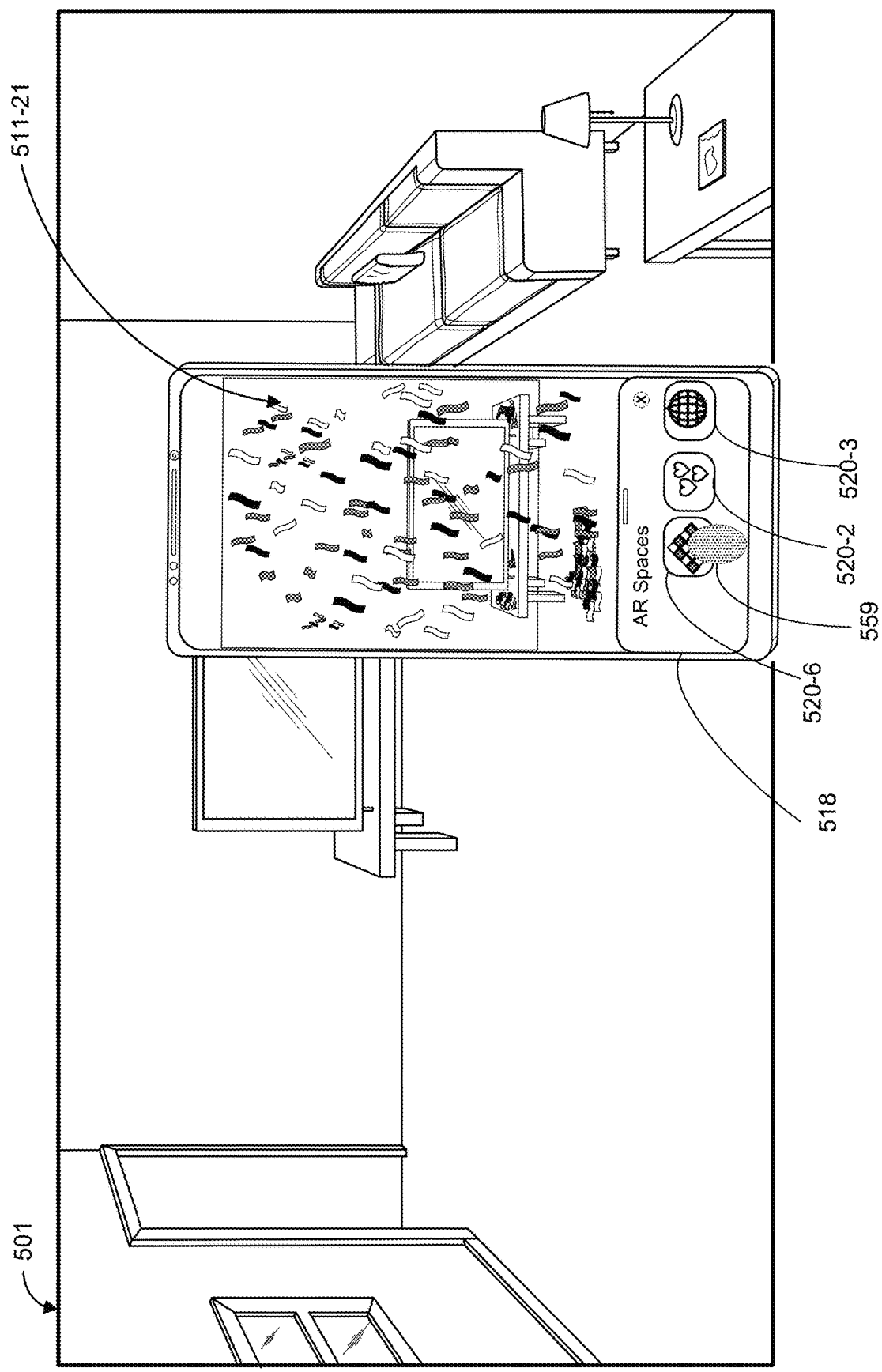
Figure 5W:
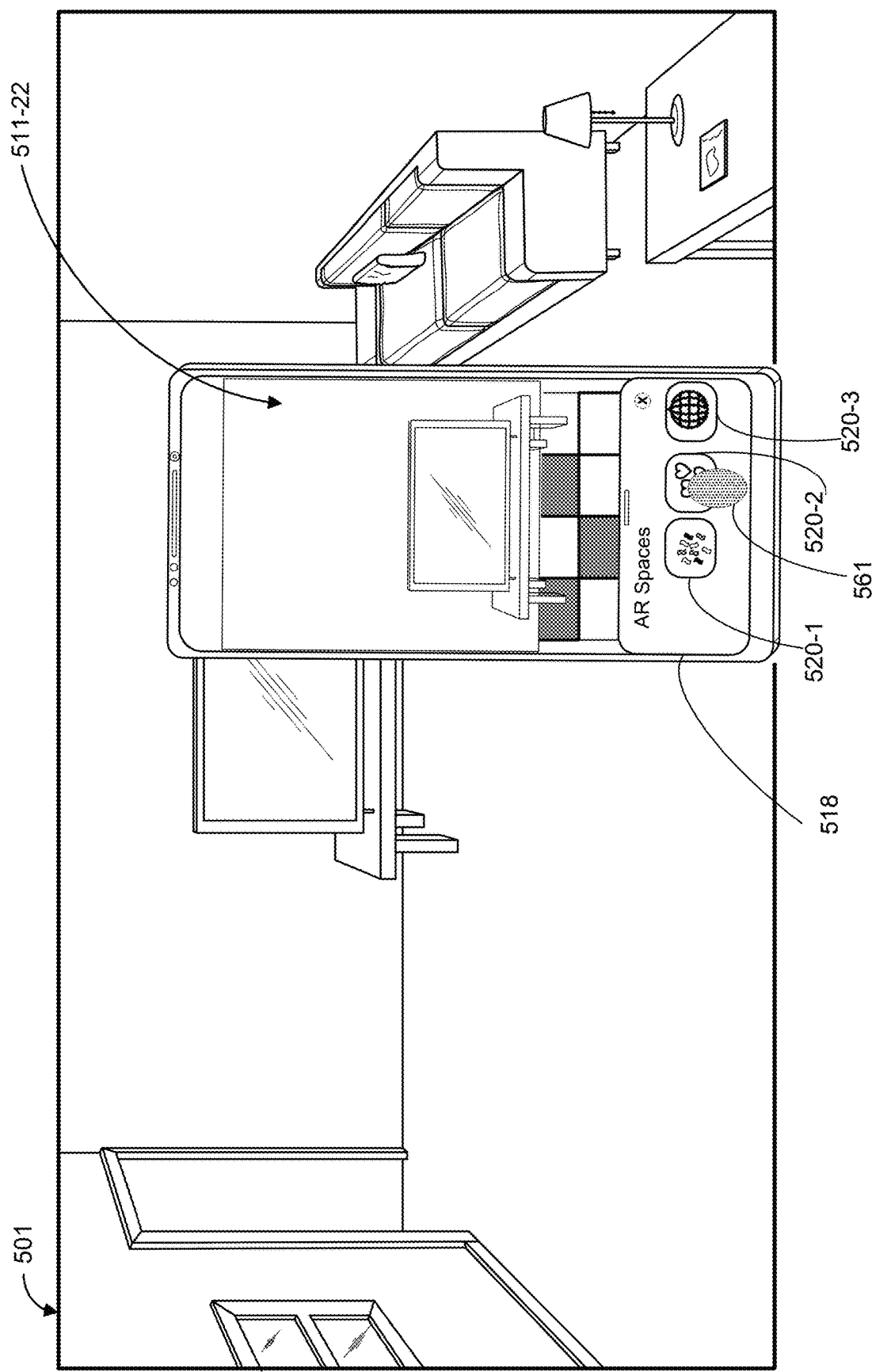

FIG. 5U illustrates user interface 511-20 in which a user input 557 selects the effects button 512, which causes the device to display user interface 511-21, shown in FIG. 5V. User interface 511-21 includes AR Spaces portion 518 to provide options for the user to change the virtual effect applied to the camera view. For example, user input 559 selects dance floor virtual effect 520-6. In response to the selection of dance floor virtual effect 520-6, user interface 511-22 is displayed, as shown in FIG. 5W, in which a dance floor appears on the surface determined by the device as the floor of the physical environment 501. In some embodiments, dance floor virtual effect includes displaying simulated light (e.g., boxes of light) on the floor surface (e.g., as detected from the scan of the physical environment). In some embodiments, the simulated light is displayed at various locations on the floor surface (e.g., to light up different portions of the floor surface over time).

Figure 5X:
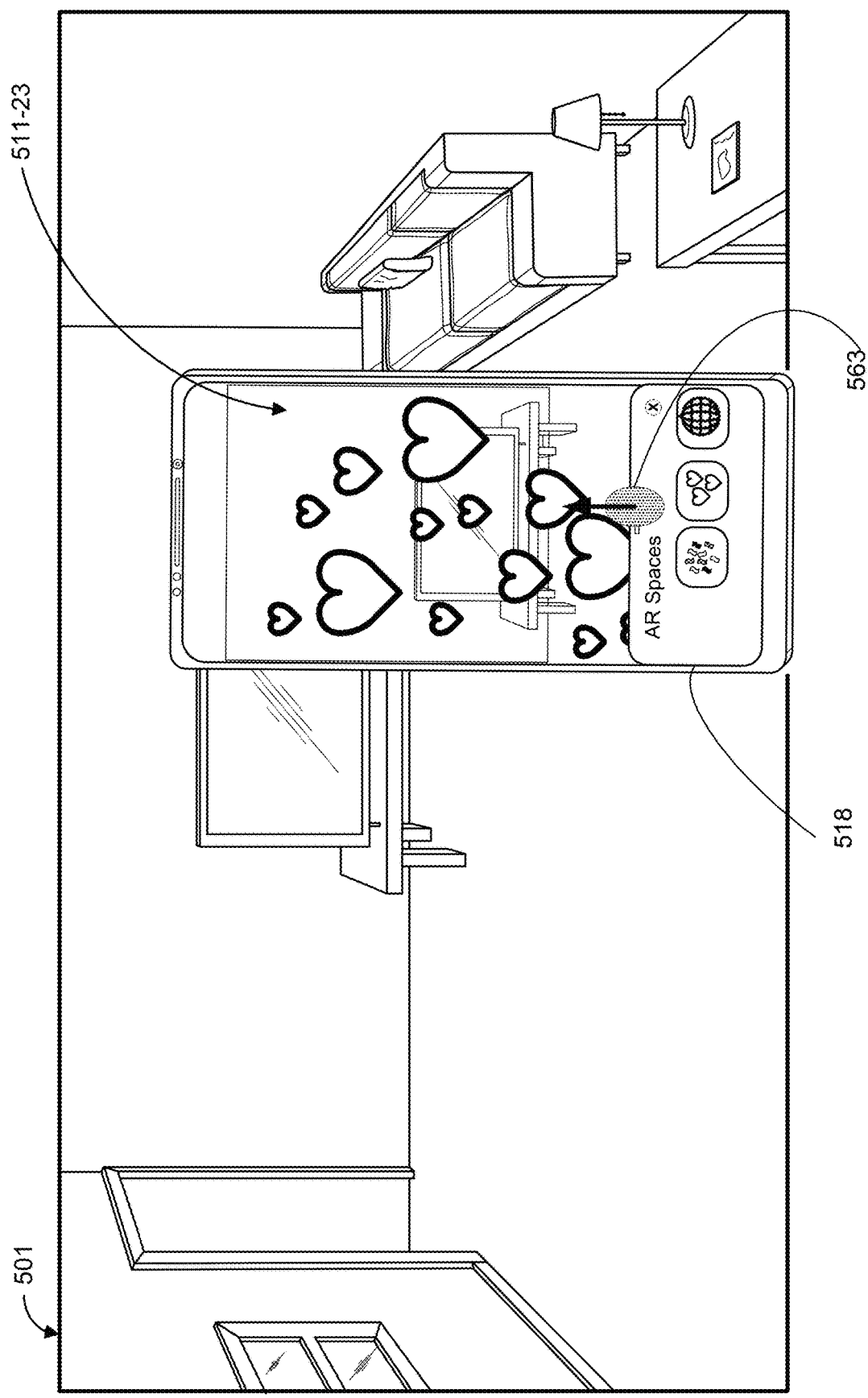

FIG. 5W further illustrates a user input 561 selecting hearts virtual effect 520-2. In response to the selection of hearts virtual effect 520-2, device 100 displays user interface 511-23, as illustrated in FIG. 5X. In some embodiments, hearts virtual effect includes a plurality of virtual hearts that appear to be floating within the representation of the field of view of the one or more cameras. In some embodiments, each virtual heart of the plurality of virtual hearts moves, or appears to move, independently (e.g., the virtual hearts each follow a different path moving about the representation of the physical space). For example, the virtual hearts move around the camera view. In some embodiments, the virtual hearts move around an area with respect to a person. For example, the virtual hearts appear to move out of the way of a person in response to device 100 detecting the person is present in the current camera view. In some embodiments, the hearts virtual effect is applied without regard to one or more surfaces and/or detected features of the physical environment. Because the virtual effect is not dependent on surfaces of the physical environment, device 100 does not require a scan of the physical environment to detect surfaces before applying heart virtual effect. As such, in some embodiments, the device 100 displays the hearts virtual effect without initiating a scanning process as described with reference to FIGS. 5E-5J.

FIG. 5X further illustrates a user input 563 (e.g., a drag input) on portion 518 in order to expand the displayed set of virtual effect options (e.g., by expanding the user interface region, labeled in FIG. 5X as the AR Spaces portion), from which the user can select to apply a different virtual effect.

Figure 5Y:
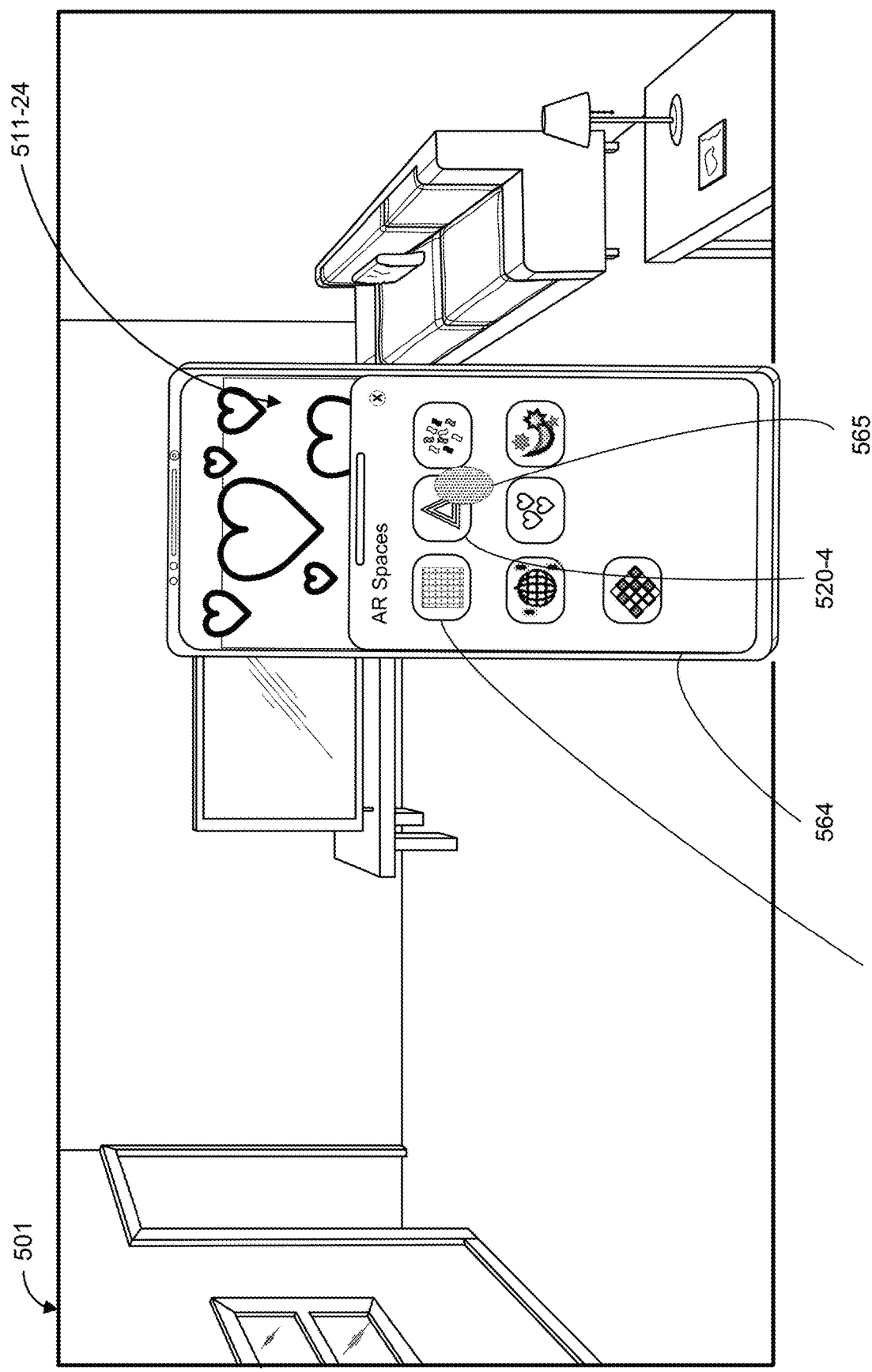

FIG. 5Y illustrates a user interface 511-24 that includes an expanded AR Spaces portion 564, which displays representations for additional virtual effects that may be applied. In some embodiments, expanded AR Spaces portion 564 includes an option 566 to return to the user interface for initiating a scanning mode (e.g., shown in FIG. 5F). Device 100 receives user input 565 selecting prism virtual effect 520-4.

Figure 5Z:
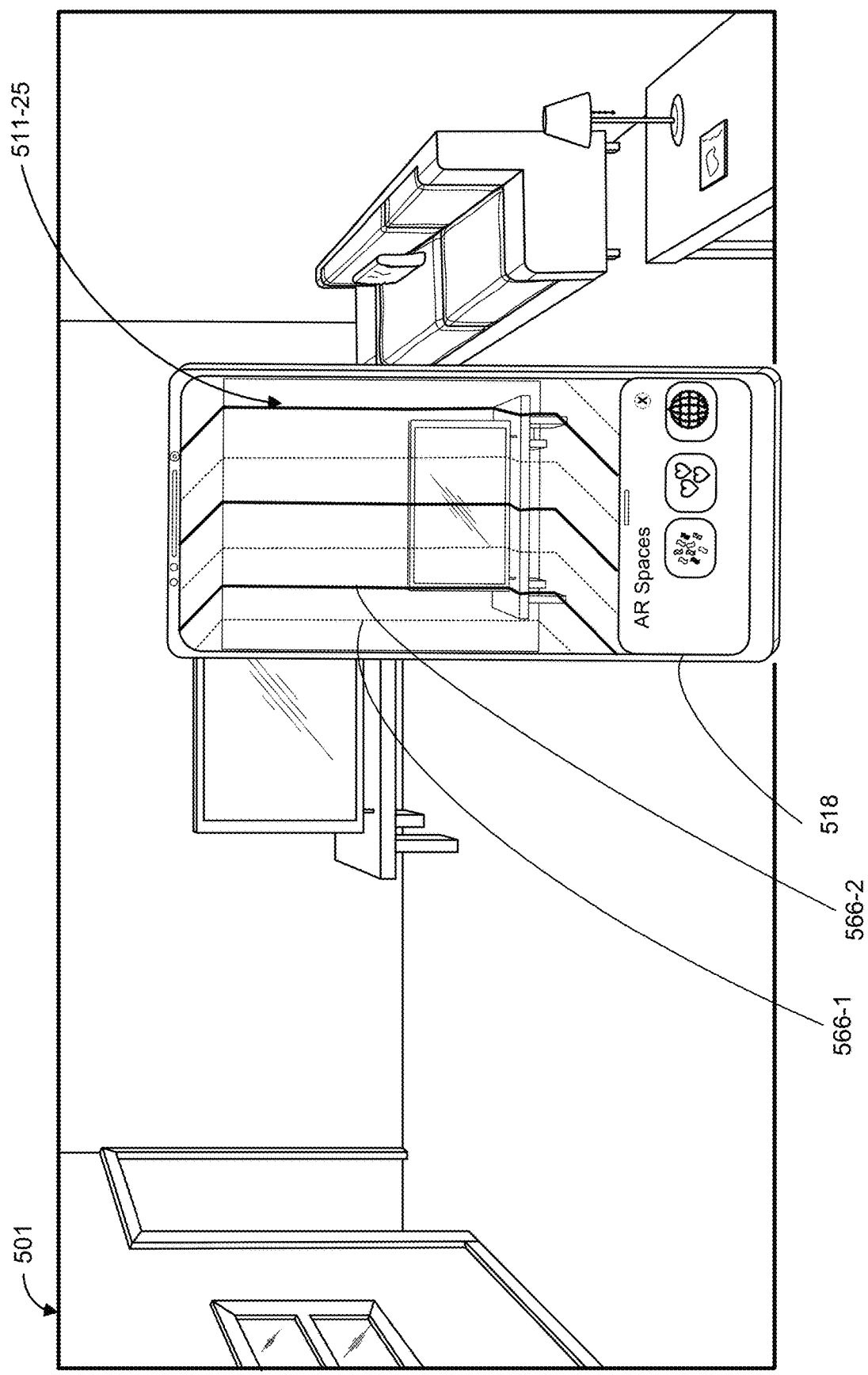
Figure 5A:
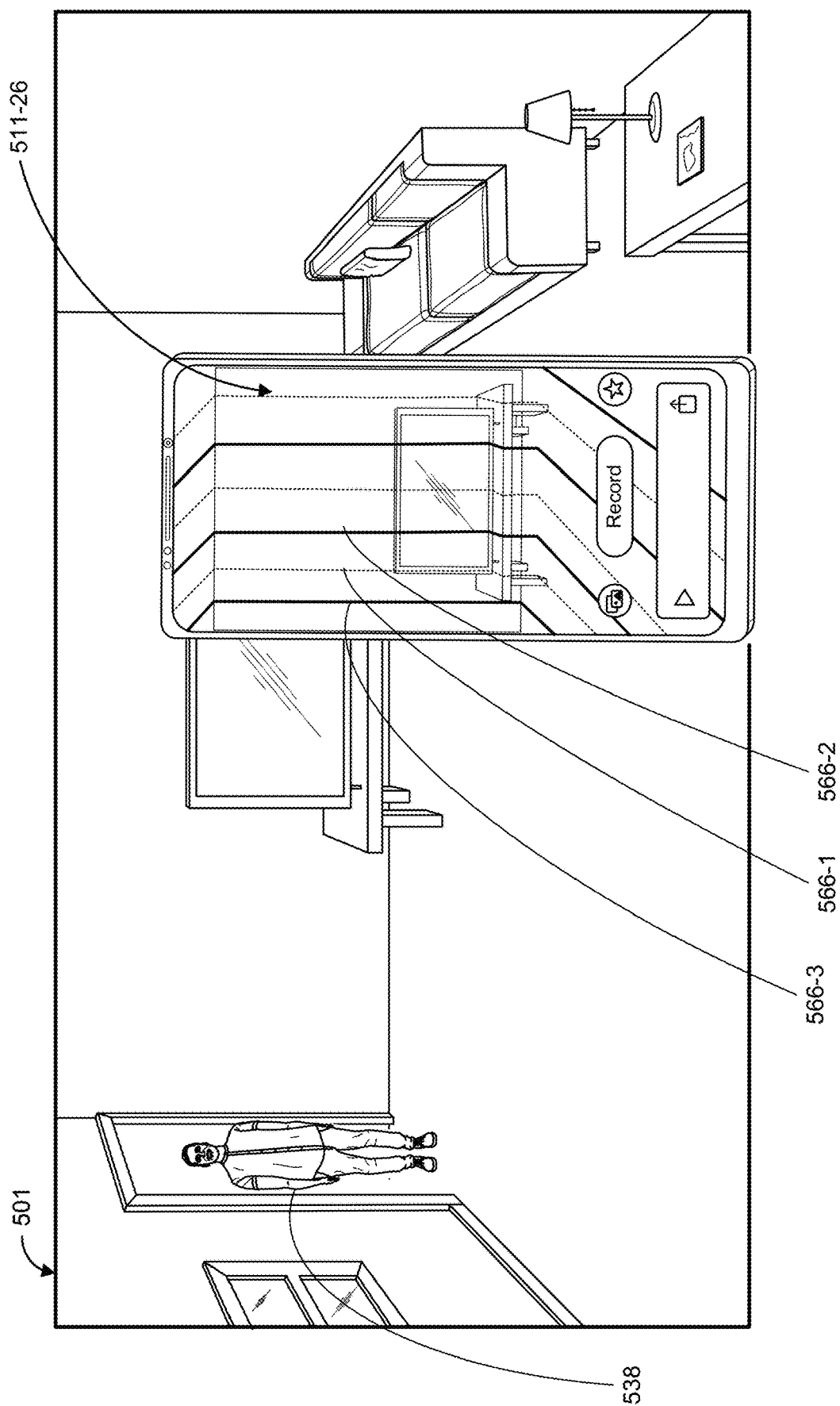
Figure 5A:
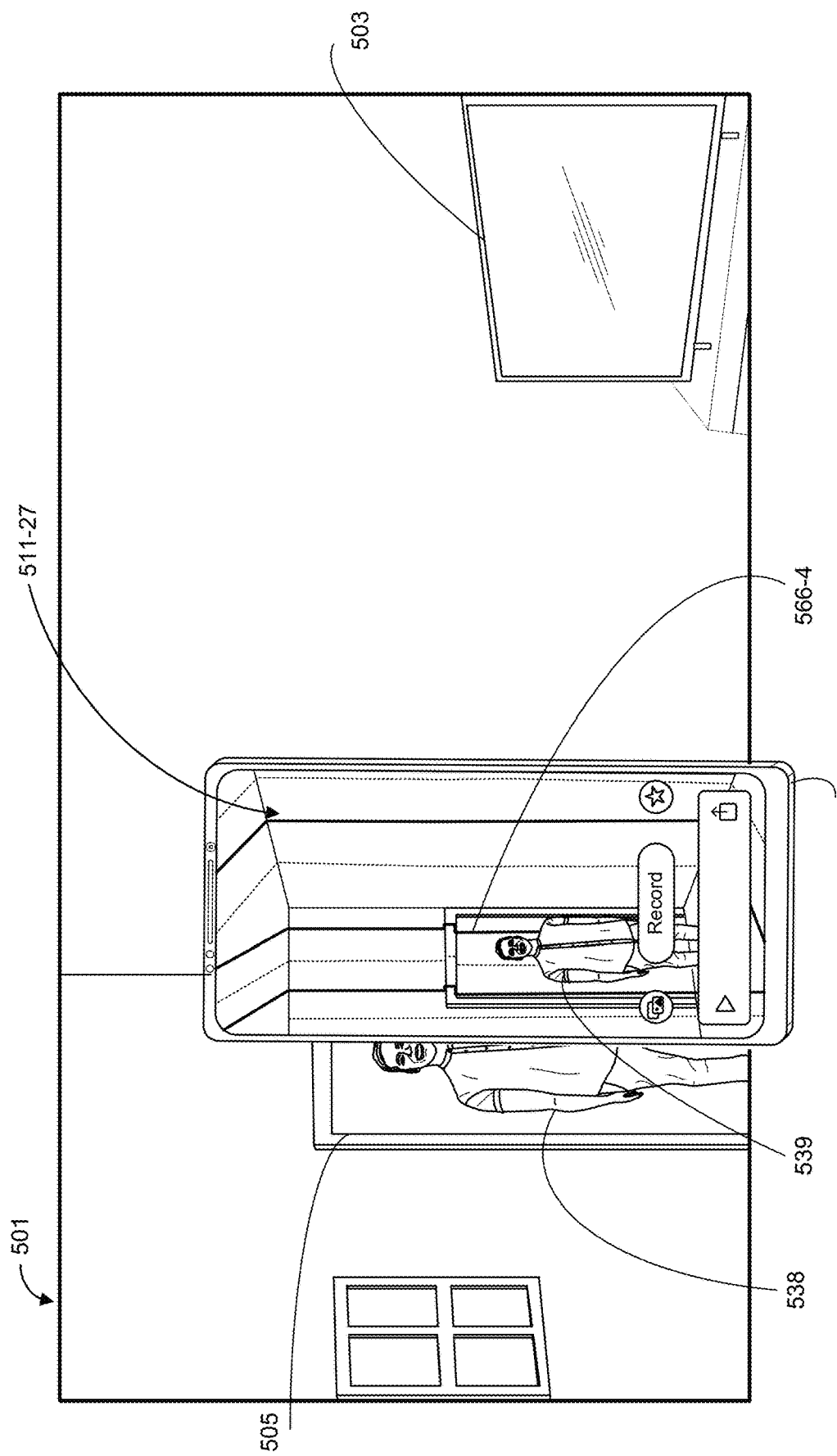
Figure 5A:
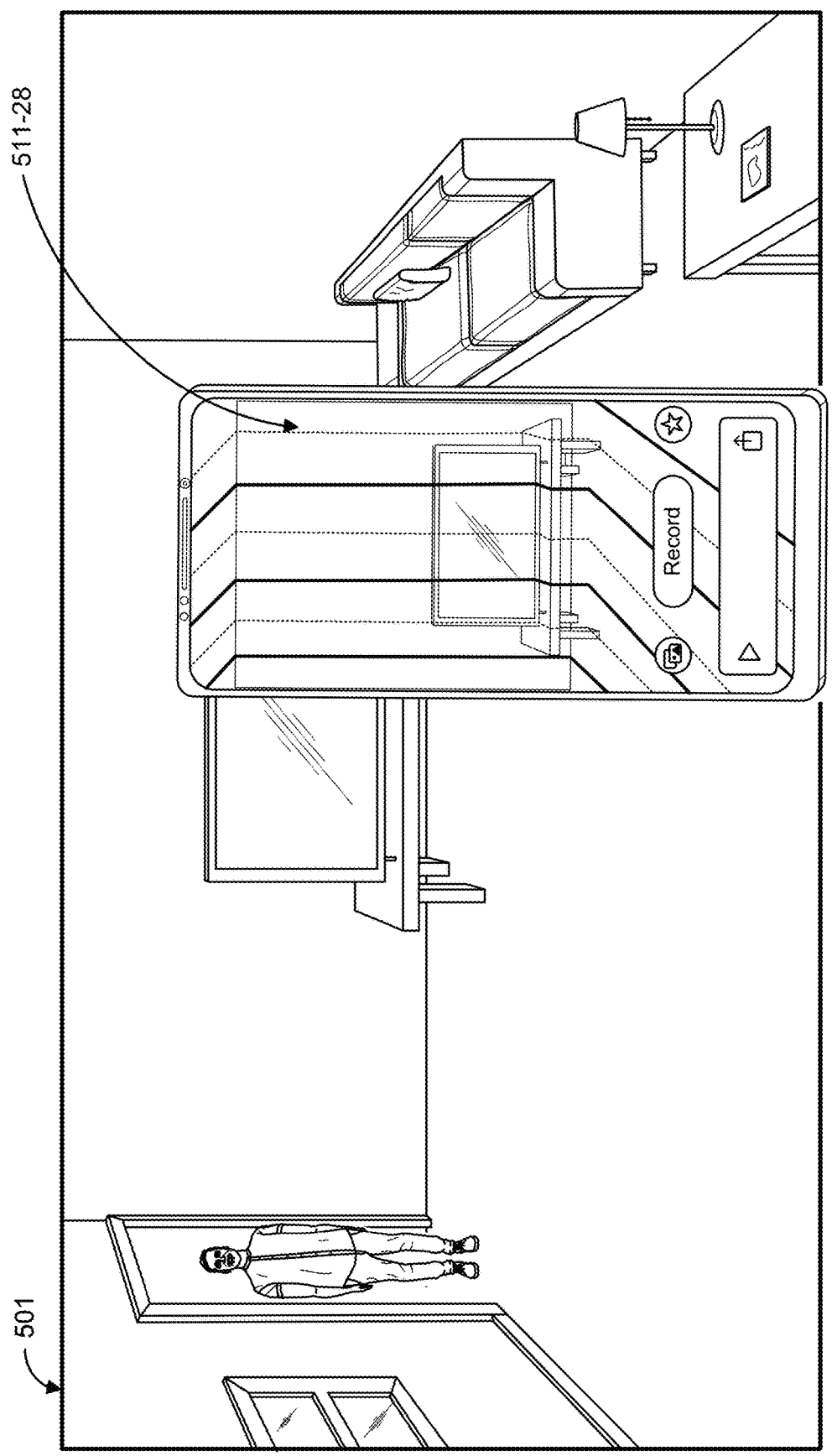
Figure 5A:
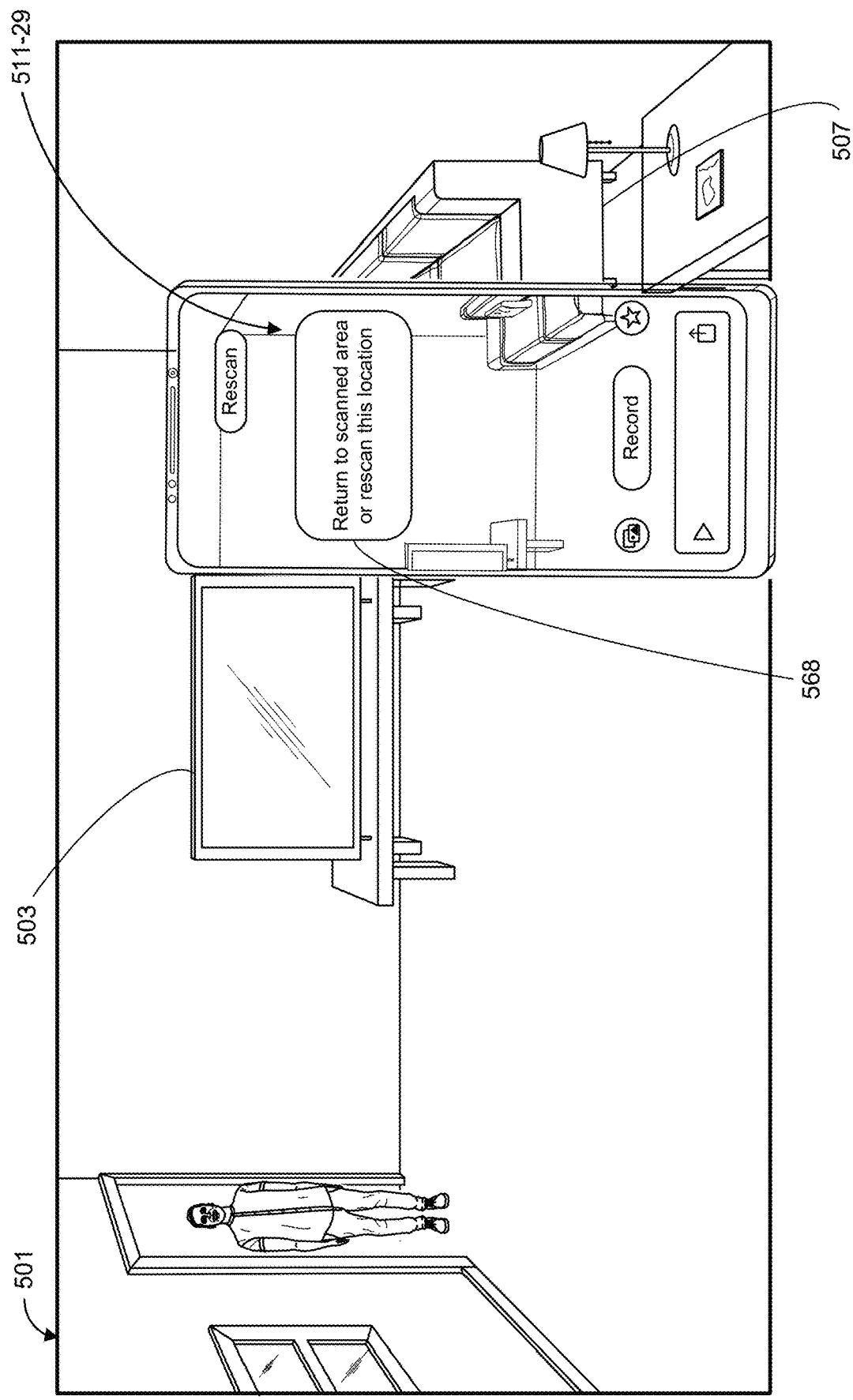
Figure 5A:
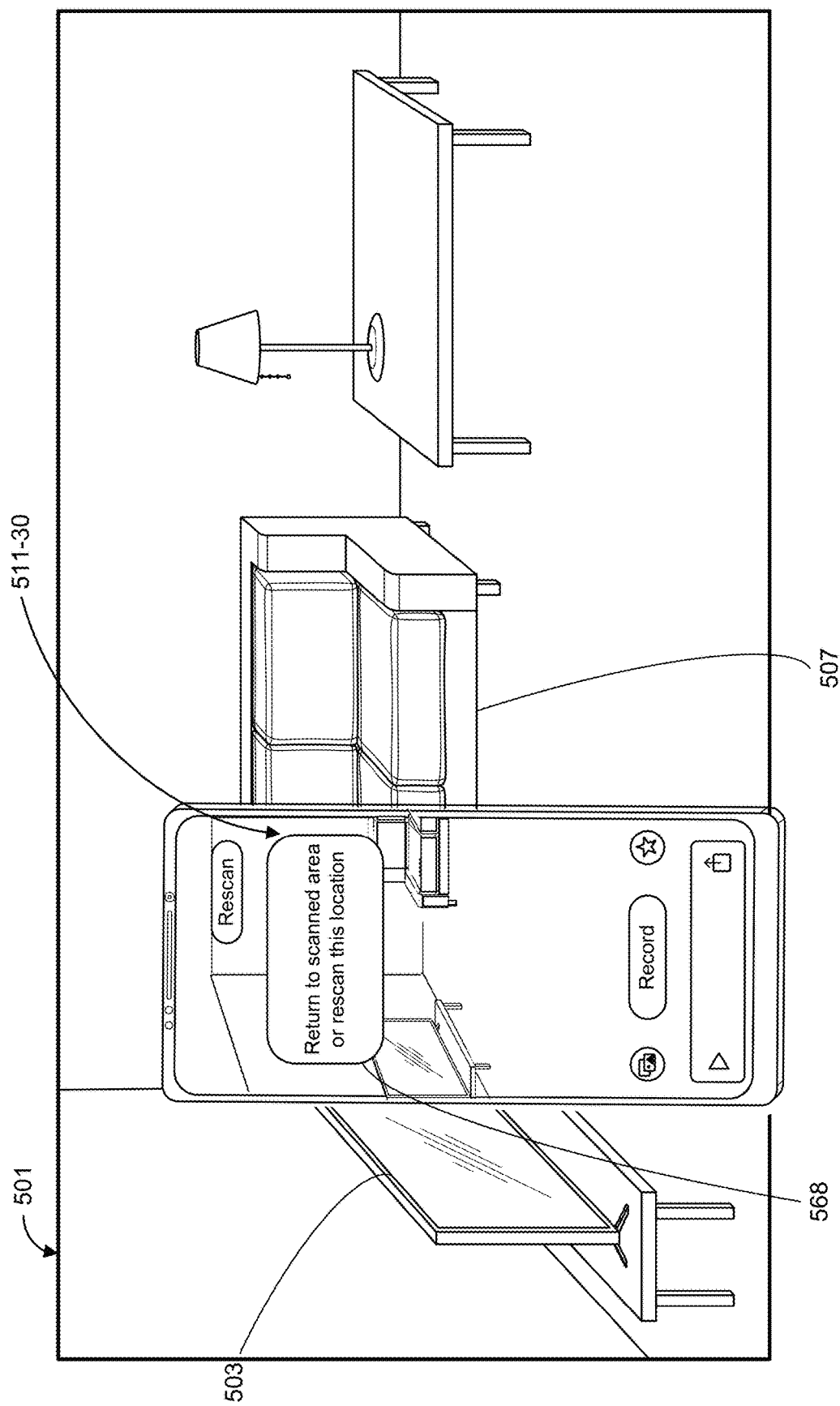
Figure 5A:
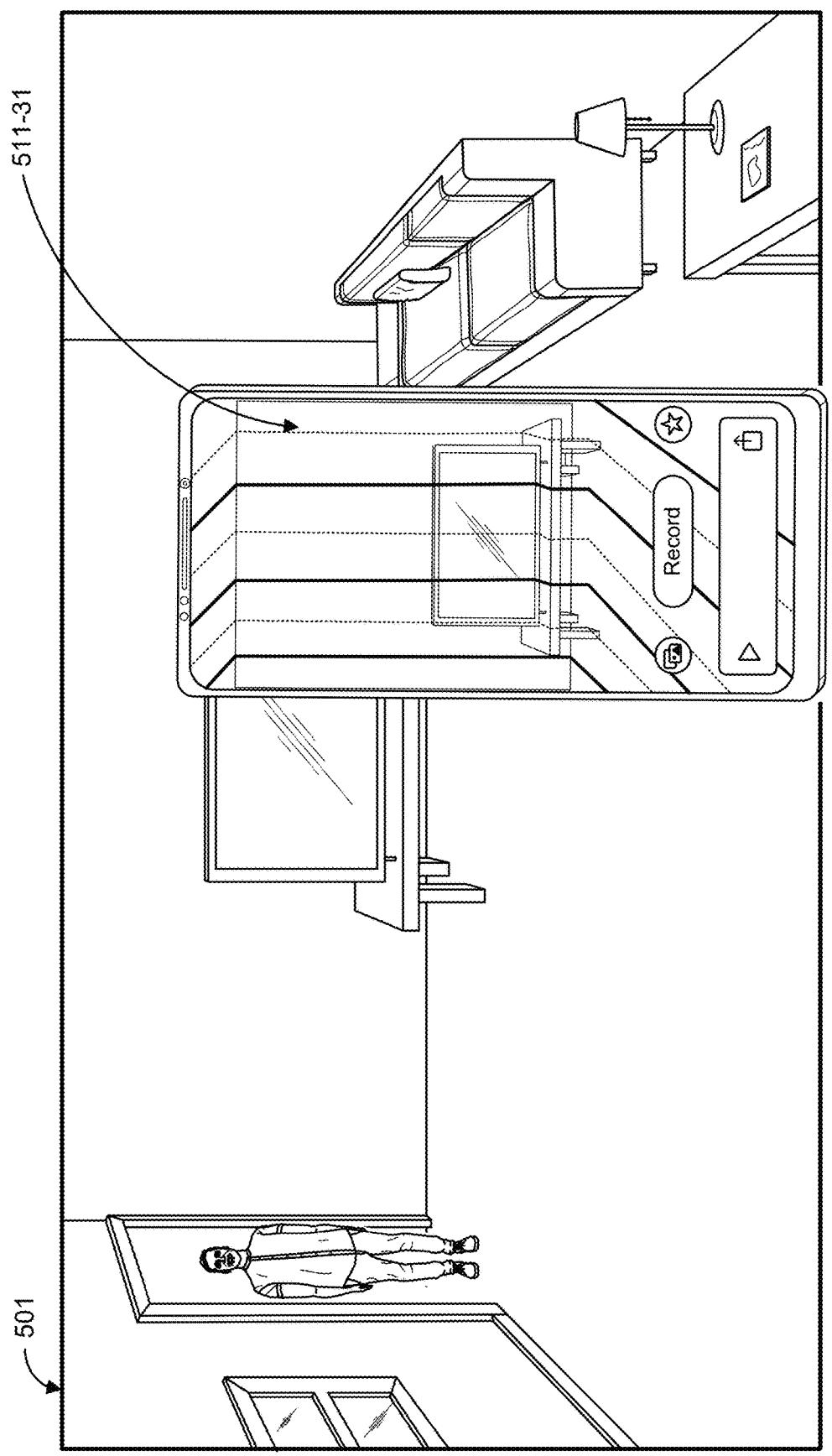
Figure 5A:
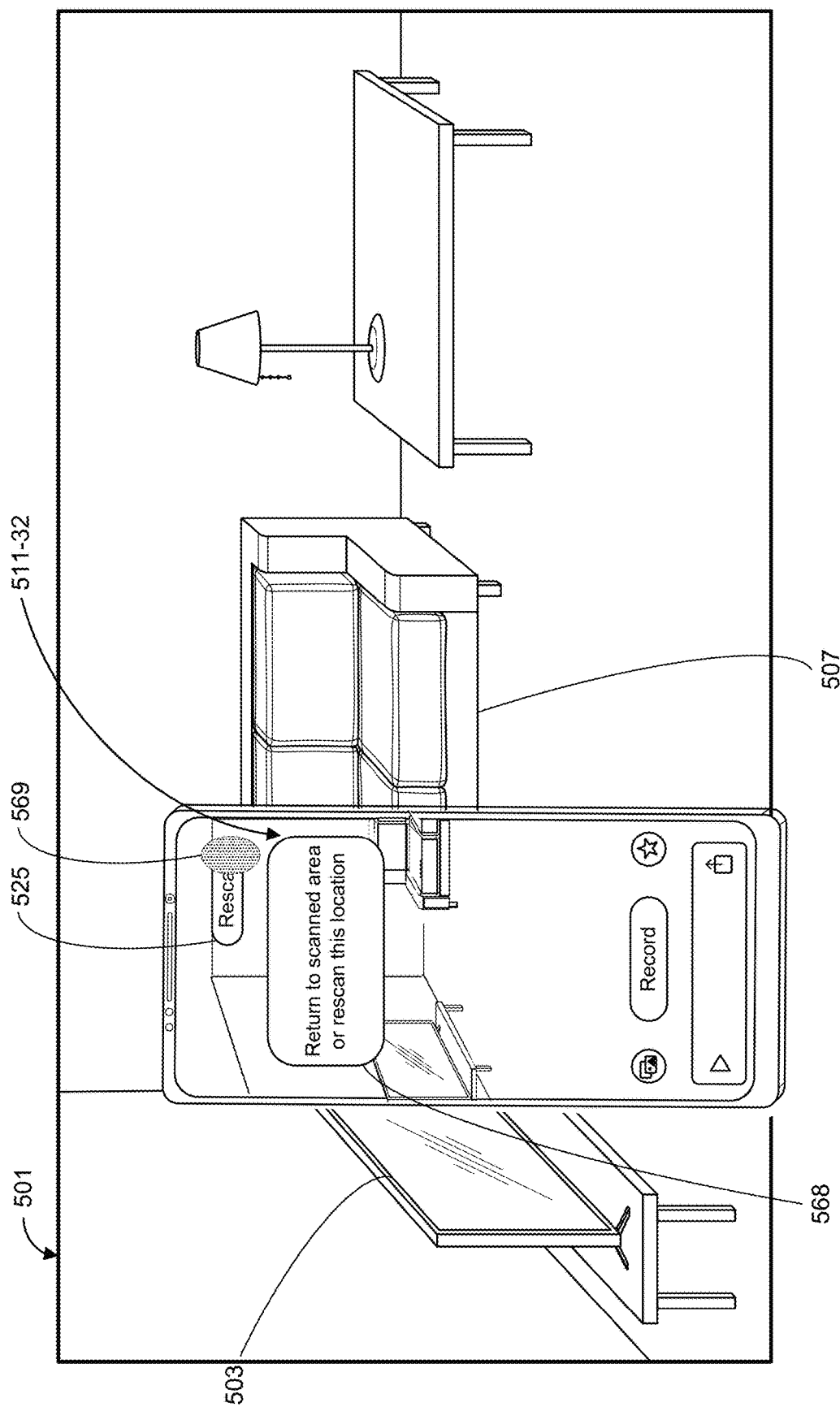
Figure 5A:
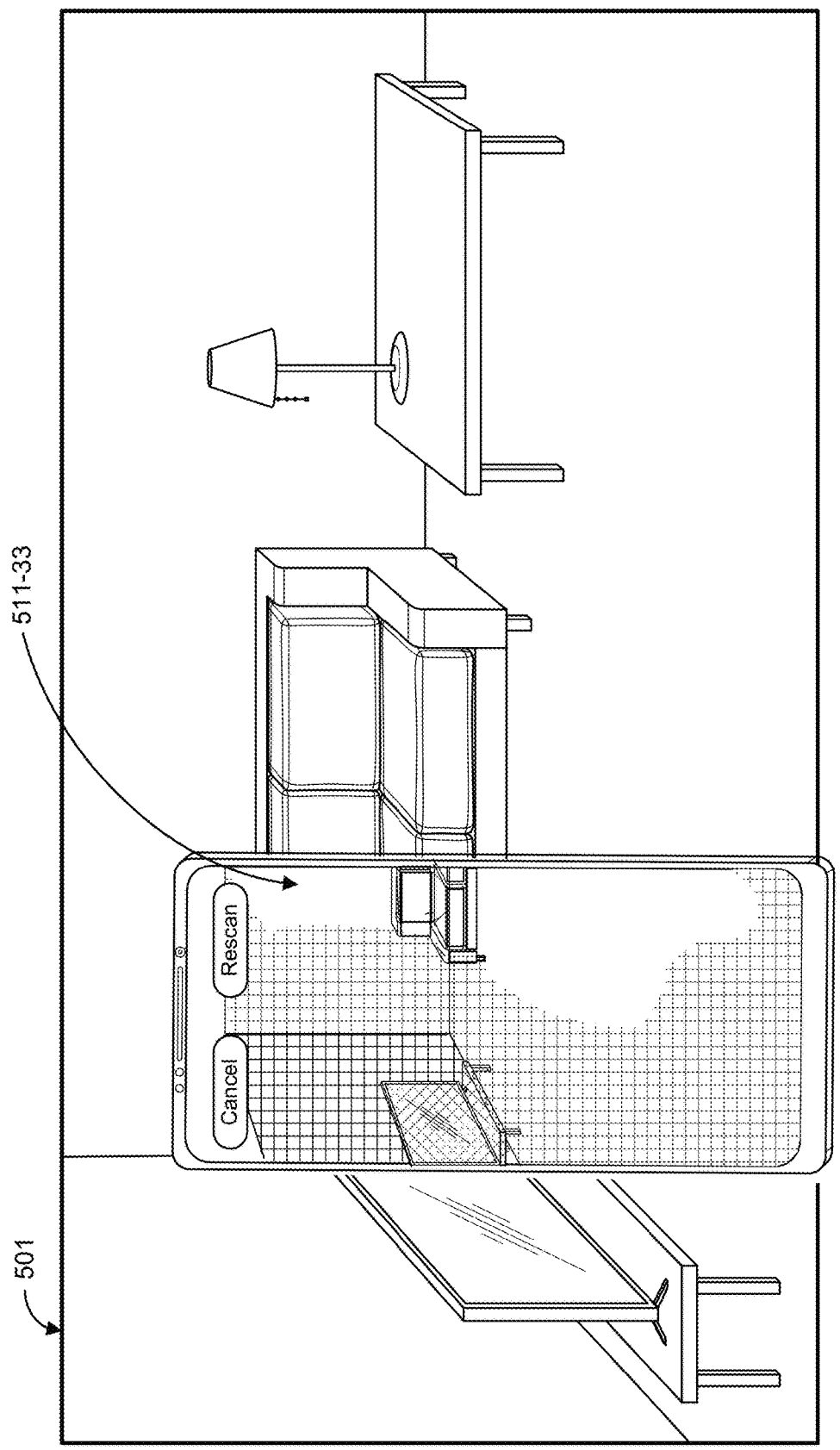
Figure 5A:
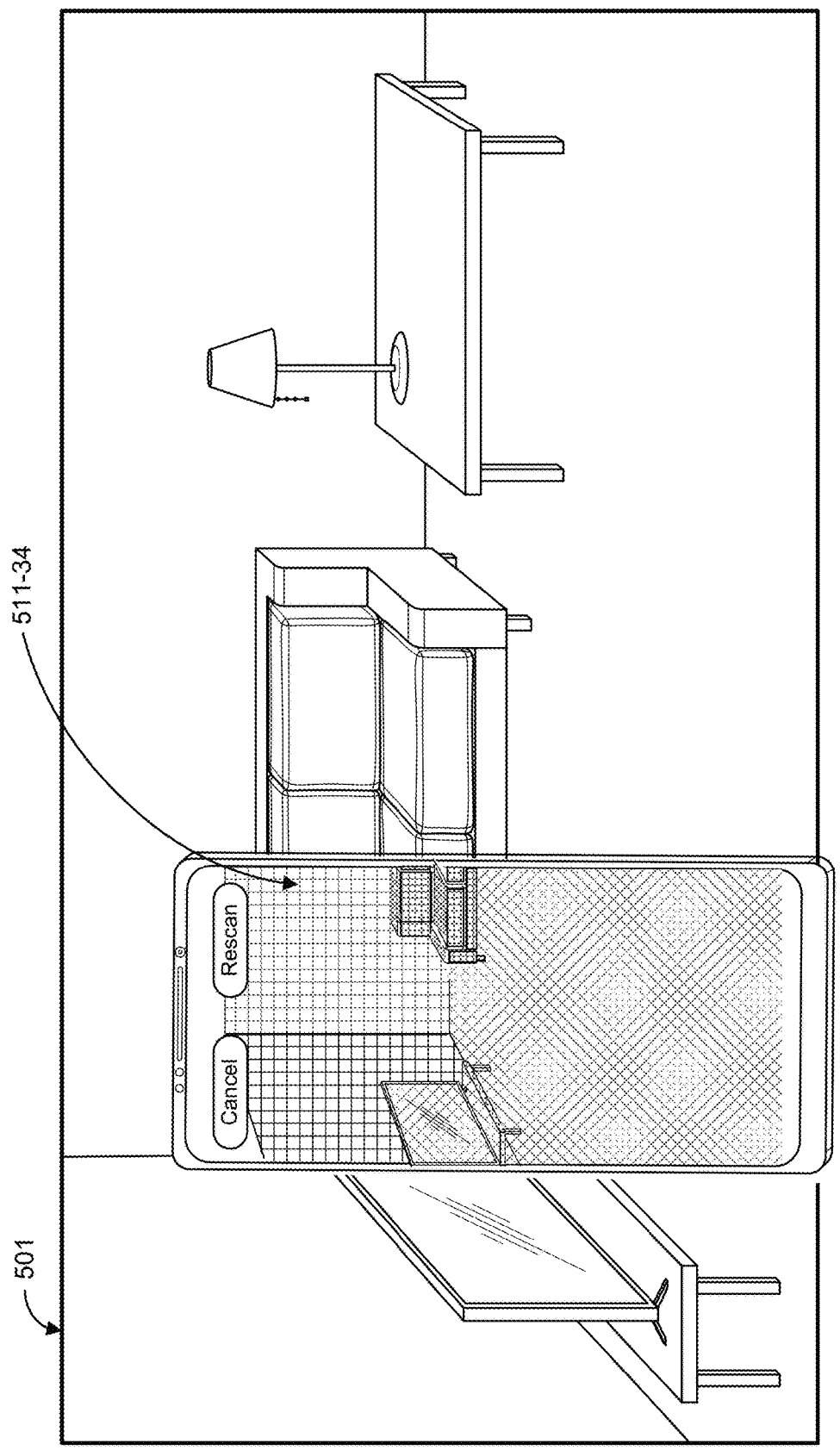
Figure 5A:
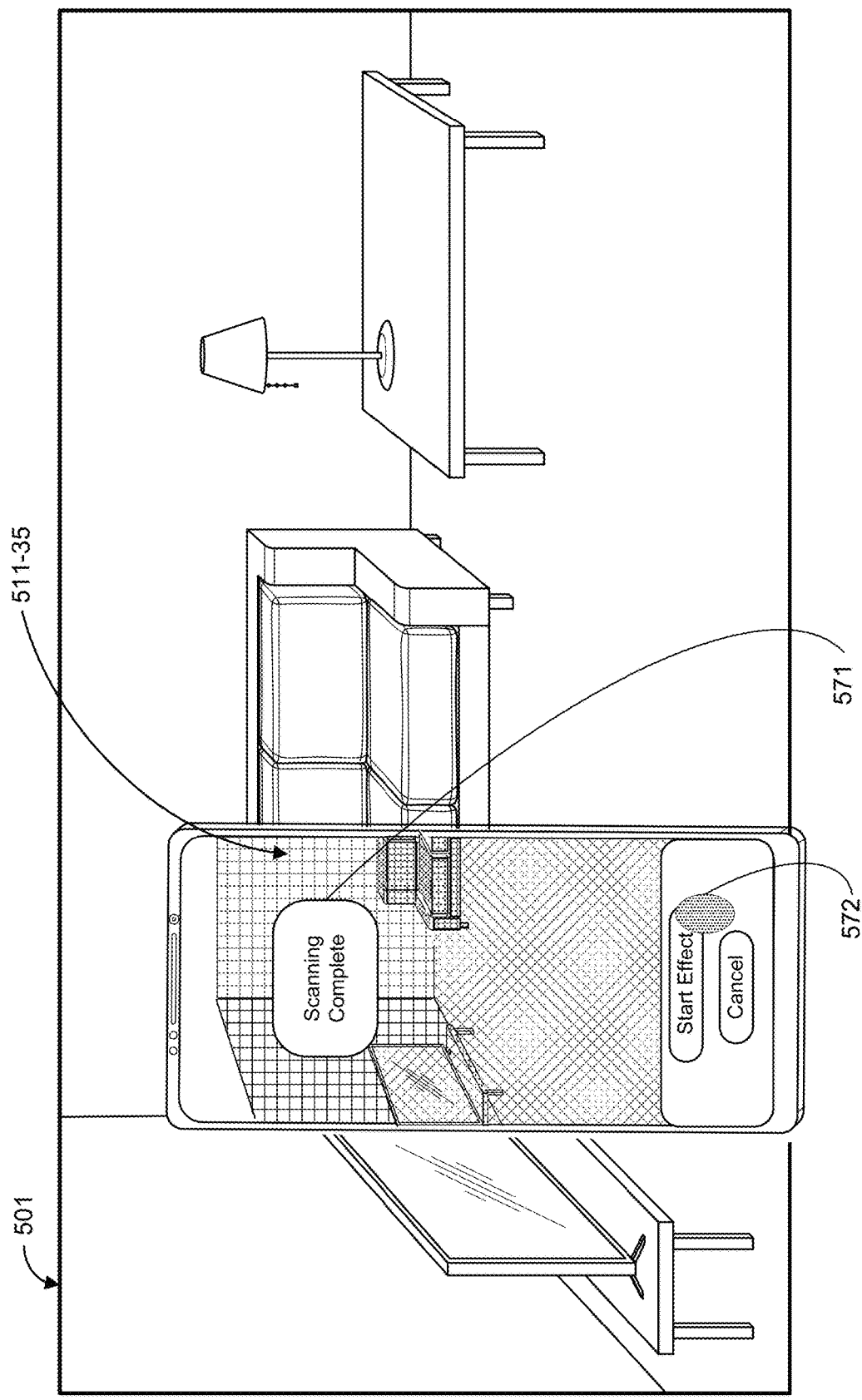
Figure 5A:
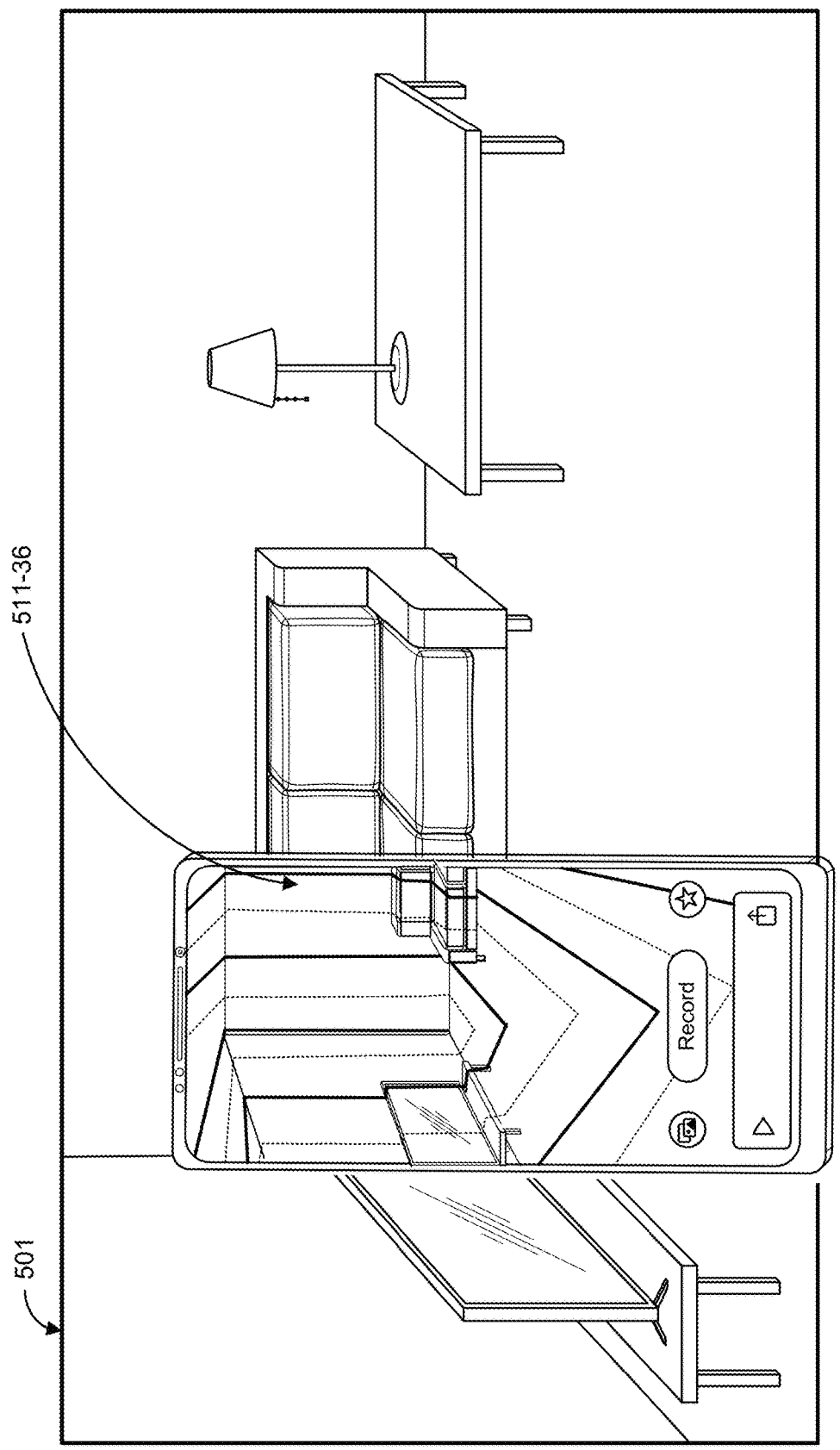
Figure 6A:
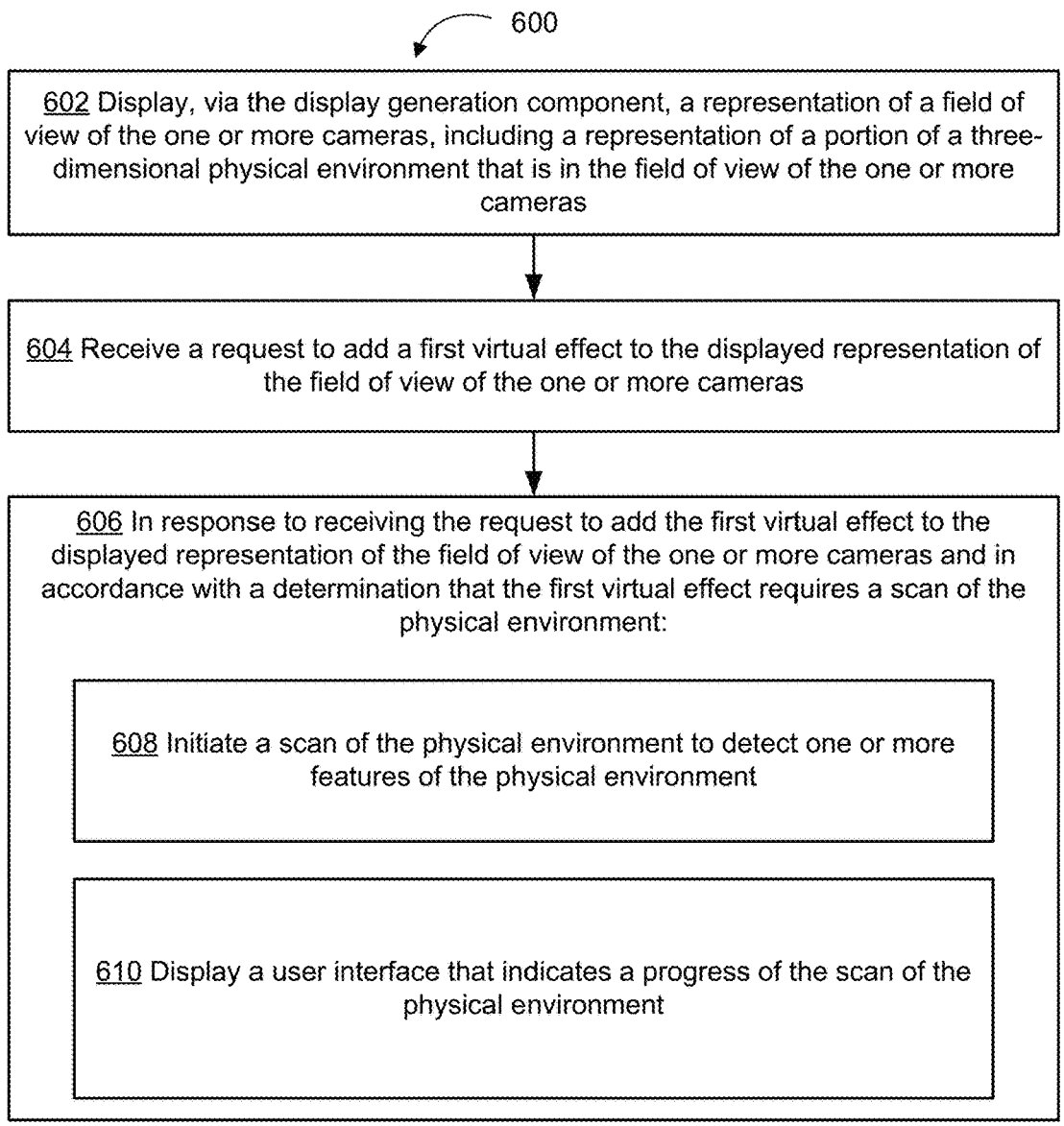

FIG. 5Z illustrates user interface 511-25, which is displayed in response to the user input 565 selecting the prism virtual effect. In some embodiments, prism virtual effect includes a plurality of lines (e.g., in a plurality of colors) that contour around the various surfaces of the physical environment (e.g., as detected by the scan). In some embodiments, as illustrated between FIG. 5Z-FIG. 5AA, the plurality of lines appear to move across the various surfaces (e.g., while device 100 remains stationary). For example, lines 566-1 and 566-2 appear to move to the right from FIG. 5Z to FIG. 5AA, and continue to contour to whatever surfaces the respective line appears over as the line travels across the camera view.

For example, FIG. 5AA illustrates a new line 566-3 appears on the far left while lines 566-1 and 566-2 have shifted to the right. In some embodiments, the lines for the prism virtual effect are spaced apart equally. In some embodiments, the lines for the prism virtual effect include a sequence of colors (e.g., each line is displayed with a different respective color from the neighboring line or lines).

FIG. 5AB illustrates device 100 moving relative to the physical environment such that the television 503 is no longer in the camera view, and doorway 505 is now in the camera view. As shown in FIG. 5J, the doorway 505 was included in the scan of the room. Accordingly, device 100 is able to apply the prism virtual effect over the camera view when the camera view includes the doorway 505 (e.g., which has already been scanned). FIG. 5AB further illustrates that the prism virtual effect is applied to surfaces of the room, but is not applied over the representation of the person 539 (e.g., the prism lines do not appear over the representation of the person 539). For example, line 566-4 appears occluded by (e.g., behind) the representation of the person 539 in the camera view.

FIG. 5AC illustrates the device moving position (e.g., to the right) within the physical environment 501 such that television 503 is once again within the camera view, and the prism virtual effect continues to be applied over the camera view.

FIG. 5AD illustrates that as the user continues to move the device to the right, the camera view begins to include portions of the physical environment that were not included in the scan (e.g., such as a portion of couch 507). Accordingly, the device 100 is unable to apply the virtual effect to the current camera view because the current camera view includes portions of the physical environment that the device has not yet detected, which triggers an error condition. In some embodiments, the error condition of viewing a portion of the physical environment that has not yet been scanned is generated in accordance with a determination that at least a threshold portion of the current camera view of the physical environment has not yet been scanned. For example, FIG. 5AD shows that a scanned portion of the physical environment (e.g., the right side of television 503) is within the field of view of the one or more cameras, but because at least a threshold amount (e.g., 50%, 60%, etc.) of the current camera view has not yet been scanned, the error condition is triggered. In accordance with the error condition being triggered, device 100 displays error message 568 "Return to scanned area or rescan this location."

FIG. 5AE illustrates the device continuing to move to the right, which causes the one or more cameras to detect additional portions of the physical environment that were not included in the scan. Because the error condition is maintained as the user continues moving the device to the right (e.g., the error of trying to apply a virtual effect to an area that has not yet been scanned), the error message 568 continues to be displayed.

FIG. 5AF illustrates the device has moved back to a position in which the camera view includes only a portion of the room that was previously scanned (e.g., the television 503) and thus, device 100 is able to apply the virtual effect to the camera view, and the error message 568 is automatically removed (e.g., in response to the error condition having been resolved).

FIG. 5AG illustrates that if the device is positioned such that the camera view includes a threshold portion of the physical environment 501 that has not yet been scanned, a rescan button 525 is displayed in user interface 511-32 (e.g., instead of, or in addition to, displaying error message 568). In response to a user input 569 selecting the rescan button 525, the device initiates the scanning process for the portion of the physical environment that is currently within the camera view, as illustrated by user interface 511-33 in FIG. 5AH (e.g., and ceases display of the error message 568).

In some embodiments, in response to the user input on the rescan button 525, the device discards the previous scan of the physical environment. In some embodiments, e.g., if predefined criteria are satisfied (e.g., the current camera view overlaps the previously scanned area by at least a threshold amount), the device performs the scan of the current camera view and adds the scan to the stored scan (e.g., the previous scan) of a same room (e.g., to extend the scanned area).

FIG. 5AI illustrates the scanning progress of the current camera view, relative to the scanning progress illustrated in FIG. 5AH, as represented by the mesh overlay applied to surfaces detected during the scan. For example, user interface 511-34 illustrates that the walls, couch, television, and floor have been detected during the scan. In response to determining that the scan is complete (e.g., in accordance with the device not moving relative to the physical environment for a threshold amount of time), device 100 optionally displays user interface 511-35, as shown in FIG. 5AJ.

FIG. 5AJ illustrates a confirmation 571 that the scanning has been completed and, optionally, provides an option to "Start Effect." In response to a user input 572 to start the virtual effect, device 100 applies the virtual effect to the camera view of the portion of the physical environment that has now been scanned, as illustrated in FIG. 5AK.

In some embodiments, upon determining that the scan is complete, device 100 directly displays the virtual effect illustrated in 5AK (e.g., without displaying the user interface in FIG. 5AJ). Accordingly, in some embodiments, the device automatically displays the virtual effect after scanning the physical environment without additional input from the user (e.g., without user input 572).

FIGS. 6A-6D are flow diagrams illustrating method 600 of adding a virtual effect to a representation of a physical environment in accordance with some embodiments. Method 600 is performed at a computer system (e.g., an electronic device, such as portable multifunction device 100 or device 300) that includes (and/or is in communication with) a display generation component, one or more cameras, and one or more input devices, optionally one or more pose sensors, optionally one or more sensors to detect intensities of contacts with the touch-sensitive surface, and optionally one or more tactile output generators. Some operations in method 600 are, optionally, combined and/or the order of some operations is, optionally, changed.

As described herein, method 600 determines when a respective virtual effect, requested by a user, requires a scan of a physical environment before the system is able to apply the virtual effect to a representation of the physical environment, and, in response to the request from the user to apply the respective virtual effect to the representation of the physical environment, intelligently scans physical features of the physical environment, without requiring the user to provide inputs to specify where objects and features are located within the physical environment (e.g., by automatically detecting the features by scanning the physical environment). Performing an operation (e.g., automatically) when a set of conditions has been met without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

The computer system displays (602), via the display generation component, a representation of a field of view of the one or more cameras, including a representation of a portion of a three-dimensional physical environment that is in the field of view of the one or more cameras. For example, FIG. 5B illustrates that a portion of physical environment 501 that is within the field of view of one or more cameras of device 100 is displayed on user interface 511-1.

The computer system receives (604) a request to add a first virtual effect to the displayed representation of the field of view of the one or more cameras. In some embodiments, the request to add the first virtual effect is not a request to scan the physical environment. For example, the computer system automatically determines whether the requested first virtual effect requires a scan of the physical environment (e.g., and/or initiates a scan of the physical environment) without additional user input requesting to scan the physical environment. For example, FIG. 5D illustrates device 100 receiving, via user input 519, a request to add disco virtual effect 520-3.

In response to receiving the request to add the first virtual effect to the displayed representation of the field of view of the one or more cameras and in accordance with a determination that the first virtual effect requires a scan of the physical environment (606), the computer system initiates (608) a scan of the physical environment to detect one or more features of the physical environment and displays (610) a user interface that indicates a progress of the scan of the physical environment. In some embodiments, in response to the request to apply disco virtual effect 520-3 in FIG. 5D, the computer system displays a scanning user interface directly, such as the scanning user interface shown in FIG. 5F (e.g., without displaying the user interface illustrated in FIG. 5E). However, in some embodiments, a user interface, such as the user interface illustrated in FIG. 5E, with an option or affordance for initiating the scan of the physical environment is displayed in response to receiving the request to add the first virtual effect, and the scanning of the physical environment is initiated in response to user selection of the option or affordance for initiating the scan.

In some embodiments, the physical environment is scanned as a user moves the computer system around the physical environment, as illustrated in FIGS. 5F-5I. In some embodiments, a scan of the physical environment is obtained using a LiDAR or other depth sensor. The scan, using the information obtained from the depth sensor during the scan, detects features of the physical environment, including one or more of: surfaces, objects, walls, ceiling, floor, etc. In some embodiments, the computer system identifies (e.g., recognizes) one or more surfaces and/or objects detected by the scan. In some embodiments, the computer system stores the scan of the physical environment (e.g., as a virtual blueprint of the physical environment). In some embodiments, progress of the scan of the physical environment is represented in a displayed user interface as a mesh (e.g., grid) view, as illustrated in FIGS. 5F-5J, such that the user interface is updated as additional portions of the physical environment are scanned (e.g., additional mesh is displayed over to the portions that have been scanned).

In some embodiments, in response to receiving the request to add the first virtual effect to the displayed representation of the field of view of the one or more cameras and in accordance with a determination that the first virtual effect does not require a scan of the physical environment, the computer system displays (612) the first virtual effect. For example, in accordance with the first virtual effect not interacting with one or more surfaces detected in the physical environment, the computer system displays the first virtual effect without initiating the scan of the physical environment. In some embodiments, a particle virtual effect, such as the hearts virtual effect illustrated in FIG. 5X, that includes virtual elements that fill a volume of the portion of the physical environment that is within the field of view of one or more cameras does not require scanning of the physical environment.

Determining when a virtual effect does not require information about features of the physical environment, and automatically displaying the virtual effect without scanning the physical environment to detect features of the physical environment (e.g., since such scanning is not necessary to display the virtual effect), and without requiring input from the user, provides visual feedback to the user indicating that the virtual effect is able to be applied and that the user is not required to initiate a scan of the physical environment. Providing improved visual feedback to the user, and performing an operation (e.g., automatically) when a set of conditions has been met without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, while displaying the first virtual effect in response to receiving the request to add the first virtual effect to the displayed representation of the field of view of the one or more cameras and in accordance with the determination that the first virtual effect does not require a scan of the physical environment (614), the computer system receives a request to add a second virtual effect distinct from the first virtual effect to the displayed representation of the field of view of the one or more cameras. In some embodiments, in response to receiving the request to add the second virtual effect to the displayed representation of the field of view of the one or more cameras and in accordance with a determination that the second virtual effect requires a scan of the physical environment, the computer system initiates a scan of the physical environment to detect one or more features of the physical environment and displays a user interface that indicates a progress of the scan of the physical environment. In some embodiments, the request to add the second virtual effect is not a request to scan the physical environment. In some embodiments, a scan of the physical environment is obtained using a LiDAR or other depth sensor scan that detects features of the physical environment, including one or more of: surfaces, objects, walls, ceiling, floor, etc. In some embodiments, the computer system identifies (e.g., recognizes) one or more surfaces and/or objects detected by the scan. In some embodiments, the computer system stores the scan (e.g., a result produced by the scan) of the physical environment (e.g., as a virtual blueprint of the physical environment). In some embodiments, a displayed representation of the progress of the scan of the physical environment comprises a mesh (e.g., grid) view, as illustrated in FIGS. 5F-5J, such that the user interface is updated as additional portions of the physical environment are scanned (e.g., additional mesh is displayed over to the portions that have been scanned). In some embodiments, in response to receiving the request to add the second virtual effect to the displayed representation of the field of view of the one or more cameras and in accordance with a determination that the second virtual effect does not require a scan of the physical environment, the computer system displays the second virtual effect (e.g., without scanning the physical environment to detect features of the physical environment).

Allowing a user to switch between different virtual effects from the same user interface that displays the currently selected virtual effect, and automatically initiating a scan mode to detect features of the physical environment, if needed to display the virtual effect, without requiring the user to navigate complex menus to change the selected virtual effect or manually initiate a scan when the user wants to change a virtual effect improves the user experience by providing continuous visual feedback such that the user can see which virtual effect has been selected and whether the selected virtual effect is enabled for immediate display (e.g., or whether the scanning mode must be initiated). Providing improved visual feedback to the user, and (e.g., automatically) providing additional control options when a set of conditions has been met without cluttering the user interface with additional displayed controls and without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, after completing the scan of the physical environment (e.g., or at least the portion of the physical environment in the field of view of the one of more cameras, or at least a threshold amount of (a portion of) the physical environment), the computer system displays (616) the first virtual effect over (e.g., in conjunction with) the field of view of the one or more cameras. For example, FIGS. 5J-5K illustrate that after the scanning is complete, a disco virtual effect is (e.g., automatically) displayed on the user interface 511-10. In some embodiments, the computer system determines that the scan of the physical environment is complete in accordance with a determination that the computer system is stationary (e.g. not moving)(e.g., and that the scan of the portion of the physical environment in the field of view of the one of more cameras is complete). For example, scanning of the physical environment continues while a user moves the device around the physical environment.

Displaying a virtual effect that interacts with surfaces and features of the physical environment, as detected from the scan of the environment, provides continuous visual feedback to the user and improves the user experience such that the user can see how the virtual effect interacts with different features of the physical environment in real-time. Providing improved visual feedback to the user without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, after completing at least a predefined portion of the scan of the physical environment, the computer system provides (618) a notification indicating that the first virtual effect is ready to be displayed. For example, FIG. 5J illustrates a notification 533 that the scanning is complete.

Automatically providing a notification to the user to indicate that a portion of the physical environment has been successfully scanned and detected by the device, without requiring additional input from the user, provides prompt visual feedback to the user and improves the user experience. Providing improved visual feedback to the user without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, after completing at least a predefined portion of the scan of the physical environment, the computer system provides (620) a user-selectable user interface element that, when selected, causes the first virtual effect to be displayed. In some embodiments, in response to detecting selection of the user interface element, the computer system displays the first virtual effect. For example, FIG. 5J illustrates a user-selectable option 522 ("Start Effect") to begin displaying the first virtual effect. In response to a user input 521 selecting "Start Effect", the computer system displays the virtual effect, as illustrated in FIG. 5K. In some embodiments, the first virtual effect is displayed over (e.g., concurrently with) the representation of the field of view of the one or more cameras. In some embodiments, computer system further provides a user interface element for recording media that includes the displayed virtual effect (e.g., "Record" button illustrated in FIG. 5K). For example, a video (e.g., sometimes called a clip or video clip) and/or image is captured of the displayed first virtual effect within the portion of the physical environment that is within the field of view of the one or more cameras.

Automatically displaying an indication that a portion of the physical environment has been successfully scanned by the device, and providing a button that the user may select to initiate display of the effect, provides real-time visual feedback to the user and improves the user experience. Providing improved visual feedback to the user without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, while scanning the physical environment, the computer system displays (622) a progress indicator that indicates one or more features of the physical environment that have been detected. In some embodiments, the one or more features comprise one or more surfaces of the space (e.g., walls, floor, ceiling, table tops, etc.). For example, FIGS. 5F-5I illustrate a mesh overlay (e.g., progress indicator) over the surfaces and/or objects within the physical environment that have been detected during the scan (e.g., the mesh overlap or other progress indicator is displayed over only those surfaces and/or objects within the physical environment that have been detected during the scan).

Automatically updating a visual indicator that shows progress of the scan provides continual visual feedback to the user so that the user is aware of the progress of the scan for a portion of the physical environment that is within the field of view of the one or more cameras, even when the user has moved the device relative to the physical environment. Providing improved visual feedback to the user enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently In some embodiments, the computer system displays (624) an option for discarding the scan of the physical environment. For example, FIG. 5J illustrates a "Cancel" button that is displayed after scanning is complete (e.g., to discard the completed scan). In some embodiments, the option for discarding (e.g., cancelling) the scan of the physical environment is displayed while scanning. In some embodiments, the option for discarding the scan is an option that cancels the current scan and/or an option that cancels the current scan and restarts the scanning process. For example, FIG. 5I illustrates an option to "Cancel" the scan and to "Rescan." In some embodiments, the option for discarding the scan is displayed while the first visual effect is displayed (e.g., as illustrated by "Rescan" button 535 in FIG. 5K), and selection of the option for discarding the scan causes the computer system to return to the user interface (e.g., as shown in FIG. 5F) that indicates a progress of the scan. For example, the "Rescan" option allows the user to scan a different portion (e.g., area) of the physical environment and/or to view which part of the area has been scanned based on which features are displayed with a "mesh" effect.

Automatically providing the user with an option to scan a different portion of the physical environment or to re-do the scan of the physical environment starting at a current location, while maintaining display of the portion of the physical environment that has already been scanned, without requiring the user to navigate complex menus to rescan the physical environment, improves the user experience by providing visual feedback and controls. Providing improved visual feedback to the user, and (e.g., automatically) providing additional control options when a set of conditions has been met without cluttering the user interface with additional displayed controls and without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently In some embodiments, the computer system displays (626) one or more visual prompts indicating an error condition. In some embodiments, in accordance with a determination that a first error condition is met, the computer system displays a first visual prompt that the first error condition is met. In accordance with a determination that a second error condition is met, the computer system displays a second visual prompt that is different from the first visual prompt. For example, FIGS. 5G and 5H illustrate respective error conditions: moving too quickly (FIG. 5G) and not having enough light (FIG. 5H). In some embodiments, the visual prompt indicating an error condition is displayed while scanning the physical environment (as illustrated in FIGS. 5G and 5H). In some embodiments, the error condition comprises an error caused by a lack of light (e.g., and the visual prompt includes a textual notification that more light is needed to scan). In some embodiments, the visual prompt indicating an error condition is displayed while trying to display the first virtual effect (e.g., after the scanning). In some embodiments, the error condition comprises an error caused by moving the computer system out of the scanned area (e.g., the virtual effect cannot be applied to the current area because the current area has not yet been scanned). For example, FIG. 5AD illustrates an error condition that occurs after a portion of the physical environment has been scanned (e.g., and the computer system is attempting to apply the prism virtual effect to a different area). In some embodiments, the visual prompt includes a user-selectable option to initiate a scan of the current physical environment. For example, rescan button 525 is displayed in FIG. 5AG that, when selected, causes the computer system to initiate scanning of the portion of the physical environment that has not yet been scanned. In some embodiments, in accordance with the computer system moving to an area that has not been scanned, the visual prompt is displayed while the computer system automatically initiates scanning of the current environment (e.g., automatically without additional user input). In some embodiments, the computer system ceases display of the one or more visual prompts in accordance with a determination that the error condition has been remedied. For example, as illustrated in FIGS. 5AE-5AF, when the user has returned to an already-scanned area (e.g., such as the area with the television, shown in FIG. 5AF), the visual prompt indicating the error that the user is out of the area that has been scanned is no longer displayed. In some embodiments, when the error condition is based on an amount of light, in accordance with a determination that more light is detected, the visual prompt indicating a lack of light is no longer displayed (e.g., the computer system ceases to display the visual prompt).

Automatically detecting error conditions that, when present, prevent scanning of the physical environment or prevent a virtual effect from being displayed, and displaying an indication to the user on how to correct the respective error condition, without requiring input from the user, provides visual feedback to the user and improves the user experience. Providing improved visual feedback to the user without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently In some embodiments, while scanning the physical environment, the computer system displays (628) a progress indicator that indicates two or more features of the physical environment that have been detected. In some embodiments, the two or more features includes object(s) (e.g., stationary objects) and/or surface(s) detected in the physical environment. For example, as illustrated in FIG. 5F, the progress indicator (e.g., mesh overlay) is displayed over multiple features of the physical environment, including the television, the table, a portion of the wall, a portion of the ceiling, and a portion of the floor.

Automatically updating a visual indicator that shows progress of the scan provides continual visual feedback to the user so that the user is aware of the progress of the scan for a portion of the physical environment that is within the field of view of the one or more cameras, even when the user has moved the device relative to the physical environment. Providing improved visual feedback to the user enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently In some embodiments, the computer system displays (630) the first virtual effect over the representation of the field of view of the one or more cameras. In some embodiments, while displaying the first virtual effect over the field of view of the one or more cameras, the computer system provides a user interface element for switching to a third virtual effect distinct from the first virtual effect. For example, the computer system provides one or more user-interface elements that allow a user to switch to one or more different virtual effects. For example, AR Spaces portion 518 is displayed in FIG. 5N to allow a user to switch from the currently displayed virtual effect (e.g., disco virtual effect) to another virtual effect (e.g., comet virtual effect, as illustrated in FIG. 5O). In some embodiments, the user-interface elements are displayed while displaying the first virtual effect over the representation of the field of view of the one or more cameras. In some embodiments, the user interface element for switching to the third virtual effect is within a separate user interface (e.g., that is displayed without displaying the first virtual effect over the field of view of the one or more cameras). For example, expanded AR portion 566 illustrated in FIG. 5Y is displayed as overlapping at least a portion of the representation of the field of view of the one or more cameras. However, in some embodiments, the computer system forgoes displaying the first virtual effect (e.g., the hearts virtual effect illustrated in FIG. 5Y) while the separate user interface is displayed.

Providing a user with options to switch to another virtual effect while continuing to display the currently selected virtual effect provides additional control options without needing to navigate through complex menu hierarchies. Providing improved visual feedback to the user, and (e.g., automatically) providing additional control options when a set of conditions has been met without cluttering the user interface with additional displayed controls and without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the computer system receives (632) a user input selecting the user interface element for switching to the third virtual effect distinct from the first virtual effect. In some embodiments, in response to the user input selecting the user interface element for switching to the third virtual effect, the computer system displays the third virtual effect without initiating a scan. For example, FIG. 5N illustrates a user input 541 selecting a comet virtual effect (e.g., while maintaining display of the disco virtual effect), and updates the display to display the selected comet virtual effect in FIG. 5O (e.g., without initiating a scan). In some embodiments, the third virtual effect requires a scanned environment (e.g., the comet virtual effect requires a scanned environment in order to apply a gradient (e.g., shading) to the one or more surfaces detected as walls), and the computer system uses the scan that was taken before applying the first virtual effect, instead of imitating a process to rescan the same portion of the physical environment. For example, because the computer system is in a same position in FIG. 5N and FIG. 5O, the computer system does not need to obtain another scan in order to display the third virtual effect. In some embodiments, the third virtual effect does not require a scan and is displayed without scanning the environment (e.g., because the third virtual effect is applied regardless of whether the device has obtained a scan for a current portion of the physical environment that is within the field of view of the one or more cameras).

Providing a user with options to switch to another virtual effect while continuing to display the currently selected virtual effect, and automatically displaying the selected virtual effect based on a previous scan without requiring another scan of the physical environment, provides additional control options without needing to navigate through complex menu hierarchies. Providing improved visual feedback to the user, and (e.g., automatically) providing additional control options when a set of conditions has been met without cluttering the user interface with additional displayed controls and without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the computer system displays (634) a user interface that includes one or more representations of one or more selectable virtual effects to be added to (e.g., applied to or overlaid with) the displayed representation of the field of view of the one or more cameras and a selectable representation of the scanned physical environment. For example, FIG. 5Y illustrates expanded AR Spaces portion 564, which includes a plurality of representations of virtual effects that the user can request to be displayed. In some embodiments, expanded AR Spaces portion 564 includes an option to return to the scanning view (e.g., representation 566). For example, the scanning view comprises a representation of the scanned physical environment that includes a mesh (e.g., grid) that is superimposed over the scanned portion of the physical environment. For example, as the user scans the physical environment, the mesh (e.g., grid) is displayed over respective features to indicate the respective features that have been scanned, as described with reference to FIGS. 5F-5I. In some embodiments, user selection of a respective representation of the displayed one or more representations, cause the computer system to initiate display of the selected virtual effect and/or display the selected representation of the scanned physical environment. For example, in response to the user input 565 selecting the prism virtual effect in FIG. 5Y, the computer system displays the prism virtual effect as shown in FIG. 5Z.

Providing a user with options to switch to another virtual effect while continuing to display the currently selected virtual effect provides additional control options without needing to navigate through complex menu hierarchies. Providing improved visual feedback to the user, and (e.g., automatically) providing additional control options when a set of conditions has been met without cluttering the user interface with additional displayed controls and without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, while scanning the physical environment, the computer system detects (636) one or more surfaces within the physical environment, and when the first virtual effect is displayed, the first virtual effect changes an appearance of at least one of the one or more surfaces. For example, the first virtual effect moves across one or more surfaces, as illustrated by prism virtual effect shown in FIGS. 5Z-5AA (e.g., the lines move to the right to appear as moving across the one or more surfaces). In some embodiments, the first virtual effect adds color and/or light to one or more of the detected surfaces (e.g., the dance floor virtual effect illustrated in FIG. 5W, the light beams illustrated in disco virtual effect shown in FIG. 5L). In some embodiments, the first virtual effect changes an appearance of a first type of surface (e.g., horizontal surfaces, such as the floor, table top, etc.) without changing the appearance of a second type of surface (e.g., vertical surfaces, such as walls). In some embodiments, the computer system identifies the one or more surfaces (e.g., ceiling, wall(s), floor, etc.) and applies different virtual effects based on the identified surfaces (e.g., a first virtual effect is applied to the ceiling (e.g., a virtual disco ball is mounted to the ceiling) and a second virtual effect is applied to the wall(s) (e.g., animated lights are displayed on the walls to indicate the light from the disco ball, as illustrated in FIGS. 5L-5N)).

Automatically detecting surfaces of the physical environment during the scanning process allows the device to virtually map features of the physical environment such that the device is enabled to automatically continually update the appearance of a virtual effect based on the features of the physical environment that are currently in the field of view of the one or more cameras. Providing improved visual feedback to the user without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the first virtual effect adds (638) one or more virtual objects to the display of the representation of the field of view of the one or more cameras (e.g., the one or more virtual objects are added at (e.g., predefined) positions relative to (e.g., detected, or automatically detected) surfaces or other physical objects in the field of view of the one or more cameras). For example, as illustrated in FIG. 5L, a virtual disco ball is added to the representation of the field of view of the one or more cameras. In some embodiments, a plurality of virtual objects (e.g., a plurality of virtual hearts shown in FIG. 5X) are added to the display of the representation of the field of view of the one or more cameras.

Displaying virtual objects at positions relative to surfaces or other physical objects in the field of view of the one or more cameras provides the user with continual visual feedback of how a position of the virtual object changes its position (or remains at a fixed position) relative to the representation of the physical environment, even as the device moves relative to a current representation of a field of view of the one or more cameras. Providing improved visual feedback to the user, without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, while scanning the physical environment, the computer system detects (640) one or more surfaces within the physical environment, and when the first virtual effect is displayed, the first virtual effect adds one or more virtual objects that are only displayed within an area corresponding to one or more surfaces detected during the scan. In some embodiments, a respective virtual effect is implemented by displaying virtual objects on certain types of surfaces. For example, as described with reference to FIG. 5R, virtual piles of confetti 549 are displayed on one or more horizontal surfaces (e.g., the table top and floor), without displaying the virtual piles on vertical surfaces (e.g., walls). In some embodiments, the one or more virtual objects are bound (e.g., confined) based on the detected surfaces. For example, the virtual pile of confetti does not extend past the horizontal surface (e.g., table top) to avoid the appearance of the virtual pile of confetti floating in the space.

Changing the appearance of the virtual effect to take into account the different surfaces that were detected while scanning the physical environment provides visual feedback to the user indicating which surfaces and features were detected. Providing improved visual feedback to the user without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, while scanning the physical environment, the computer system detects (642) one or more surfaces within the physical environment, and the first virtual effect comprises displaying one or more virtual objects interacting with one or more of the detected surfaces. For example, as illustrated in FIGS. 5U-5V, the confetti virtual effect includes a plurality of virtual confetti pieces that fall (e.g., from a detected ceiling down to a detected floor) and appears to land on detected horizontal surfaces (e.g., as piles of confetti). In some embodiments, different light effects are applied to indicate a shine on one or more surfaces (e.g., simulated light is applied to walls in the disco virtual effect). In some embodiments, the virtual effect has simulated physical interactions with one or more surfaces (e.g., the prism virtual effect shown in FIG. 5Z includes lines that contour around the one or more surfaces).

Automatically detecting surfaces of the physical environment during the scanning process allows the device to map (e.g., generate a map of) features of the physical environment such that the device is enabled to automatically and continually update the appearance of a virtual effect based on the features of the physical environment that are currently in the field of view of the one or more cameras, even as the device moves relative to the physical environment. Providing improved visual feedback to the user without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the computer system captures (644) a media item (e.g., an image and/or video) that includes the first virtual effect displayed in conjunction with the representation of the field of view of the one or more cameras. For example, a video or image is captured (e.g., recorded and durably stored) that shows the virtual effect dynamically interacting with one or more surfaces and/or features (e.g., including a human subject) that are within the field of view of the one or more cameras, as described with reference to FIGS. 5R-5T.

Providing the user with an option to take a video or image, while continuing to display the representation of the field of view of the one or more cameras with the virtual effect applied, provides the user with continuous visual feedback so that the user knows what the captured video or image will include. In addition, displaying a button that causes the device to record the video or image on the same user interface that displays the virtual effect, allows the user to immediately capture media without navigating through complex menu hierarchies. Providing improved visual feedback to the user without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, while displaying the first virtual effect, the computer system receives (646) an input for moving the computer system within the physical environment. In some embodiments, in response to receiving the input for moving the computer system, the computer system updates the displayed representation of the field of view of the one or more cameras to include an updated representation of a current portion of a three-dimensional physical environment that is in the (updated) field of view of the one or more cameras, and in accordance with a determination that the current portion of the three-dimensional physical environment that is in the updated field of view of the one or more cameras has not been scanned, and in accordance with a determination that the first virtual effect requires a scan of the physical environment: the computer system (e.g., automatically) initiates a scan of the current portion of the physical environment to detect one or more features of the current portion of the physical environment and displays a user interface that indicates a progress of the scan of the physical environment. In some embodiments, as the computer system moves within the physical environment, the first virtual effect (that requires a scan of the physical environment) is unable to be displayed in accordance with the field of view of the one or more cameras including portions of the physical environment that have not yet been scanned. In some embodiments, the computer system automatically determines that the portion of the physical environment in the current (e.g., updated) field of view of the one or more cameras has not yet been scanned, and initiates a process for scanning the portion of the physical environment that is in the current field of view of the one or more cameras before applying the first virtual effect to the current field of view of the one or more cameras. For example, as described with reference to FIGS. 5AD-5AK, the prism virtual effect is only applied to the portion of the physical environment that includes the couch after scanning the additional portion of the representation of the physical environment (e.g., the prism virtual effect cannot be applied to an area of the representation of the physical environment that has not yet been scanned).

As movement of the one or more cameras brings additional portions of the physical environment into the field of the one or more cameras, automatically detecting when a current portion of the physical environment has not yet been scanned by the device, and automatically initiating a scanning process in order to detect features of the current portion of the physical environment, without requiring additional input from the user, provides visual feedback to the user and improves the user experience. Providing improved visual feedback to the user without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

It should be understood that the particular order in which the operations in FIGS. 6A-6D have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 700) are also applicable in an analogous manner to method 600 described above with respect to FIGS. 6A-6D. For example, the virtual effects described above with reference to method 600 optionally have one or more of the characteristics of the virtual effects described herein with reference to other methods described herein (e.g., method 700). For brevity, these details are not repeated here.

FIGS. 7A-7B are flow diagrams illustrating method 700 of adding a virtual effect to a representation of a physical environment that includes a human subject in accordance with some embodiments. Method 700 is performed at a computer system (e.g., portable multifunction device 100 or device 300) that includes (and/or is in communication with) a display generation component, one or more cameras, and one or more input devices, optionally one or more pose sensors, optionally one or more sensors to detect intensities of contacts with the touch-sensitive surface, and optionally one or more tactile output generators. Some operations in method 700 are, optionally, combined and/or the order of some operations is, optionally, changed.

As described herein, method 700 determines when a person is detected within a physical environment that is within a field of view of one or more cameras, and, in response to a request to apply a virtual effect to a representation of the physical environment, intelligently displays the virtual effect within the representation of the physical environment based on features of detected objects within the physical environment and based on a position of the person (e.g., by automatically detecting the position of the person within the physical environment). Performing an operation (e.g., automatically) when a set of conditions has been met without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

The computer system displays (702), via the display generation component, a representation of a field of view of the one or more cameras, including a representation of a portion of a three-dimensional physical environment that is in the field of view of the one or more cameras.

The computer system receives (704) a request to add a virtual effect.

In response to receiving the request to add the virtual effect, the computer system adds (706) the virtual effect (e.g., a virtual animation) to the displayed representation of the field of view of the one or more cameras, including: in accordance with a determination that a human subject is at a first position within the field of view of the one or more cameras, the computer system displays (708) the virtual effect in a first manner, wherein displaying the virtual effect in the first manner includes displaying one or more virtual elements that have an appearance determined based on location and/or shape of one or more detected surfaces in the three-dimensional physical environment that are separate from the human subject and the first position of the human subject in the physical space.

Adding the virtual effect to the displayed representation of the field of view of the one or more cameras further includes, in accordance with a determination that the human subject is at a second position within the field of view of the one or more cameras, the computer system displays (710) the virtual effect in a second manner distinct from the first manner, wherein displaying the virtual effect in the second manner includes displaying one or more virtual elements that have an appearance determined based on the location and/or shape of one or more detected surfaces in the three-dimensional physical environment that are separate from the human subject and the second position of the human subject in the physical space.

In some embodiments, the virtual effect is added in response to a user input selecting the virtual effect (e.g., as described with reference to FIG. 5D). In some embodiments, before adding the virtual effect, the computer system scans at least a portion of the physical environment (e.g., as described with reference to FIG. 5F-5J), and the virtual effect is displayed in accordance with the scan. In some embodiments, the virtual effect is updated based at least in part on the respective position of the human subject and the surfaces detected by, or during, the scan. For example, the virtual effect includes one or more objects that are displayed around (e.g., surrounding) the human subject (e.g., as described with reference to FIG. 5L, the virtual light beams and the gradient effects are not displayed over the representation of the person 539). In some embodiments, the virtual effect includes one or more objects that are displayed at a predefined distance from the respective position of the human subject (e.g., a virtual object that follows the movement of the human subject and that always appears to be a predefined distance behind the human subject). For example, as illustrated in FIGS. 5P-5Q, a virtual comet appears is displayed as following movements of the representation of the person 539.

In some embodiments, the one or more virtual elements are displayed (712) at a predetermined location relative to the respective position of the human subject. In some embodiments, the one or more virtual elements comprise one or more animated objects, such as a virtual disco ball (e.g., virtual disco ball 536-2, FIG. 5M). For example, as illustrated in FIG. 5M, the predetermined location of the virtual element comprises a distance from the representation of the person's head. In some embodiments, the virtual effect is maintained at the predetermined location relative to the position of the human subject. For example, the disco ball is maintained at the predetermined distance from the human subject's head, even as the human subject moves within the physical environment.

Automatically updating display of a virtual effect to maintain the position of the virtual effect relative to a position of a person within the physical environment provides continual visual feedback to the user indicating that the virtual effect is still applied, even when the person moves relative to the device in the physical environment. Providing improved visual feedback to the user enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently In some embodiments, in accordance with a determination that the human subject changes position, the computer system updates (714) display of a first virtual element of the one or more virtual elements based on the change in the position of the human subject. For example as the human subject moves, at least one virtual element (e.g., virtual comet illustrated in FIGS. 5P-5Q) follows the user. In some embodiments, the first virtual element moves by a same amount as the user (e.g., to maintain a relative position between the first virtual element and the user). In some embodiments, at least one of the one or more virtual elements are moved in the display in accordance with the change in position of the human subject (e.g., the one or more virtual elements are moved so as to continue to appear behind the human subject as the human subject changes position). For example, for the hearts virtual effect, the virtual hearts appear to separate from each other based on a position of the human subject (e.g., as if parting to surround the human subject without blocking view of the human subject).

Continuing to display the virtual effect to maintain its position relative to the position of the person provides improved visual feedback to the user indicating that the person has moved relative to the device. Providing improved visual feedback to the user enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, at least one of the one or more virtual elements is visually deemphasized (716) within a predefined area defined relative to the respective position of the human subject. For example, the virtual effect is only displayed at a location that is determined to be above (e.g., or surrounding) the human subject. For example, a virtual effect that includes displaying virtual fireworks to appear above a head of the human subject are faded (e.g., or otherwise visually deemphasized) at positions next to, in front of, or behind the human subject.

Automatically detecting a person within the field of view of the one or more cameras, and automatically fading one or more virtual elements that would, in a physical environment, appear to be at least partially hidden behind the detected person, or otherwise be displayed as surrounding the person, provides the user with visual feedback indicating that the person has been detected without requiring the user to provide inputs to manually identify the person or manually remove portions of the virtual effect that cover the person. Performing an operation (e.g., automatically) and providing improved visual feedback to the user, makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, at least one of the one or more virtual elements is visually occluded (718) by the human subject (e.g., appears to be hidden behind the human subject). For example, a first virtual element of the one or more virtual elements is occluded by, or hidden behind, the human subject that is detected within the field of view of the one or more cameras. For example, simulated light that is displayed on one or more surfaces (e.g., walls) is not displayed over the surface of the user, as described with reference to FIG. 5L. The simulated light is tied to the one or more surfaces (e.g., walls) such that a human subject that blocks view (e.g., of the one or more cameras) of at least a portion of the one or more surfaces results in the virtual element(s) not being displayed on the blocked portion of the one or more surfaces. In some embodiments, the virtual element is displayed at a predefined location within the representation of the field of view of the one or more cameras (e.g., a virtual disco ball is anchored to a position on the ceiling); and in accordance with a determination that the human subject is at a position within the field of view of the one or more cameras that would block the view of the virtual disco ball at the anchored position, the virtual disco ball appears to be at least partially covered by the human subject.

Automatically detecting a person within the field of view of the one or more cameras, and automatically hiding one or more virtual elements that would, in a physical environment, appear to be hidden behind the detected person, provides the user with visual feedback indicating that the person has been detected without requiring the user to provide inputs to manually identify the person or manually remove portions of the virtual effect that cover the person. Performing an operation (e.g., automatically) and reducing clutter in the user interface enhances the operability of the system, and providing improved visual feedback to the user, makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the one or more virtual elements comprises (720) a plurality of particles that are displayed in the representation of the field of view of the one or more camera. For example, the confetti virtual effect illustrated in FIG. 5R includes a plurality of confetti pieces that appear to fill the volume of the representation of the physical space within the field of view of the one or more cameras. In another example, a plurality of floating stars are displayed during the comet virtual effect shown in FIG. 5O. The hearts virtual effect illustrated in FIG. 5X further illustrates a plurality of virtual hearts (e.g., particles) that appear to fill the volume of the representation of the physical space within the field of view of the one or more cameras.

Displaying virtual particles or objects, such as virtual confetti or virtual hearts, that appear to be suspended and fill a volume of the physical environment provides the user with an improved sense of depth perception of the virtual effect as applied to the representation of the physical environment. Providing improved visual feedback to the user enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the one or more virtual elements comprises (722) simulated light that is displayed on at least one of the one or more detected surfaces in the three-dimensional physical environment. In some embodiments, the computer system identifies the detected surfaces as a type of surface (e.g., a horizontal surface, a vertical surface, a ceiling, a wall, a floor, etc.) and the simulated light is displayed based on the type of surface (e.g., the location and/or shape of the detected surface). For example, the simulated light for the disco virtual effect is displayed on the detected walls (e.g., as illustrated in FIG. 5K). For example, the dance floor virtual effect illustrated in FIG. 5W includes displaying lights on different portions of the detected floor (e.g., to appear as flashing lights moving on the floor).

Displaying virtual light beams that appear to reflect on surfaces that have been detected in the physical environment provides the user with an indication of the respective surfaces that have been scanned and continual visual feedback of how movement of the device within the physical environment changes the reflected light (as viewed from the user's perspective). Automatically updating a location and intensity of light to create light patterns provides continual visual feedback to the user to indicate that the user is moving relative to the surfaces that reflect the light patterns. Providing improved visual feedback to the user enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, the computer system captures (724) a media item (e.g., photo and/or video) that that includes the virtual effect displayed in conjunction with the representation of the field of view of the one or more cameras. For example, a video or image is captured (e.g., recorded and durably stored) that shows the virtual effect dynamically interacting with one or more surfaces and/or features (e.g., including the human subject) that are within the field of view of the one or more cameras, as described with reference to FIGS. 5R-5T.

Providing the user with an option to take a video or image, while continuing to display the representation of the field of view of the one or more cameras with the virtual effect applied, provides the user with continuous visual feedback so that the user knows what the captured video or image will include. In addition, displaying a button that causes the device to record the video or image on the same user interface that displays the virtual effect, allows the user to immediately capture media without navigating through complex menu hierarchies. Providing improved visual feedback to the user without requiring further user input enhances the operability of the system and makes the user-device interface more efficient (e.g., by helping the user to achieve an intended result and reducing user mistakes when operating/interacting with the system), which, additionally, reduces power usage and improves battery life of the device by enabling the user to use the device more quickly and efficiently.

In some embodiments, displaying the virtual effect includes a displaying multiple virtual elements (or virtual effects) that are applied to the representation of the physical environment within the field of view of the one or more cameras at the same time. For example, the virtual effect comprises a plurality of virtual effects (e.g., that include one or more virtual elements) concurrently displayed. In some embodiments, the one or more virtual elements comprise two or more of: a plurality of particles that are displayed in the representation of the field of view of the one or more cameras, a virtual element that is displayed on at least one of the one or more detected surfaces, and a virtual element that is displayed at a predetermined location relative to the respective position of the human subject. For example, a particle system (confetti) is displayed concurrently with a virtual pile of confetti that is displayed on one or more horizontal surfaces, as described with reference to FIG. 5R. For example, the comet virtual effect includes a gradient applied to one or more surfaces (walls), virtual stars that appear to float within the volume of the space (e.g., the stars comprise a particle system), and a virtual comet (e.g., virtual object) displayed at a (e.g., predefined) position relative to the human subject (e.g., as the human subject moves around the physical environment, the virtual comet follows), as illustrated in FIGS. 5P-5Q.

It should be understood that the particular order in which the operations in FIGS. 7A-7B have been described is merely an example and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 600) are also applicable in an analogous manner to method 700 described above with respect to FIGS. 7A-7B. For example, the virtual effects described above with reference to method 700 optionally have one or more of the characteristics of the virtual effects described herein with reference to other methods described herein (e.g., method 600). For brevity, these details are not repeated here.

The operations described above with reference to FIGS. 6A-6D and 7A-7B are, optionally, implemented by components depicted in FIGS. 1A-1B. For example, displaying operation 602, receiving operation 604, and providing operation 618, are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
at a computer system in communication with a display generation component and one or more cameras:
displaying, via the display generation component, a representation of a field of view of the one or more cameras, including a representation of a portion of a three-dimensional physical environment that is in the field of view of the one or more cameras;
while displaying the representation of the field of view of the one or more cameras, receiving a request to add a first virtual effect to the displayed representation of the field of view of the one or more cameras;
in response to receiving the request to add the first virtual effect to the displayed representation of the field of view of the one or more cameras and in accordance with a determination that the first virtual effect requires a scan of the physical environment, displaying the first virtual effect in conjunction with the representation of the field of view of the one or more cameras, wherein the first virtual effect is displayed after displaying a first user interface that indicates a progress of the scan of the physical environment; and
while displaying the first virtual effect in conjunction with the representation of the field of view of the one or more cameras, capturing a media item that includes the first virtual effect displayed in conjunction with the representation of the field of view of the one or more cameras.

2. The method of claim 1, further comprising, in response to receiving the request to add the first virtual effect to the displayed representation of the field of view of the one or more cameras and in accordance with a determination that the first virtual effect does not require a scan of the physical environment, displaying the first virtual effect.

3. The method of claim 2, further comprising:
while displaying the first virtual effect in response to receiving the request to add the first virtual effect to the displayed representation of the field of view of the one or more cameras and in accordance with the determination that the first virtual effect does not require a scan of the physical environment:
  receiving a request to add a second virtual effect distinct from the first virtual effect to the displayed representation of the field of view of the one or more cameras;
  in response to receiving the request to add the second virtual effect to the displayed representation of the field of view of the one or more cameras and in accordance with a determination that the second virtual effect requires a scan of the physical environment:
    initiating a second scan of the physical environment to detect one or more features of the physical environment; and
    displaying a second user interface that indicates a progress of the second scan of the physical environment; and
  in response to receiving the request to add the second virtual effect to the displayed representation of the field of view of the one or more cameras and in accordance with a determination that the second virtual effect does not require a scan of the physical environment, displaying the second virtual effect.

4. The method of claim 1, wherein displaying the first virtual effect in conjunction with the representation of the field of view of the one or more camera is performed after completing the scan of the physical environment.

5. The method of claim 1, further comprising, after completing at least a predefined portion of the scan of the physical environment, providing a notification indicating that the first virtual effect is ready to be displayed.

6. The method of claim 1, further comprising:
  after completing at least a predefined portion of the scan of the physical environment, providing a user-selectable user interface element that, when selected, causes the first virtual effect to be displayed; and
  in response to detecting selection of the user-selectable user interface element, displaying the first virtual effect.

7. The method of claim 1, further comprising, while scanning the physical environment, displaying a progress indicator that indicates one or more second features of the physical environment that have been detected.

8. The method of claim 1, further comprising, displaying an option for discarding the scan of the physical environment.

9. The method of claim 1, further comprising, displaying one or more visual prompts indicating an error condition.

10. The method of claim 1, further comprising, while scanning the physical environment, displaying a progress indicator that indicates two or more features of the physical environment that have been detected.

11. The method of claim 1, further comprising:
  while displaying the first virtual effect in conjunction with the representation of the field of view of the one or more cameras, providing a user interface element for switching to a third virtual effect distinct from the first virtual effect.

12. The method of claim 11, further comprising:
  receiving a user input selecting the user interface element for switching to the third virtual effect distinct from the first virtual effect; and
  in response to the user input selecting the user interface element for switching to the third virtual effect, displaying the third virtual effect without initiating a scan.

13. The method of claim 1, further comprising, displaying a third user interface that includes one or more representations of one or more selectable virtual effects to be added to the displayed representation of the field of view of the one or more cameras and a selectable representation of the scanned physical environment.

14. The method of claim 1, further comprising, while scanning the physical environment, detecting one or more surfaces within the physical environment, wherein the first virtual effect changes an appearance of at least one of the one or more surfaces.

15. The method of claim 1, wherein the first virtual effect adds one or more virtual objects to the display of the representation of the field of view of the one or more cameras.

16. The method of claim 1, further comprising, while scanning the physical environment, detecting one or more surfaces within the physical environment, wherein the first virtual effect adds one or more virtual objects that are only displayed within an area corresponding to one or more surfaces detected during the scan.

17. The method of claim 1, further comprising, while scanning the physical environment, detecting one or more surfaces within the physical environment, wherein the first virtual effect comprises displaying one or more virtual objects interacting with one or more surfaces.

18. The method of claim 1, further comprising:
  while displaying the first virtual effect, receiving an input for moving the computer system within the physical environment;
  in response to receiving the input for moving the computer system:
    updating the displayed representation of the field of view of the one or more cameras to include an updated representation of a current portion of the three-dimensional physical environment that is in the field of view of the one or more cameras; and
    in accordance with a determination that the current portion of the three-dimensional physical environment that is in the field of view of the one or more cameras has not been scanned, and in accordance with a determination that the first virtual effect requires a scan of the physical environment:
      initiating a third scan of the current portion of the physical environment to detect one or more third features of the current portion of the physical environment; and
      displaying a fourth user interface that indicates a progress of the third scan of the physical environment.

19. A computer system, comprising:
  a display generation component;
  one or more cameras;
  one or more input devices;
  one or more processors; and
  memory storing one or more programs, wherein the one or more programs are configured to be executed by the one or more processors, the one or more programs including instructions for:
    displaying, via the display generation component, a representation of a field of view of the one or more cameras, including a representation of a portion of a three-dimensional physical environment that is in the field of view of the one or more cameras;
    while displaying the representation of the field of view of the one or more cameras, receiving a request to add a first virtual effect to the displayed representation of the field of view of the one or more cameras;

in response to receiving the request to add the first virtual effect to the displayed representation of the field of view of the one or more cameras and in accordance with a determination that the first virtual effect requires a scan of the physical environment, displaying the first virtual effect in conjunction with the representation of the field of view of the one or more cameras, wherein the first virtual effect is displayed after displaying a user interface that indicates a progress of the scan of the physical environment; and while displaying the first virtual effect in conjunction with the representation of the field of view of the one or more cameras, capturing a media item that includes the first virtual effect displayed in conjunction with the representation of the field of view of the one or more cameras.

20. The computer system of claim 19, wherein displaying the first virtual effect in conjunction with the representation of the field of view of the one or more camera is performed after completing the scan of the physical environment.

21. The computer system of claim 19, the one or more programs further comprising instructions for, after completing at least a predefined portion of the scan of the physical environment, providing a notification indicating that the first virtual effect is ready to be displayed.

22. The computer system of claim 19, the one or more programs further comprising instructions for:
after completing at least a predefined portion of the scan of the physical environment, providing a user-selectable user interface element that, when selected, causes the first virtual effect to be displayed; and
in response to detecting selection of the user-selectable user interface element, displaying the first virtual effect.

23. The computer system of claim 19, the one or more programs further comprising instructions for, while scanning the physical environment, displaying a progress indicator that indicates one or more second features of the physical environment that have been detected.

24. The computer system of claim 19, the one or more programs further comprising instructions for, displaying an option for discarding the scan of the physical environment.

25. The computer system of claim 19, the one or more programs further comprising instructions for:
while displaying the first virtual effect in conjunction with the representation of the field of view of the one or more cameras, providing a user interface element for switching to a third virtual effect distinct from the first virtual effect.

26. The computer system of claim 19, the one or more programs further comprising instructions for, while scanning the physical environment, detecting one or more surfaces within the physical environment, wherein the first virtual effect changes an appearance of at least one of the one or more surfaces.

27. The computer system of claim 19, wherein the first virtual effect adds one or more virtual objects to the display of the representation of the field of view of the one or more cameras.

28. The computer system of claim 19, the one or more programs further comprising instructions for, while scanning the physical environment, detecting one or more surfaces within the physical environment, wherein the first virtual effect adds one or more virtual objects that are only displayed within an area corresponding to one or more surfaces detected during the scan.

29. A non-transitory computer readable storage medium storing one or more programs, the one or more programs comprising instructions that, when executed by a computer system that includes and/or is in communication with a display generation component, one or more cameras, and one or more input devices, cause the computer system to:
display, via the display generation component, a representation of a field of view of the one or more cameras, including a representation of a portion of a three-dimensional physical environment that is in the field of view of the one or more cameras;
while displaying the representation of the field of view of the one or more cameras, receive a request to add a first virtual effect to the displayed representation of the field of view of the one or more cameras;
in response to receiving the request to add the first virtual effect to the displayed representation of the field of view of the one or more cameras and in accordance with a determination that the first virtual effect requires a scan of the physical environment, display the first virtual effect in conjunction with the representation of the field of view of the one or more cameras, wherein the first virtual effect is displayed after displaying a user interface that indicates a progress of the scan of the physical environment; and
while displaying the first virtual effect in conjunction with the representation of the field of view of the one or more cameras, capture a media item that includes the first virtual effect displayed in conjunction with the representation of the field of view of the one or more cameras.

30. The non-transitory computer readable storage medium of claim 29, wherein displaying the first virtual effect in conjunction with the representation of the field of view of the one or more camera is performed after completing the scan of the physical environment.

31. The non-transitory computer readable storage medium of claim 29, the one or more programs further comprising instructions that cause the computer system to, after completing at least a predefined portion of the scan of the physical environment, provide a notification indicating that the first virtual effect is ready to be displayed.

32. The non-transitory computer readable storage medium of claim 29, the one or more programs further comprising instructions that cause the computer system to:
after completing at least a predefined portion of the scan of the physical environment, provide a user-selectable user interface element that, when selected, causes the first virtual effect to be displayed; and
in response to detecting selection of the user-selectable user interface element, display the first virtual effect.

33. The non-transitory computer readable storage medium of claim 29, the one or more programs further comprising instructions that cause the computer system to, while scanning the physical environment, display a progress indicator that indicates one or more second features of the physical environment that have been detected.

34. The non-transitory computer readable storage medium of claim 29, the one or more programs further comprising instructions that cause the computer system to display an option for discarding the scan of the physical environment.

35. The non-transitory computer readable storage medium of claim 29, the one or more programs further comprising instructions that cause the computer system to:
while displaying the first virtual effect in conjunction with the representation of the field of view of the one or more cameras, provide a user interface element for switching to a third virtual effect distinct from the first virtual effect.

36. The non-transitory computer readable storage medium of claim 29, the one or more programs further comprising instructions that cause the computer system to, while scanning the physical environment, detect one or more surfaces within the physical environment, wherein the first virtual effect changes an appearance of at least one of the one or more surfaces.

37. The non-transitory computer readable storage medium of claim 29, wherein the first virtual effect adds one or more virtual objects to the display of the representation of the field of view of the one or more cameras.

38. The non-transitory computer readable storage medium of claim 29, the one or more programs further comprising instructions that cause the computer system to, while scanning the physical environment, detect one or more surfaces within the physical environment, wherein the first virtual effect adds one or more virtual objects that are only displayed within an area corresponding to one or more surfaces detected during the scan.

\* \* \* \* \*